(12) United States Patent
Hazra et al.

(10) Patent No.: US 11,106,273 B2
(45) Date of Patent: Aug. 31, 2021

(54) SYSTEM AND METHODS FOR ON-BODY GESTURAL INTERFACES AND PROJECTION DISPLAYS

(71) Applicant: Ostendo Technologies, Inc., Carlsbad, CA (US)

(72) Inventors: Siddharth S. Hazra, Carlsbad, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 105 days.

(21) Appl. No.: 15/338,189

(22) Filed: Oct. 28, 2016

(65) Prior Publication Data

US 2017/0123487 A1 May 4, 2017

Related U.S. Application Data

(60) Provisional application No. 62/249,021, filed on Oct. 30, 2015.

(51) Int. Cl.
 *G06F 3/01* (2006.01)
 *G06F 1/16* (2006.01)
 (Continued)

(52) U.S. Cl.
 CPC .............. *G06F 3/011* (2013.01); *G06F 1/163* (2013.01); *G06F 3/013* (2013.01); *G06F 3/015* (2013.01);
 (Continued)

(58) Field of Classification Search
 CPC .......... G06F 3/011; G06F 1/163; G06F 3/013; G06F 3/015; G06F 3/017; G06F 3/0346;
 (Continued)

(56) References Cited

U.S. PATENT DOCUMENTS 4,427,912 A * 1/1984 Bui ...................... B06B 1/0611
 310/322
4,987,410 A 1/1991 Berman et al.
 (Continued)

FOREIGN PATENT DOCUMENTS

CN 103298410 9/2013
CN 103546181 1/2014
 (Continued)

OTHER PUBLICATIONS

"International Search Report and Written Opinion of the International Searching Authority dated Mar. 31, 2017; International Application No. PCT/US2016/059777", dated Mar. 31, 2017.
 (Continued)

*Primary Examiner* — Sejoon Ahn
(74) *Attorney, Agent, or Firm* — Greg Caldwell, Esq; W. Eric Boyd, Esq.

(57) ABSTRACT

A wearable system with a gestural interface for wearing on, for instance, the wrist of a user. The system comprises an ultrasonic transceiver array structure and may comprise a pico projector display element for displaying an image on a surface. User anatomical feature inputs are received in the form of ultrasound signals representative of a spatio-temporal cross-section of the wrist of the user by articulating wrist, finger and hand postures, which articulations are translated into gestures. Inputs from inertial and other sensors are used by the system as part of the anatomical feature posture identification method and device. Gestures are recognized using a mathematically-modeled, simulation-based set of biological metrics of tissue objects, which gestures are converted to executable computer instructions. Embodiments of the system disclosed herein may also be used to monitor biometric and health data over computer networks or using onboard systems.

59 Claims, 35 Drawing Sheets

(51) Int. Cl.
  *G06F 3/0346* (2013.01)
  *G06F 3/0481* (2013.01)
  *G06F 3/0482* (2013.01)
  *G06F 3/0484* (2013.01)

(52) U.S. Cl.
  CPC ............ *G06F 3/017* (2013.01); *G06F 3/0346* (2013.01); *G06F 3/0482* (2013.01); *G06F 3/04817* (2013.01); *G06F 3/04845* (2013.01)

(58) Field of Classification Search
  CPC . G06F 3/04817; G06F 3/0482; G06F 3/04845
  See application file for complete search history.

(56) References Cited

U.S. PATENT DOCUMENTS

| | | |
|---|---|---|
| 5,162,828 A | 11/1992 | Furness et al. |
| 5,368,042 A | 11/1994 | O'Neal et al. |
| 5,619,373 A | 4/1997 | Meyerhofer et al. |
| 5,696,521 A | 12/1997 | Robinson et al. |
| 5,818,359 A | 10/1998 | Beach |
| 5,886,822 A | 3/1999 | Spitzer |
| 5,986,811 A | 11/1999 | Wohlstadter |
| 6,128,003 A | 10/2000 | Smith et al. |
| 6,147,807 A | 11/2000 | Droessler et al. |
| 6,151,167 A | 11/2000 | Melville |
| 6,353,503 B1 | 3/2002 | Spitzer et al. |
| 6,433,907 B1 | 8/2002 | Lippert et al. |
| 6,456,438 B1 | 9/2002 | Lee et al. |
| 6,522,794 B1 | 2/2003 | Bischel et al. |
| 6,529,331 B2 | 3/2003 | Massof et al. |
| 6,666,825 B2 | 12/2003 | Smith et al. |
| 6,710,902 B2 | 3/2004 | Takeyama |
| 6,719,693 B2 | 4/2004 | Richard |
| 6,795,221 B1 | 9/2004 | Urey |
| 6,803,561 B2 | 10/2004 | Dunfield |
| 6,804,066 B1 | 10/2004 | Ha et al. |
| 6,829,095 B2 | 12/2004 | Amitai |
| 6,924,476 B2 | 8/2005 | Wine et al. |
| 6,937,221 B2 | 8/2005 | Lippert et al. |
| 6,984,208 B2 | 1/2006 | Zheng |
| 6,999,238 B2 | 2/2006 | Glebov et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,369,321 B1 | 5/2008 | Ren et al. |
| 7,482,730 B2 | 1/2009 | Davis et al. |
| 7,486,255 B2 | 2/2009 | Brown et al. |
| 7,545,571 B2 | 6/2009 | Garoutte et al. |
| 7,580,007 B2 | 8/2009 | Brown et al. |
| 7,619,807 B2 | 11/2009 | Baek et al. |
| 7,623,560 B2 | 11/2009 | El-Ghoroury et al. |
| 7,724,210 B2 | 5/2010 | Sprague et al. |
| 7,747,301 B2 | 6/2010 | Cheng et al. |
| 7,767,479 B2 | 8/2010 | El-Ghoroury et al. |
| 7,791,810 B2 | 9/2010 | Powell |
| 7,829,902 B2 | 11/2010 | El-Ghoroury et al. |
| 7,952,809 B2 | 5/2011 | Takai |
| 8,049,231 B2 | 11/2011 | El-Ghoroury et al. |
| 8,098,265 B2 | 1/2012 | El-Ghoroury et al. |
| 8,243,770 B2 | 8/2012 | El-Ghoroury et al. |
| 8,279,716 B1 | 10/2012 | Gossweiler, III et al. |
| 8,292,833 B2 | 10/2012 | Son et al. |
| 8,405,618 B2 | 3/2013 | Colgate et al. |
| 8,471,967 B2 | 6/2013 | Miao et al. |
| 8,477,425 B2 | 7/2013 | Border et al. |
| 8,482,859 B2 | 7/2013 | Border et al. |
| 8,508,830 B1 | 8/2013 | Wang |
| 8,508,851 B2 | 8/2013 | Miao et al. |
| 8,510,244 B2 | 8/2013 | Carson et al. |
| 8,553,910 B1 | 10/2013 | Dong et al. |
| 8,567,960 B2 | 10/2013 | El-Ghoroury et al. |
| 8,619,049 B2 | 12/2013 | Harrison et al. |
| 8,725,842 B1 | 5/2014 | Al-Nasser |
| 8,743,145 B1 | 6/2014 | Price |
| 8,773,599 B2 | 7/2014 | Saeedi et al. |
| 8,854,724 B2 | 10/2014 | El-Ghoroury et al. |
| 8,928,969 B2 | 1/2015 | Alpaslan et al. |
| 8,975,713 B2 | 3/2015 | Sako et al. |
| 9,097,890 B2 | 8/2015 | Miller et al. |
| 9,110,504 B2 | 8/2015 | Lewis et al. |
| 9,134,535 B2 | 9/2015 | Dobschal et al. |
| 9,179,126 B2 | 11/2015 | El-Ghoroury et al. |
| 9,195,053 B2 | 11/2015 | El-Ghoroury et al. |
| 9,239,453 B2 | 1/2016 | Cheng et al. |
| 9,244,277 B2 | 1/2016 | Cheng et al. |
| 9,244,539 B2 | 1/2016 | Venable et al. |
| 9,274,608 B2 | 3/2016 | Katz et al. |
| 9,286,730 B2 | 3/2016 | Bar-Zeev et al. |
| 9,529,191 B2 | 12/2016 | Sverdrup et al. |
| 9,538,182 B2 | 1/2017 | Mishourovsky et al. |
| 9,681,069 B2 | 6/2017 | El-Ghoroury et al. |
| 9,712,764 B2 | 7/2017 | El-Ghoroury et al. |
| 9,727,790 B1 | 8/2017 | Vaziri |
| 9,774,800 B2 | 9/2017 | El-Ghoroury et al. |
| 9,779,515 B2 | 10/2017 | El-Ghoroury et al. |
| 9,965,982 B2 | 5/2018 | Lapstun |
| 10,627,860 B2 * | 4/2020 | Jacobsen ............... G05D 1/0038 |
| 10,838,503 B2 * | 11/2020 | Hsu ........................ H04N 13/39 |
| 2002/0008854 A1 | 1/2002 | Leigh Travis |
| 2002/0017567 A1 * | 2/2002 | Connolly ............... G04B 47/00 |
| | | 235/472.02 |
| 2002/0024495 A1 | 2/2002 | Lippert et al. |
| 2002/0075232 A1 | 6/2002 | Daum et al. |
| 2002/0083164 A1 * | 6/2002 | Katayama ............ G06Q 10/087 |
| | | 709/223 |
| 2002/0141026 A1 | 10/2002 | Wiklof et al. |
| 2002/0151824 A1 | 10/2002 | Fischer |
| 2002/0158814 A1 | 10/2002 | Bright et al. |
| 2002/0181115 A1 | 12/2002 | Massof et al. |
| 2002/0194005 A1 | 12/2002 | Lahr |
| 2003/0032884 A1 | 2/2003 | Smith et al. |
| 2003/0086135 A1 | 5/2003 | Takeyama |
| 2003/0122066 A1 | 7/2003 | Dunfield |
| 2003/0138130 A1 * | 7/2003 | Cohen ...................... G07F 9/023 |
| | | 382/103 |
| 2003/0184575 A1 | 10/2003 | Reho et al. |
| 2003/0187357 A1 | 10/2003 | Richard |
| 2004/0004585 A1 | 1/2004 | Brown et al. |
| 2004/0024312 A1 * | 2/2004 | Zheng .................. A61B 5/1038 |
| | | 600/437 |
| 2004/0051392 A1 * | 3/2004 | Badarneh ............... G06F 3/0346 |
| | | 307/112 |
| 2004/0080807 A1 | 4/2004 | Chen et al. |
| 2004/0080938 A1 | 4/2004 | Holman et al. |
| 2004/0085261 A1 | 5/2004 | Lewis et al. |
| 2004/0119004 A1 | 6/2004 | Wine et al. |
| 2004/0125076 A1 | 7/2004 | Green |
| 2004/0138935 A1 * | 7/2004 | Johnson ............ G06Q 10/06375 |
| | | 705/7.37 |
| 2004/0179254 A1 | 9/2004 | Lewis et al. |
| 2004/0240064 A1 | 12/2004 | Dutta |
| 2005/0002074 A1 * | 1/2005 | McPheters ........... G03H 1/0005 |
| | | 359/15 |
| 2005/0024730 A1 | 2/2005 | Aizenberg et al. |
| 2005/0053192 A1 * | 3/2005 | Sukovic .................. A61B 6/022 |
| | | 378/41 |
| 2005/0116038 A1 | 6/2005 | Lewis et al. |
| 2005/0117195 A1 | 6/2005 | Glebov et al. |
| 2005/0168700 A1 * | 8/2005 | Berg .................... B41F 33/0036 |
| | | 353/34 |
| 2005/0179976 A1 | 8/2005 | Davis et al. |
| 2005/0264502 A1 | 12/2005 | Sprague et al. |
| 2006/0017655 A1 | 1/2006 | Brown et al. |
| 2006/0132383 A1 | 6/2006 | Gally et al. |
| 2006/0152812 A1 | 7/2006 | Woodgate et al. |
| 2006/0253007 A1 | 11/2006 | Cheng et al. |
| 2006/0285192 A1 | 12/2006 | Yang |

(56) References Cited

U.S. PATENT DOCUMENTS

| | | | |
|---|---|---|---|
| 2006/0290663 A1* | 12/2006 | Mitchell | G06F 3/013 345/156 |
| 2007/0052694 A1 | 3/2007 | Holmes | |
| 2007/0083120 A1* | 4/2007 | Cain | A61B 17/22004 600/439 |
| 2007/0236450 A1 | 10/2007 | Colgate et al. | |
| 2007/0269432 A1* | 11/2007 | Nakamura | C07K 14/4702 424/138.1 |
| 2007/0276658 A1 | 11/2007 | Douglass | |
| 2008/0002262 A1 | 1/2008 | Chirieleison | |
| 2008/0049291 A1 | 2/2008 | Baek et al. | |
| 2008/0130069 A1 | 6/2008 | Cernasov | |
| 2008/0141316 A1* | 6/2008 | Igoe | H04L 12/2809 725/81 |
| 2008/0239452 A1 | 10/2008 | Xu et al. | |
| 2009/0073559 A1 | 3/2009 | Woodgate et al. | |
| 2009/0086170 A1 | 4/2009 | El-Ghoroury et al. | |
| 2009/0096746 A1* | 4/2009 | Kruse | G06F 3/014 345/156 |
| 2009/0161191 A1 | 6/2009 | Powell | |
| 2009/0199900 A1 | 8/2009 | Bita et al. | |
| 2009/0222113 A1* | 9/2009 | Fuller | G06F 3/0346 700/83 |
| 2009/0256287 A1 | 10/2009 | Fu et al. | |
| 2009/0268303 A1 | 10/2009 | Takai | |
| 2009/0278998 A1 | 11/2009 | El-Ghoroury et al. | |
| 2009/0327171 A1* | 12/2009 | Tan | G06F 3/015 706/12 |
| 2010/0003777 A1 | 1/2010 | El-Ghoroury et al. | |
| 2010/0026960 A1 | 2/2010 | Sprague | |
| 2010/0046070 A1 | 2/2010 | Mukawa | |
| 2010/0053164 A1* | 3/2010 | Imai | G06F 3/011 345/427 |
| 2010/0066921 A1 | 3/2010 | El-Ghoroury et al. | |
| 2010/0091050 A1 | 4/2010 | El-Ghoroury et al. | |
| 2010/0156676 A1 | 6/2010 | Mooring et al. | |
| 2010/0171922 A1 | 7/2010 | Sessner et al. | |
| 2010/0199232 A1 | 8/2010 | Mistry et al. | |
| 2010/0220042 A1 | 9/2010 | El-Ghoroury et al. | |
| 2010/0241601 A1 | 9/2010 | Carson et al. | |
| 2010/0245957 A1 | 9/2010 | Hudman et al. | |
| 2010/0259472 A1 | 10/2010 | Radivojevic et al. | |
| 2010/0267449 A1* | 10/2010 | Gagner | G07F 17/3211 463/30 |
| 2010/0302137 A1* | 12/2010 | Benko | G06F 3/005 345/156 |
| 2011/0054360 A1 | 3/2011 | Son et al. | |
| 2011/0115887 A1* | 5/2011 | Yoo | G06F 3/017 348/51 |
| 2011/0221659 A1 | 9/2011 | King, III et al. | |
| 2011/0285666 A1 | 11/2011 | Poupyrev et al. | |
| 2011/0285667 A1 | 11/2011 | Poupyrev et al. | |
| 2012/0033113 A1 | 2/2012 | El-Ghoroury et al. | |
| 2012/0075173 A1 | 3/2012 | Ashbrook et al. | |
| 2012/0075196 A1 | 3/2012 | Ashbrook et al. | |
| 2012/0105310 A1 | 5/2012 | Sverdrup et al. | |
| 2012/0113097 A1* | 5/2012 | Nam | H04N 13/383 345/419 |
| 2012/0120498 A1 | 5/2012 | Harrison et al. | |
| 2012/0143358 A1 | 6/2012 | Adams et al. | |
| 2012/0154441 A1 | 6/2012 | Kim | |
| 2012/0157203 A1* | 6/2012 | Latta | G06F 3/005 463/32 |
| 2012/0195461 A1* | 8/2012 | Lawrence Ashok Inigo | G06F 3/011 382/103 |
| 2012/0212398 A1 | 8/2012 | Border et al. | |
| 2012/0212399 A1 | 8/2012 | Border et al. | |
| 2012/0218301 A1 | 8/2012 | Miller | |
| 2012/0236201 A1* | 9/2012 | Larsen | G06Q 10/10 348/468 |
| 2012/0249409 A1 | 10/2012 | Toney et al. | |
| 2012/0249741 A1* | 10/2012 | Maciocci | G06F 3/011 348/46 |
| 2012/0288995 A1 | 11/2012 | El-Ghoroury et al. | |
| 2012/0290943 A1 | 11/2012 | Toney et al. | |
| 2012/0293402 A1 | 11/2012 | Harrison et al. | |
| 2012/0299962 A1 | 11/2012 | White et al. | |
| 2012/0319940 A1* | 12/2012 | Bress | G06F 3/014 345/156 |
| 2012/0320092 A1* | 12/2012 | Shin | G06F 3/017 345/633 |
| 2013/0016292 A1 | 1/2013 | Miao et al. | |
| 2013/0021658 A1 | 1/2013 | Miao et al. | |
| 2013/0027341 A1* | 1/2013 | Mastandrea | G06F 3/014 345/173 |
| 2013/0041477 A1 | 2/2013 | Sikdar et al. | |
| 2013/0050260 A1* | 2/2013 | Reitan | G06F 3/011 345/633 |
| 2013/0080890 A1* | 3/2013 | Krishnamurthi | H04W 4/20 715/702 |
| 2013/0083303 A1 | 4/2013 | Hoover et al. | |
| 2013/0100362 A1 | 4/2013 | Saeedi et al. | |
| 2013/0141895 A1 | 6/2013 | Alpaslan et al. | |
| 2013/0162505 A1 | 6/2013 | Crocco et al. | |
| 2013/0169536 A1* | 7/2013 | Wexler | G09B 21/008 345/158 |
| 2013/0176622 A1 | 7/2013 | Abrahamsson et al. | |
| 2013/0187836 A1 | 7/2013 | Cheng et al. | |
| 2013/0196757 A1 | 8/2013 | Latta et al. | |
| 2013/0215516 A1 | 8/2013 | Dobschal et al. | |
| 2013/0225999 A1 | 8/2013 | Banjanin et al. | |
| 2013/0258451 A1 | 10/2013 | El-Ghoroury et al. | |
| 2013/0271679 A1 | 10/2013 | Sakamoto et al. | |
| 2013/0285174 A1 | 10/2013 | Sako et al. | |
| 2013/0286053 A1 | 10/2013 | Fleck et al. | |
| 2013/0286178 A1 | 10/2013 | Lewis et al. | |
| 2013/0321581 A1 | 12/2013 | El-Ghoroury et al. | |
| 2014/0009845 A1 | 1/2014 | Cheng et al. | |
| 2014/0024132 A1* | 1/2014 | Jia | G01N 33/5088 436/173 |
| 2014/0049417 A1 | 2/2014 | Abdurrahman et al. | |
| 2014/0049983 A1 | 2/2014 | Nichol et al. | |
| 2014/0055352 A1* | 2/2014 | Davis | G06F 3/017 345/156 |
| 2014/0055692 A1 | 2/2014 | Kroll et al. | |
| 2014/0085177 A1 | 3/2014 | Lyons et al. | |
| 2014/0091984 A1 | 4/2014 | Ashbrook et al. | |
| 2014/0098018 A1* | 4/2014 | Kim | G06F 3/014 345/156 |
| 2014/0098067 A1 | 4/2014 | Yang et al. | |
| 2014/0118252 A1* | 5/2014 | Kim | G06F 3/017 345/157 |
| 2014/0129207 A1 | 5/2014 | Bailey et al. | |
| 2014/0139454 A1 | 5/2014 | Mistry et al. | |
| 2014/0139576 A1 | 5/2014 | Costa et al. | |
| 2014/0147035 A1 | 5/2014 | Ding et al. | |
| 2014/0168062 A1 | 6/2014 | Katz et al. | |
| 2014/0176417 A1* | 6/2014 | Young | G06F 1/163 345/156 |
| 2014/0185142 A1 | 7/2014 | Gupta et al. | |
| 2014/0200496 A1 | 7/2014 | Hyde et al. | |
| 2014/0232651 A1 | 8/2014 | Kress et al. | |
| 2014/0292620 A1 | 10/2014 | Lapstun | |
| 2014/0300869 A1 | 10/2014 | Hirsch et al. | |
| 2014/0301662 A1 | 10/2014 | Justice et al. | |
| 2014/0304646 A1* | 10/2014 | Rossmann | G06F 3/0482 715/790 |
| 2014/0340304 A1* | 11/2014 | Dewan | G06T 13/80 345/156 |
| 2015/0001987 A1 | 1/2015 | Masaki et al. | |
| 2015/0033539 A1 | 2/2015 | El-Ghoroury et al. | |
| 2015/0035832 A1 | 2/2015 | Sugden et al. | |
| 2015/0054729 A1 | 2/2015 | Minnen et al. | |
| 2015/0058102 A1* | 2/2015 | Christensen | G11B 27/11 705/14.6 |
| 2015/0125109 A1 | 5/2015 | Robbins et al. | |
| 2015/0138086 A1 | 5/2015 | Underkoffler et al. | |
| 2015/0148886 A1 | 5/2015 | Rao et al. | |
| 2015/0193984 A1 | 7/2015 | Bar-Zeev et al. | |

(56) References Cited

U.S. PATENT DOCUMENTS

| | | | |
|---|---|---|---|
| 2015/0205126 A1 | 7/2015 | Schowengerdt | |
| 2015/0220109 A1* | 8/2015 | von Badinski | G01P 15/00 340/539.12 |
| 2015/0235467 A1 | 8/2015 | Schowengerdt et al. | |
| 2015/0277126 A1 | 10/2015 | Hirano et al. | |
| 2015/0293590 A1 | 10/2015 | Lehtiniemi et al. | |
| 2015/0301256 A1 | 10/2015 | Takiguchi | |
| 2015/0301383 A1 | 10/2015 | Kimura | |
| 2015/0323990 A1 | 11/2015 | Maltz | |
| 2015/0323998 A1* | 11/2015 | Kudekar | G06F 1/163 345/156 |
| 2015/0326842 A1* | 11/2015 | Huai | G06T 5/007 348/223.1 |
| 2015/0381782 A1* | 12/2015 | Park | H04M 9/08 381/100 |
| 2016/0018948 A1* | 1/2016 | Parvarandeh | G06F 1/169 345/175 |
| 2016/0026059 A1 | 1/2016 | Chung et al. | |
| 2016/0028935 A1 | 1/2016 | El-Ghoroury et al. | |
| 2016/0116738 A1 | 4/2016 | Osterhout | |
| 2016/0182782 A1 | 6/2016 | El-Ghoroury et al. | |
| 2016/0191765 A1 | 6/2016 | El-Ghoroury et al. | |
| 2016/0191823 A1 | 6/2016 | El-Ghoroury et al. | |
| 2016/0220232 A1* | 8/2016 | Takada | A61B 8/5207 |
| 2016/0342151 A1* | 11/2016 | Dey, IV | B25F 5/00 |
| 2017/0065872 A1* | 3/2017 | Kelley | A63B 71/0622 |
| 2017/0069134 A1* | 3/2017 | Shapira | G06F 3/011 |
| 2017/0116897 A1 | 4/2017 | Ahn et al. | |
| 2017/0184776 A1 | 6/2017 | El-Ghoroury et al. | |
| 2017/0236295 A1 | 8/2017 | El-Ghoroury et al. | |
| 2017/0261388 A1* | 9/2017 | Ma | G01L 1/2287 |
| 2017/0310956 A1 | 10/2017 | Perdices-Gonzalez et al. | |
| 2017/0330042 A1 | 11/2017 | Vaziri | |
| 2018/0348861 A1 | 12/2018 | Uscinski et al. | |
| 2019/0362557 A1 | 11/2019 | Lacey et al. | |
| 2020/0082600 A1 | 3/2020 | Jones et al. | |
| 2021/0118212 A1 | 4/2021 | Wedig et al. | |
| 2021/0158591 A1 | 5/2021 | Kuribayashi | |
| 2021/0166459 A1 | 6/2021 | Miller, IV | |

FOREIGN PATENT DOCUMENTS

| | | |
|---|---|---|
| CN | 103558918 | 2/2014 |
| CN | 103827780 A | 5/2014 |
| CN | 104460992 | 3/2015 |
| CN | 108431736 A | 8/2018 |
| EP | 0431488 | 1/1996 |
| JP | 2018536933 A | 12/2018 |
| KR | 10-1552134 | 9/2015 |
| KR | 20180088390 A | 8/2018 |
| TW | 201727439 A | 8/2017 |
| WO | 2014127126 A1 | 8/2014 |
| WO | WO-2014/124173 | 8/2014 |
| WO | 2017075611 A1 | 5/2017 |

OTHER PUBLICATIONS

"Invitation to Pay Additional Fees dated Jan. 11, 2017; International Application No. PCT/US2016/059777", dated Jan. 11, 2017.

Ahumada, Jr., Albert J. et al., "Spatio-temporal discrimination model predicts temporal masking functions", Proceedings of SPIE—the International Society for Optical Engineering, Human vision and electronic imaging III, vol. 3299, 1998, 6 pp. total.

Beulen, Bart W. et al., "Toward Noninvasive Blood Pressure Assessment in Arteries by Using Ultrasound", Ultrasound in Medicine & Biology, vol. 37, No. 5, 2011, pp. 788-797.

Bickel, Bernd et al., "Capture and Modeling of Non-Linear Heterogeneous Soft Tissue", ACM Transactions on Graphics (TOG)—Proceedings of ACM SIGGRAPH 2009, vol. 28, Issue 3, Article No. 89, Aug. 2009, 9 pp. total.

Castellini, Claudio et al., "Using Ultrasound Images of the Forearm to Predict Finger Positions", IEEE Transactions on Neural Systems and Rehabilitation Engineering, vol. 20, No. 6, Nov. 2012, pp. 788-797.

Cobbold, Richard S.C., "Foundations of Biomedical Ultrasound", Oxford University Press, 2007, pp. 3-95.

Fattal, David et al., "A multi-directional backlight for a wide-angle, glasses-free three-dimensional display", Nature, vol. 495, Mar. 21, 2013, pp. 348-351.

Grossberg, Stephen et al., "Neural dynamics of saccadic and smooth pursuit eye movement coordination during visual tracking of unpredictably moving targets", Neural Networks, vol. 27, 2012, pp. 1-20.

Guo, Jing-Yi et al., "Dynamic monitoring of forearm muscles using one-dimensional sonomyography system", Journal of Rehabilitation Research & Development, vol. 45, No. 1, 2008, pp. 187-195.

Harrison, Chris et al., "Skinput: Appropriating the Body as an Input Surface", CHI '10 Proceedings of the SIGCHI Conference on Human Factors in Computing Systems, 2010, pp. 453-462.

Hsiao, Tzu-Yu et al., "Noninvasive Assessment of Laryngeal Phonation Function Using Color Doppler Ultrasound Imaging", Ultrasound in Med. & Biol., vol. 27, No. 8, 2001, pp. 1035-1040.

Hua, Hong et al., "A 3D integral imaging optical see-through head-mounted display", Optics Express, vol. 22, No. 11, May 28, 2014, pp. 13484-13491.

Keir, Peter J. et al., "Changes in geometry of the finger flexor tendons in the carpal tunnel with wrist posture and tendon load: an MRI study on normal wrists", Clinical Biomechanics, vol. 14, 1999, pp. 635-645.

Khuri-Yakub, Butrus T. et al., "Capacitive micromachined ultrasonic transducers for medical imaging and therapy", J. Micromech. Microeng., vol. 21, No. 5, May 2011, pp. 054004-054014.

Koutsouridis, G. G. et al., "Towards a Non-Invasive Ultrasound Pressure Assessment in Large Arteries", Technische Universiteit Eindhoven, University of Technology, Mate Poster Award 2010 : 15th Annual Poster Contest, 2010, 1 page total.

Lanman, Douglas et al., "Near-Eye Light Field Displays", ACM Transactions on Graphics (TOC), vol. 32, Issue 6, Article 220, Nov. 2013, 27 pp. total.

Legros, M. et al., "Piezocomposite and CMUT Arrays Assessment Through In Vitro Imaging Performances", 2008 IEEE Ultrasonics Symposium, Nov. 2-5, 2008, pp. 1142-1145.

Martin, Joel R. et al., "Changes in the flexor digitorum profundus tendon geometry in the carpal tunnel due to force production and posture of metacarpophalangeal joint of the index finger: An MRI study", Clinical Biomechanics, vol. 28, 2013, pp. 157-163.

Martin, Joel R. et al., "Effects of the index finger position and force production on the flexor digitorum superficialis moment arms at the metacarpophalangeal joints—a magnetic resonance imaging study", Clinical Biomechanics, vol. 27, 2012, pp. 453-459.

Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.

Mujibiya, Adiyan et al., "The Sound of Touch: On-body Touch and Gesture Sensing Based on Transdermal Ultrasound Propagation", ITS '13 Proceedings of the 2013 ACM international conference on Interactive tabletops and surfaces, Oct. 6-9, 2013, pp. 189-198.

Paclet, Florent et al., "Motor control theories improve biomechanical model of the hand for finger pressing tasks", Journal of Biomechanics, vol. 45, 2012, pp. 1246-1251.

Pinton, Gianmarco F. et al., "A Heterogeneous Nonlinear Attenuating Full-Wave Model of Ultrasound", IEEE Transactions on Ultrasonics, Ferroelectrics, and Frequency Control, vol. 56, No. 3, Mar. 2009, pp. 474-488.

Richard, William D. et al., "A scalable architecture for real-time synthetic-focus imaging", Ultrasonic Imaging, vol. 25, 2003, pp. 151-161.

Rolland, Jannick P. et al., "Dynamic focusing in head-mounted displays", Part of the IS&T/SPIE Conference on the Engineering Reality of Virtual Reality, SPIE vol. 3639, Jan. 1999, pp. 463-470.

Shi, Jun et al., "Feasibility of controlling prosthetic hand using sonomyography signal in real time: Preliminary study", Journal of Rehabilitation Research & Development, vol. 47, No. 2, 2010, pp. 87-97.

(56) References Cited

OTHER PUBLICATIONS

Sikdar, Siddhartha et al., "Novel Method for Predicting Dexterous Individual Finger Movements by Imaging Muscle Activity Using a Wearable Ultrasonic System", IEEE Transactions on Neural Systems and Rehabilitation Engineering, vol. 22, No. 1, Jan. 2014, pp. 69-76.

Sueda, Shinjiro et al., "Musculotendon Simulation for Hand Animation", ACM Transactions on Graphics (TOG)—Proceedings of ACM SIGGRAPH 2008, vol. 27 Issue 3, Article No. 83, vol. 27 Issue 3, Aug. 2008, 8 pp. total.

Szabo, Thomas L. , "Diagnostic Ultrasound Imaging: Inside Out, Second Edition", Elsevier Inc., 2013, 829 pp. total.

Van Den Branden Lambrecht, Christian J. , "A Working Spatio-Temporal Model of the Human Visual System for Image Restoration and Quality Assessment Applications", ICASSP-96, Conference Proceedings of the 1996 IEEE International Conference on Acoustics, Speech, and Signal Processing, May 1996, 4 pp. total.

Watson, Andrew B. et al., "Model of human visual-motion sensing", Journal of the Optical Society of America A, vol. 2, No. 2, Feb. 1985, pp. 322-342.

Watson, Andrew B. et al., "Model of visual contrast gain control and pattern masking", Journal of the Optical Society of America A, vol. 14, No. 9, Sep. 1997, pp. 2379-2391.

Watson, Andrew B. , "The search for optimal visual stimuli", Vision Research, vol. 38, 1998, pp. 1619-1621.

Watson, Andrew B. , "The Spatial Standard Observer: A Human Visual Model for Display Inspection", Society for Information Display, SID 06 Digest, Jun. 2006, pp. 1312-1315.

Watson, Andrew B. , "Visual detection of spatial contrast patterns: Evaluation of five simple models", Optics Express, vol. 6, No. 1, Jan. 3, 2000, pp. 12-33.

Wikipedia, "List of refractive indices", https://en.wikipedia.org/wiki/List_of_refractive_indices, Dec. 7, 2003, 5 pp. total.

Williams III, T. W. , "Progress on stabilizing and controlling powered upper-limb prostheses", Journal of Rehabilitation Research & Development, Guest Editorial, vol. 48, No. 6, 2011, pp. ix-xix.

Willis, Karl D. et al., "Motion Beam: A Metaphor for Character Interaction with Handheld Projectors", CHI '11 Proceedings of the SIGCHI Conference on Human Factors in Computing Systems, May 7-12, 2011, pp. 1031-1040.

Yun, Xiaoping et al., "Design, Implementation, and Experimental Results of a Quaternion-Based Kalman Filter for Human Body Motion Tracking", IEEE Transactions on Robotics, vol. 22, No. 6, Dec. 2006, pp. 1216-1227.

Zhang, Cha et al., "Maximum Likelihood Sound Source Localization and Beamforming for Directional Microphone Arrays in Distributed Meetings", IEEE Transactions on Multimedia, vol. 10, No. 3, Apr. 2008, pp. 538-548.

"Supplementary Partial European Search Report dated Jun. 19, 2019; European Patent Application No. 16861058.2", dated Jun. 19, 2019.

Final Decision of Rejection for Japan Patent Application No. 2018-522056, dated Apr. 13, 2021, 7 pages.

First Office Action for China Patent Application No. 201680077473.9, dated Mar. 30, 2021, 26 pages.

First Office Action for Taiwan Patent Application No. 105135225, dated Sep. 22, 2020, 9 pages.

International Search Report and Written Opinion for International Patent Application No. PCT/US2016/059777, dated Mar. 31, 2017, 22 pages.

Notice of Reasons for Refusal for Japan Patent Application No. 2018-522056, dated Nov. 10, 2020, 5 pages.

Second Office Action for Taiwan Patent Application No. 105135225, dated Mar. 22, 2021, 12 pages.

* cited by examiner

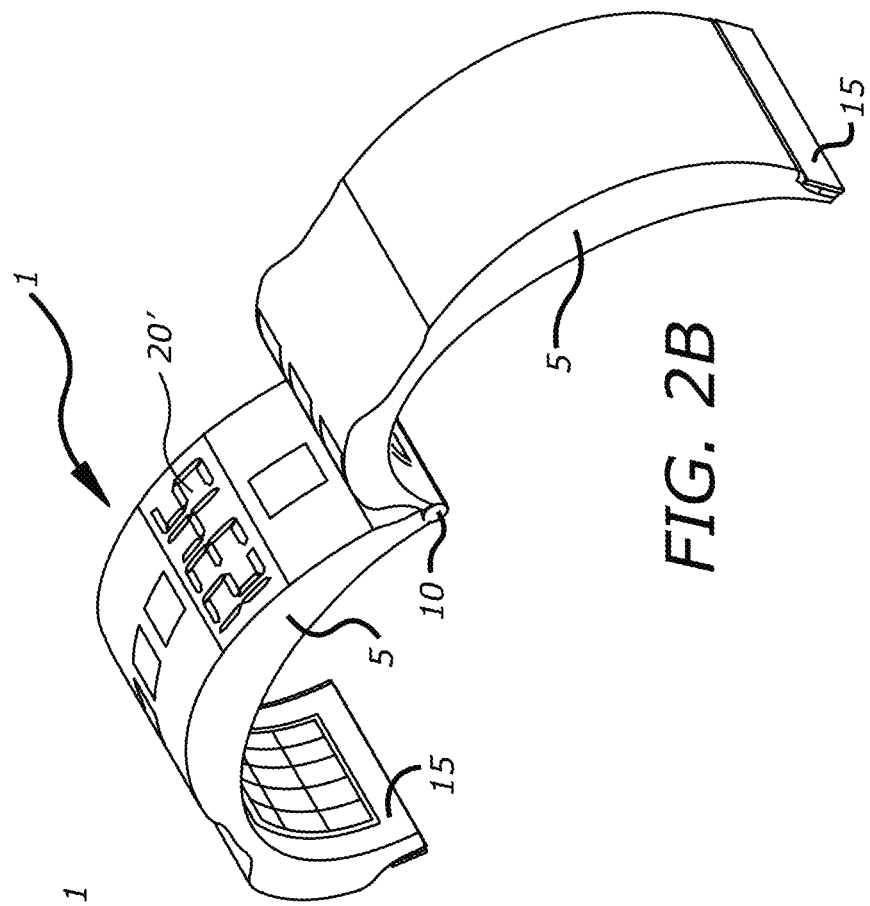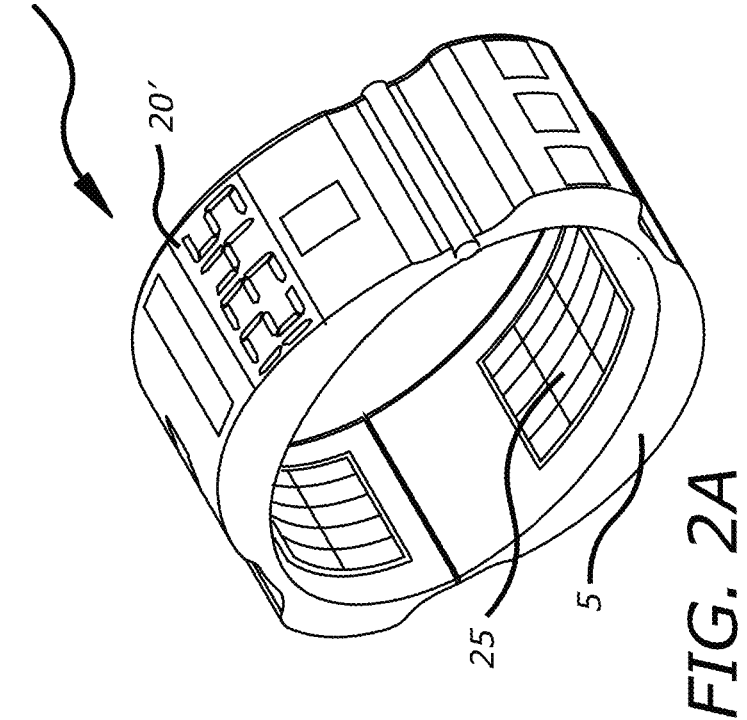
FIG. 2B
FIG. 2A

FIG. 7B
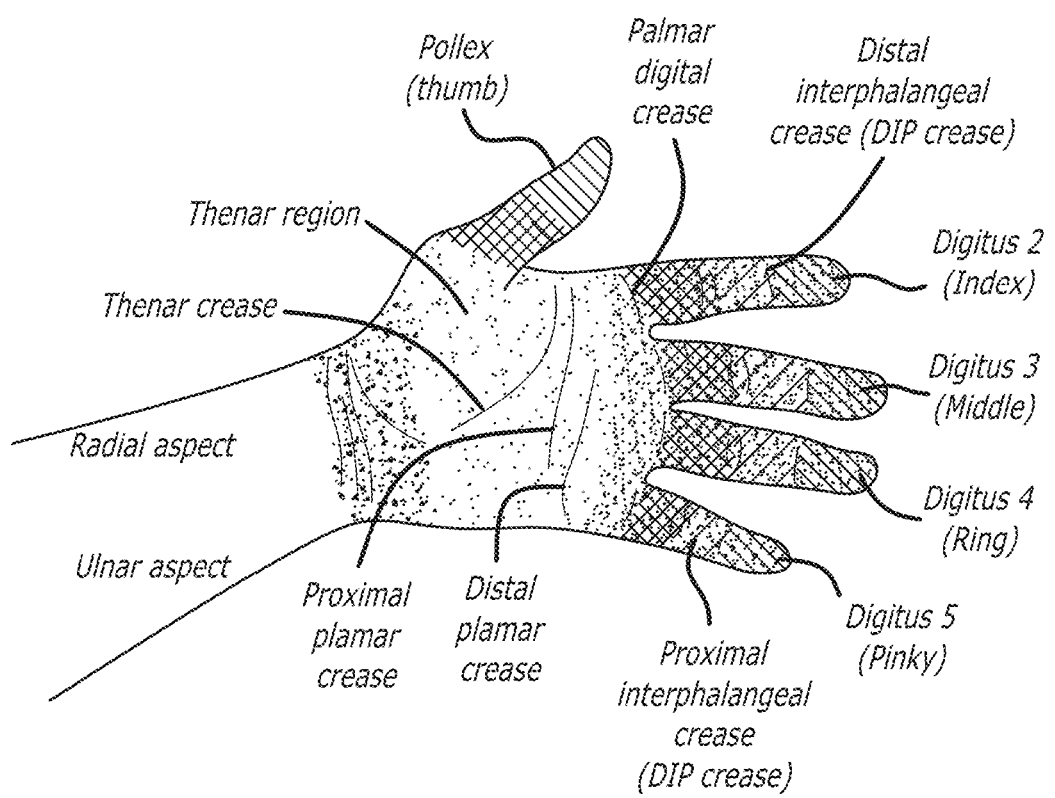
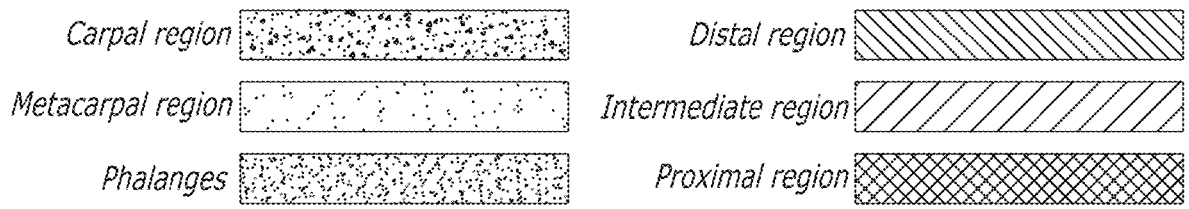

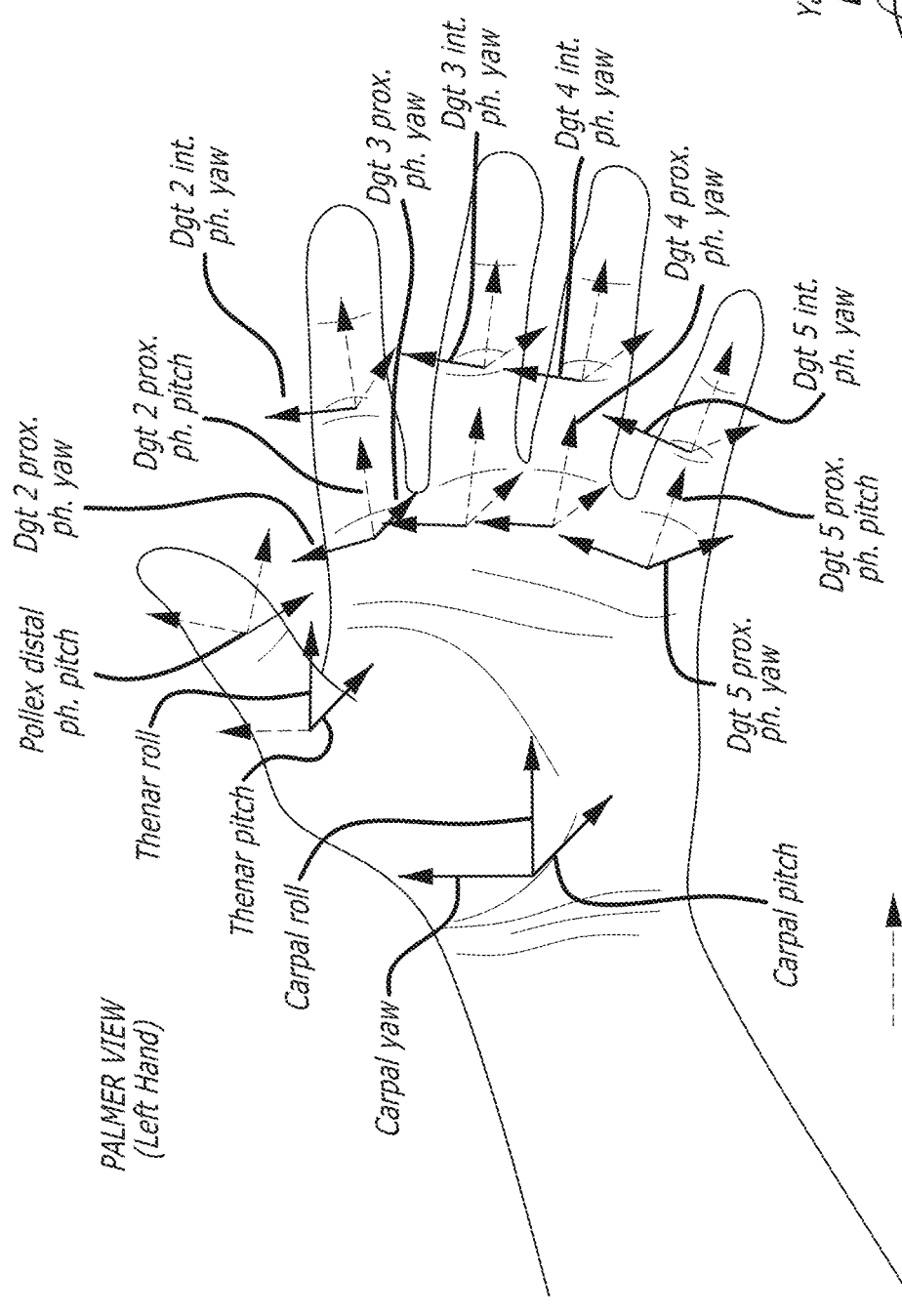
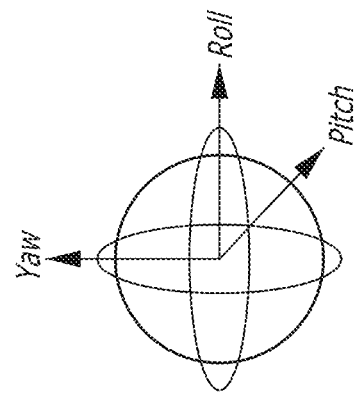
FIG. 7C

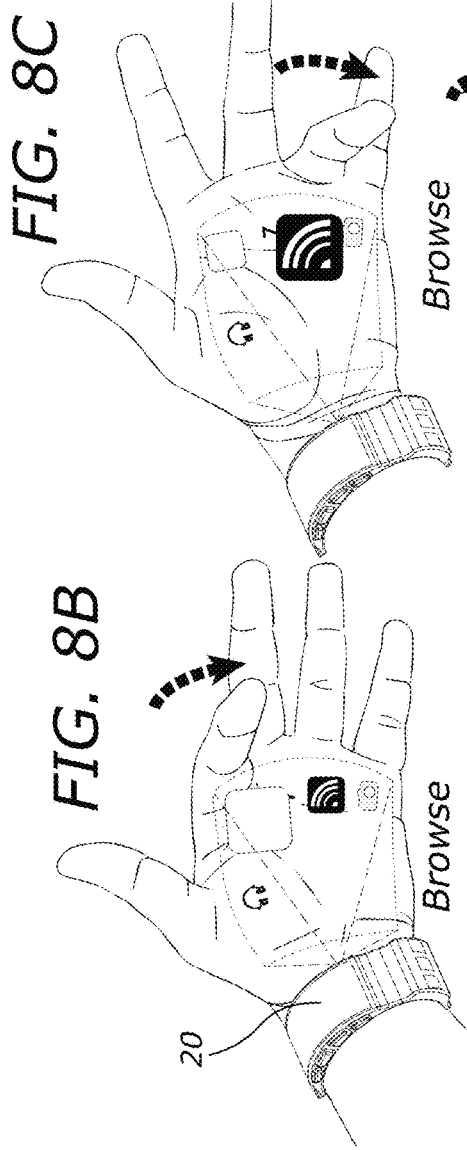
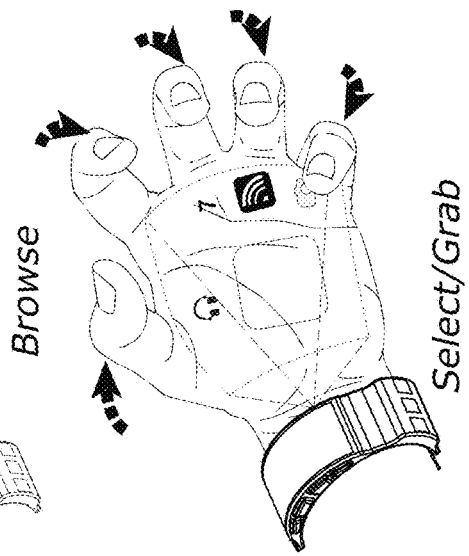
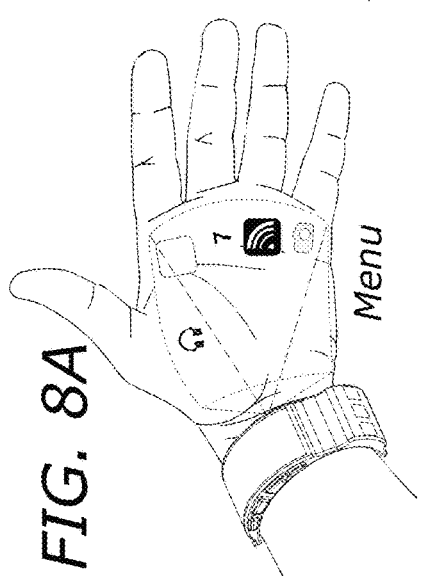
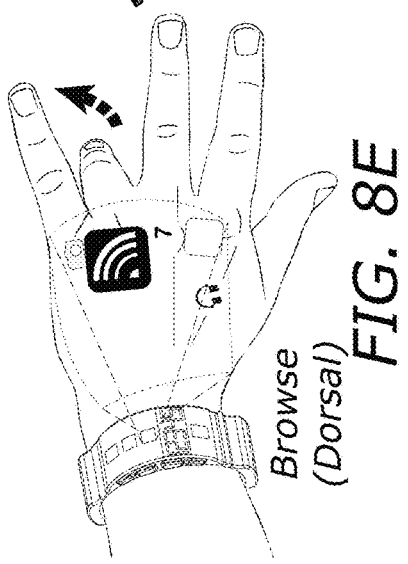
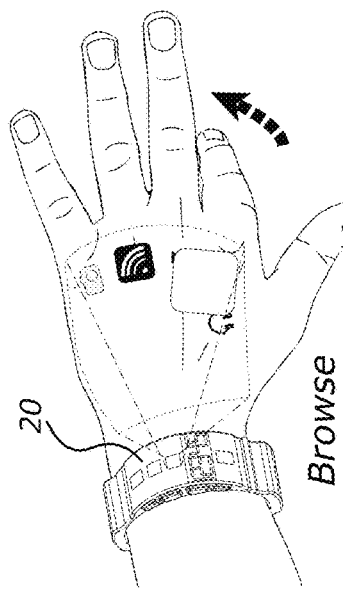
FIG. 8A — Menu
FIG. 8B — Browse
FIG. 8C — Browse
FIG. 8D — Browse (Dorsal)
FIG. 8E — Browse (Dorsal)
FIG. 8F — Select/Grab

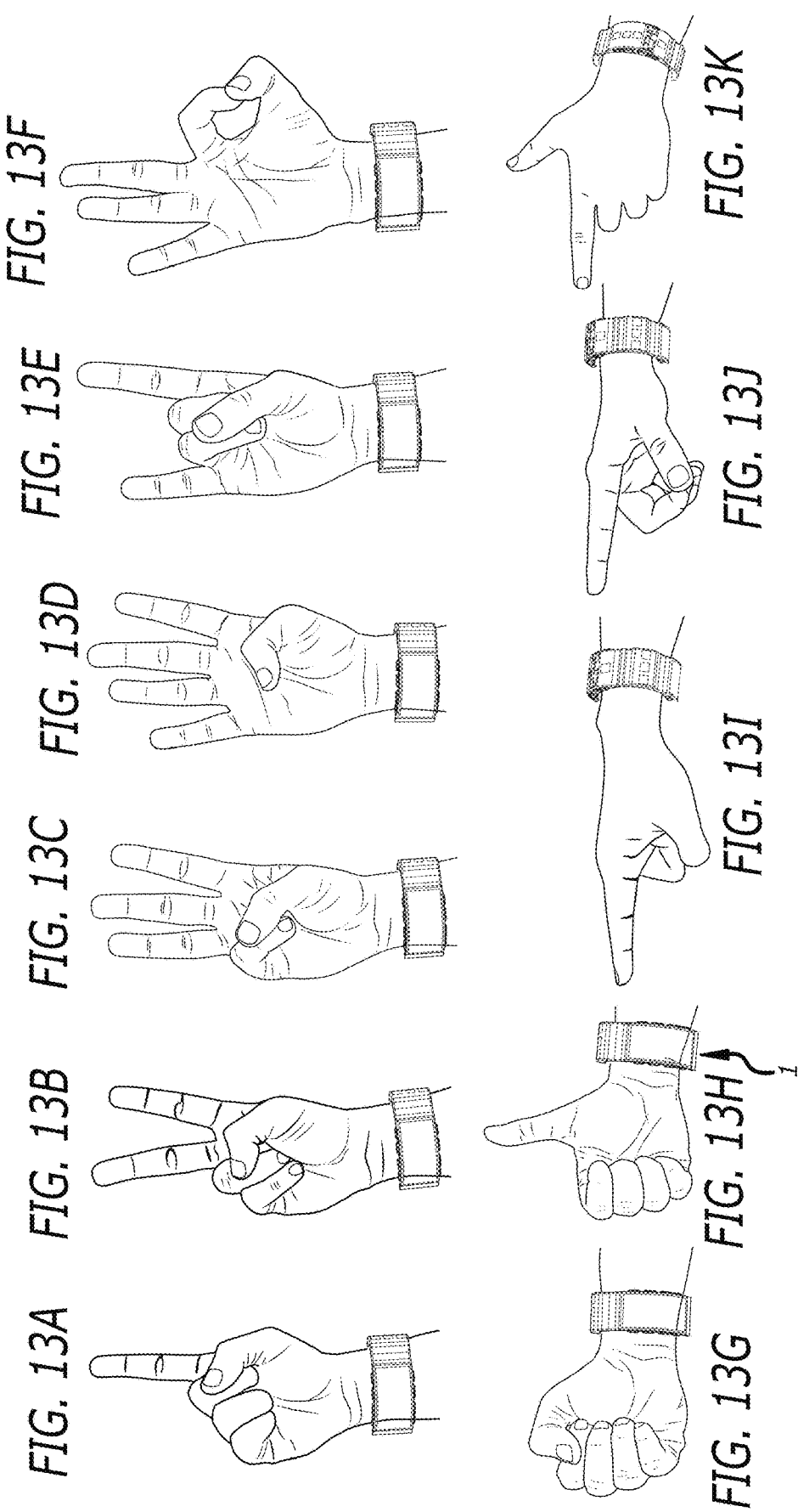

SYSTEM AND METHODS FOR ON-BODY GESTURAL INTERFACES AND PROJECTION DISPLAYS

CROSS-REFERENCE TO RELATED APPLICATIONS

This application claims the benefit of U.S. Provisional Patent Application No. 62/249,021, filed Oct. 30, 2015, the entirety of which is incorporated herein by reference.

BACKGROUND OF THE INVENTION

1. Field of Invention

The disclosure herein relates to the field of wearable technology, gesture recognition, augmented reality, human computer interface, human input devices, pico or micro display projection, biomedical imaging, ultrasound (also referred to as "US" herein) and sonography. More specifically, the disclosure herein relates to a system and methods for on-body gestural interface and projection display and a wearable device for generating a gesture command for controlling a computer, display, or other device using postures and gestures of a human anatomical feature. The postures and gestures are obtained using a ultrasonically mapped, spatio-temporal cross-section of the feature that has been correlated with a mathematical model based on pre-determined and user biological metrics of tissue objects comprising the feature.

2. Background and Related Art

The human-computer interface or interaction ("HCI") channel (sometimes referred to as a "human-machine interface" or "HMI") is known to have a limited bandwidth. In current HCI systems, users typically receive information through a display, screen or monitor which is the "human receive" channel, and transmit information back to the computer using keyboards/mice/other input devices, which is described as the "human-transmit" channel.

The receive channel has a bandwidth that can be considered proportional to the associated display resolution and color space. The transmit channel has a bandwidth limited by the alphabet size of the associated input device in cooperation with the physical and mechanical adeptness of the human user. Conventional display technology has increased in resolution even as new display technologies, such as volumetric light field (3D) displays have emerged, increasing the receive channel bandwidth by factors of thousands. Despite these advances, the transmit bandwidth remains limited as a result of non-intuitive mechanical interfaces or limited alphabet gestural interfaces that require training to develop proficiency in.

These problems in conventional solutions are magnified when considered in the context of mobile (smartphone) displays. Despite generally high resolutions of mobile device displays, the limited display space and visual acuity of the human visual system forces both users and designers to create new paradigms for human/machine interaction. This is exemplified by the use of multiple screens for navigating through applications with very few tactile virtual buttons. Also, ergonomic constraints in wearable technology limit maximum display size. This in turn creates problems where users that are used to large displays don't find it convenient to use or interact with much smaller displays, resulting in wearable devices that have both a low transmit as well as a low receive bandwidth.

The embodiments described herein provide a system and method that enables wearable image projection and a gesture recognition interface, resulting in a significant improvement in the core user experience as compared with similar conventional devices while addressing the channel bandwidth problems described earlier.

Computing devices are made useful by allowing a user to extract information from the internal states of the computing machine and by allowing the user to input commands to control the machine. Electronic displays are commonly used for information output while electromechanical keys, touch screens or keyboards are commonly used to input information to such computing devices.

As devices grow smaller, thinner, portable and wearable, there is reduced space and size available to both display information and to create comfortable interfaces for users to input information.

This has necessitated the development of multiple new interface technologies. For example, computers now commonly provide tactile (vibration or electrical), acoustic and/or temperature feedback output as well. Computers and mobile devices may also offer various non-traditional input technologies such as imaging modalities for machine-vision assisted gesture recognition, speech recognition, inertial motion sensing, electromyographic signals sensing, electroencephalic signals sensing, biomechanical strain sensors, hapto-acoustic signals sensing over biological media, deep brain stimulation sensing techniques (electrocorticography or intracranial electroencephalography) and non-invasive biological imaging sensing techniques (sonography, magnetic resonance imaging, x-ray imaging), along with miniaturized electromechanical switches to understand user intent.

One of the advantages of wearable computing systems is they are generally always available for immediate use. A wearable system that requires interactions with multiple buttons or touch elements before extracting useful content therefore fails to translate the advantage conferred by such intimacy. Display space available for wearable computing machinery is also remains limited. The aesthetic challenge of constructing a display large enough to be usable as a wearable device cannot be solved using existing display approaches.

With respect to input technologies, the system and methods of the embodiments described herein take advantage of an ultrasound transmitter and receiver (which when combined, are commonly known as a "transducer" or "transceiver") that can be worn on an anatomical feature of the user such as wrist or head, to map a spatio-temporal cross-section of the feature. Since the wrist contains a confluence of numerous musculoskeletal mechanical elements of the hand, thumb and fingers (i.e., flexors/extensors/abductors/adductors and tendons), their flextensional/extensional motion and tissue deformations can be readily detected using the disclosed ultrasound transceiver or transceiver array. The acquired spatio-temporal signal map of the embodiments described herein is correlated directly with a 3-dimensional (3-D), mathematically-modeled, mechanical posture of the wrist or selected anatomical feature with increased accuracy over existing devices. The modeled 3D mechanical posture of the wrist is used in connection with the obtained ultrasound cross-section map as a multi-state discrete or ratiometric input for computing systems.

The output of the embodiments described herein may comprise of one or more miniature optically-projected light displays, also referred to herein as "pico projectors". These pico projector elements are configured to use inputs from the input sensors of the embodiments described herein and devices to render and display an optically accurate light field on planar and non-planar display surfaces. The use of multiple pico projectors allows the system to use one or more on-body surfaces (e.g., the palm of a hand) or external surfaces upon which to project the displayed image.

In the case of conventional output technologies, visual displays generally have the largest information bandwidth as compared to other modalities (acoustic or tactile). Accordingly, displays are a preferred information receive channel for users. Nonetheless, the related information bandwidth is proportional to screen size and resolution such that small screen sizes and restrictions on human visual acuity limit the total information that can be transferred by conventional wearable technology.

Input technologies face similar restrictions and challenges. Electromechanical switch-based input technology still provides the highest information input bandwidth to a computing device and a good user experience. Unfortunately, the average available tactile area for users (from fingers) remains constant and miniaturization of tactile keys is not possible beyond a limited range. Touch screens based on various electronic modalities have become popular for the reason they do not take up space, but the touch input modality has a lower bandwidth as compared to electromechanical keys. Touch capability also becomes difficult to implement on increasingly smaller screen sizes used in wearable devices. Other input technologies are in various states of maturation, but largely use statistical methodologies to estimate user intent, generally resulting in a degraded user experience.

The following discusses certain imitations with respect to specific conventional approaches to gesture recognition and control in various commercial technologies.

Much attention has been given to machine-vision based gesture recognition. This includes the use of multiple imaging modalities, such as using different frequencies in the electromagnetic spectrum, patterned or shaped electromagnetic waves, multiple-perspective image capture, air-coupled ultrasonic emitters and receivers, radio frequency antenna arrays, etc. Such devices create 2D or volumetric images of the environment, then signal processing techniques are used to isolate the user from the background to recognize the user's gestures. Such approaches suffer from multiple deficiencies including:

1. These conventional approaches tend to capture user image information along with background image information and require significant hardware and software/processing effort to distinguish between the two. Distinctions are frequently made using statistical assumptions that show great variance.

2. These same approaches frequently fail to capture all of the input data required to estimate a posture of an anatomical feature because critical information is involuntarily occluded or not sensed by the image devices.

3. These approaches place restrictions on user clothing (e.g., no gloves, no sleeves, rings) and these approaches can be misled by objects in the user's hands and cannot be used by amputee users or those with certain medical disabilities.

4. In conventional applications that incorporate an external sensing scheme, such systems are not easily portable and related sensors must be affixed at very specific positions with respect to the user.

5. Many conventional solutions lead to repetitive strain injuries commonly known as "gorilla arm" and can be physically demanding on a user.

6. Conventional gesture recognition solutions often place restrictions on the user environment (clutter, background illumination, location of sensor with respect to floors) in order for the sensors to work accurately and many systems restrict a user's movements to be within specific locations or boundaries.

7. Conventional machine-vision approaches generally provide little or no feedback to the user in terms of what the actual field of view of the sensor is. This frequently leads to confusion when the user inadvertently steps out of the region accessible by the sensing camera.

8. Conventional machine-vision systems may use multiple camera setups and capture redundant datasets. This in turn, increases hardware requirements and latency even though a majority of the data is eventually discarded as background, reducing sensor efficiency and wasting processing power.

9. Conventional optical gesture-recognition systems also frequently experience artifacts that must be processed individually (for example, those from motion blur, lensing distortions, shadowing and illumination).

Another conventional approach to gesture recognition is based on sensors embedded in a glove-like enclosure. The sensors of this conventional approach typically measure deformation at joints in the limbs to yield posture estimates. The primary limitation with such a system is the requirement of wearing an uncomfortable and obtrusive glove-like system in which the elasticity of fabrics used in the glove design may negatively affect the posture estimates of the anatomical feature.

A more recent conventional input technology is described as bioacoustic sensing. This approach generally involves vibration sensors placed at certain locations on the human hand that measure vibration transmission information as a user touches or taps certain locations of their bodies. Some primary limitations of such bioacoustic systems are:

1. Such methods can only be used discriminatively. New gestures or tap locations cannot be distinguished, thus restricting both the resolution and the available number of gestures such systems can recognize.

2. Due to the vibration transmission requirement, this approach limits the apparel a user can wear while using such a system.

3. Bioacoustic systems require the use of two hands.

4. Sensors used in bioacoustic systems can only be placed at certain body locations based on tissue densities.

Certain other conventional gesture recognition technologies are based on electrophysiological signals extracted from the human body. Some common examples are electromyographic (EMG) signals, based on the electrical activity of muscles and technology based on electroencephalographic (EEG) signals which is based on electrical activity of the nervous system and the human brain. Invasive techniques to extract these signals, as are used in micro-electrocorticography, are not practical since they require surgeries or insertion of needle electrodes for placement and are only used as last-resort, condition-of-life improvement options.

Conventional non-invasive approaches to EEG or EMG may use surface electrodes placed around the head (for EEG) or specific muscles (for EMG). A practical problem for such gesture recognition approaches is that the science behind the generation of these signals is not yet well understood and most gesture recognition algorithms operate discriminatively. In non-invasive EEG/EMG systems, every new gesture requires a specific, recognizable electrical signal to be detected and trained for. This limits the total number of gestures that can be recorded by such systems. Another deficiency in these conventional approaches is that the related signals have very poor signal-to-noise ratios, leading to poor posture estimates. Because the required surface electrodes pick up averaged inputs from multiple tissues in different locations in EEG/EMG, these systems have a tendency to reduce the accuracy of gesture discrimination and also require the sensors be situated in regions with heavy electrical activity. The overall issues with accuracy and limited gesture discrimination capabilities of these systems tend to restrict their use to commercial applications.

Lastly, there are conventional inertial measurement and attitude and heading reference-based posture sensing systems that have been attempted but which suffer from many or all of problems earlier discussed in other conventional gesture recognition attempts.

In addition to the gesture recognition technologies discussed above, published literature exists on the use of wearable ultrasound transceivers for recognizing gestures as well as wearable miniaturized pico projection systems. The drawbacks of conventional wearable ultrasound gesture control and projection approaches are discussed below.

The following documents relevant to wearable ultrasound devices will now be discussed: U.S. Pat. No. 5,818,359, filed Oct. 10, 1996 by K. Beach; U.S. Pat. No. 6,984,208, filed Aug. 1, 2002 by Y. Zheng; U.S. Pat. No. 8,292,833, filed Jul. 21, 2010 by Y. Son; U.S. Patent Publication No. 2013/0041477, filed Aug. 1, 2012 by S. Sikdar et al.; and "*Dynamic Monitoring Of Forearm Muscles Using One-Dimensional Sonomyography System*", JRRD, 45 (1), 2008, by Guo, J Y. et al.). None of these disclosures account for pressure applied by mechanical fixtures or external contact while the device is being worn. Fixtures that prevent a wearable device from slipping across or along the human body anatomical feature invariably apply substantial pressure on the body part itself (for example, straps of wrist watches, ties, caps, belts for pants, elastic bands used in shorts). This pressure significantly alters, relocates, and deforms the sub-dermal tissue arrangements and structure of internal anatomical objects such as veins which are known to collapse under mild pressure or tendons that rearrange themselves in the proximal dorsal wrist surface region under applied pressure.

Such tissue rearrangements occur inconsistently between multiple wear-remove cycles and consequently affect ultrasound signal characteristics that are received from the anatomical feature. The attempts disclosed in the above references do not teach any method to control or mitigate the effects of the mechanical stresses on body internal objects and tissues that are generated by such fixtures. Neither do they discuss signal perturbations introduced when, for instance, the forearm and hand of a user are at rest or are supported against, or are in contact with, an external surface. Pressure against the upper arm above the elbow region significantly affects the signals through skin and causes tissue deformation of objects within the feature.

Human tissues have highly anisotropic and heterogeneous acoustic scattering properties. Consequently, minor rotational articulations of ultrasonic transceiver arrays resulting from slips or inconsistencies in re-placement of the transceivers can undesirably result in very large signal variations.

Another issue in gesture recognition applications is inertially-induced motion (including both static and vibratory deflections) in body tissues. Normal day-to-day motion and articulation of human extremities results in relative internal, inertial motion of its tissues with respect to an ultrasound transceiver or array. The inertial mass represented by the transceiver itself will influence inertial responses in the tissues in their immediate vicinity, potentially degrading signal quality due to mechanical deformations of the tissue under inertial loading.

When an anatomical feature comprising a joint (e.g., a wrist) undergoes rotation, there is a deformation at the creases about the joint and adjacent skin tends to wrinkle along with the tendons undergoing displacement perpendicular to the axis of the joint. This wrinkled skin/moving tendon structure applies outward pressure against an externally-worn object, such as a watch, band, strap or other wearable device. This is a particular problem when using a wearable ultrasound probe at the wrist that utilizes convex acoustic lensing, as this can cause the probe to rotate away from the cross-section of interest or to move in place. This in turn, degrades the return ultrasound signal quality due to anisotropy in the tissues. No solution to this problem is addressed in any of the identified previous literature.

An additional consideration not addressed by the conventional approaches is the effect of gravity itself. Human digits and body parts have substantial mass and their tissues are not stiff enough to resist involuntary deformation under the effects of gravity. Such involuntary deformations lead to problems in precise gesture recognition in all modalities. (28) Ultrasound is considered one of the safest imaging modalities currently available. However, this reputation for safety assumes mitigating US exposure risks by limiting dosage times and intensities and specifically tracking certain US performance indices. Ultrasound devices that require long-term insonification of tissues must pay attention to safety and provide fail-safe designs, although the conventional approaches discussed herein do not directly address safety-first design considerations.

In a wearable device application, most commercial-off-the-shelf ultrasound transceivers are impedance mismatched with the relevant transmission media (i.e., biological tissues). There exist some, for example, 1-3 or 2-2 piezoelectric composites, that provide improved impedance matching however such devices don't address the air-skin contour barrier and leakage through it. Practical implementations of conventional US transceivers either rely on gels/oils (See U.S. Pat. No. 6,984,208, filed Aug. 1, 2002 by Y. Zheng) or do not mention US coupling media at all (See U.S. Patent Publication No. 2013/0041477, filed Aug. 1, 2012 by S. Sikdar et al.), consequently presuming the use of gels, oils or a specific impedance matching media. The above-discussed US gel application would be required for every use before applying the transceivers and prior to any signal transmission. Obviously, the use of gels or oils is extremely inconvenient and not fitted for practical use.

From an algorithmic perspective, conventional attempts at gesture recognition use discriminative models, such as speckle tracking, normalized cross-correlation and weighted-average optical flow metrics against a set of reference or pre-defined gesture representations, such as stored in a look-up table ("LUT"), that are obtained from a training session for recognizing gestures over global images (or local sub-images) obtained after US scan conversion of pulse-echo/delay-and-sum data. Gesture recognition is performed using well-known, pre-trained classification algorithms if at all; otherwise simply the highest correlation scores are reported.

A critical flaw of these conventional approaches is they require a labeled, prior-training dataset where a user "classifies" or, for example, defines what it means to have a forefinger fully flexed. Users can rarely reproduce gestures with precision, leading to cumulative biases. This requires users to retrain the software and restricts users to certain pre-defined gestures. Such statistically-defined gestures where a computer doesn't naturally recognize a forefinger from a thumb, leads to frustrating user interface interactions.

Another problem in such approaches is that they are "referential" or discriminative and not generative. They thus have very limited alphabet sizes (i.e., total number of gestures that an implementation of an algorithm can distinguish between from the entire set of gestures and postures that users can actually generate) that are exactly defined by the gestures used during training. These gestures cannot be combined in ways to recognize a new gesture obtained from a combination of other gestures.

For example, moving a forefinger, moving a thumb, and moving a thumb and forefinger together each have unique representations in an ultrasound spatio-temporal signal space. These representations are not linear functions of basic gestures. Accordingly, training obtained by moving the forefinger and the thumb individually will not result in a linear method that identifies a condition where both thumb and forefinger are moved simultaneously. Therefore, the only way conventional approaches can increase alphabet size in such systems is by increasing the number of individual gestures defined during training. For example, moving a forefinger, moving a thumb, and moving a thumb and forefinger together represent three unique gestures that need to be trained for individually. This leads to two issues: One where detection of a gesture in every image frame requires computing scores over the entire training corpus, which leads to more computational complexity and decreased frame-rates with increased latency. And the second where large training datasets also force users to spend a longer time training the algorithm, which is tedious and unacceptable in commercial products. For example, instead of just training for a moving forefinger and a moving thumb, representing two gestures and using that information to estimate when both digits move simultaneously, conventional technologies require training for three individual gestures.

U.S. Patent Publication No. 2013/0041477, filed Aug. 1, 2012 by S. Sikdar et al. discloses the use of echogenicity of user anatomical features as landmarks such as bones for pre-targeting tissue and tendon locations. A critical problem with the disclosed approach is that specific locations of anatomical components are not consistently referenceable with respect to the landmarks across the population and they may not be visible throughout the measurement process. For example, despite pollicis longus being present in most users, it might not be in a specific location with respect to a landmark such as the ulnar or radial bones in the users. Therefore, pre-targeting based on static landmarks does not work well for algorithms for gesture recognition.

Algorithms used in state-of-the-art US gesture recognition literature often rely on image processing. This is evidenced by the extensive use of the normalized cross-correlation metric used in traditional image-based pattern matching. Image processing undesirably requires the use of 2D US image formation that occurs during a process called "scan conversion" in US post-processing at the backend. This process introduces spatial and temporal interpolation and aliasing artifacts, does not directly represent or take advantage of the raw US data obtained from the echography nor is scan conversion even required in non-imaging applications. Such image formation/scan conversion introduces unwanted hardware and latency overheads; for example, memory buffers to store frames and the time to store, retrieve or access the buffers.

Conventional gesture recognition generally assumes human physiology to be static when in fact it is not. This assumption is illustrated by the frequent use of static, one-time training references obtained in conventional algorithms. Therefore, senescence (aging), ontogenetic (developmental) and lifestyle-related changes are not accounted for by conventional approaches.

Additionally, none of the above-discussed gesture recognition references teach the use of radiography techniques in any diagnostic or general healthcare modalities. Furthermore, none provide interface technologies that are explicitly a part of their gesture recognition algorithms beyond simple message display. Such methods use center frequency methods and their techniques are based on pulse-echo and delay and sum modalities. They further use a non-instrumented approach to their algorithms wherein their measurement process does not get affected by the nature of their measurements.

U.S. Pat. No. 8,292,833, filed Jul. 21, 2010 by Y. Son claims to locate a device on the 'wrist' and image the 'carpal tunnel'. The device is understood to image the flexor tendons in the tunnel and associate a waveform with return signals obtained from the transceiver. The device of U.S. Pat. No. 8,292,833 is understood to recognize if a user has moved a digit using signals from inertial measurement units that supposedly correspond with finger flexions.

There are several problems unique to the implementation of U.S. Pat. No. 8,292,833. Tendons are compressed together in the carpal tunnel region. All tendons tend to move together sympathetically (because of the enclosed nature) in the tunnel. Wrist or elbow articulation about either pitch, roll or yaw axes results in deformations at the carpal tunnel resulting in apparent motion of the tendons as well. Accordingly, acquired signals suffer from heavy sympathetic masking and aliasing in this approach. Additionally, any articulation of any digit requires at least two tendons (a flexor and an extensor) working antagonistically—a finger in extension will result in little distortion of the corresponding flexor and vice versa. Since the extensor tendons do not normally pass through the carpal tunnel and since muscle groups engaged in digital articulation such as abductor pollicis brevis or lumbricals, this in effect severely limits the actual postures that can be sensed with such an approach.

Inertial measurement sensors used in gesture recognition systems that are mounted on a wrist in the earlier-cited references are configured to detect absolute rotations, orientations or accelerations particular to the wrist location. Consequently, they pick up inertial responses from both wrist articulation and forearm motion, in addition to those from individual fingers. The references do not present any solution that distinguishes between such inadvertent activation, neither is any related general purpose algorithm known to exist in literature. In general, due to the under-determined nature of such systems, inertial measurement alone cannot solve such problems.

Wearable projection systems are also discussed in the following documents: U.S. Publication No. 2012/0249409, filed Mar. 31, 2011 by A. Tony et al.; U.S. Pat. No. 8,619,049, filed May 17, 2011 by C. Harrison et al.; U.S. Patent Publication No. 2010/0199232, filed Feb. 3, 2010 by P. Mistry et al. None of these discuss meaningful detail of the projection technology used. State-of-the-art wearable or miniaturized "pico projection" approaches can be based on four technologies, laser scanning, liquid crystal on silicon (LCoS), digital light projection (DLP) or micro emissive OLED technology.

Micro emissive OLED technology is not considered a useful modality for pico projection since it does not generate sufficient light output or brightness for practical projection to take place. DLP/LCoS both require combinations of illumination LEDs, collimation optics, combination optics, homogenizers, beam-splitters, polarization recirculation systems, all in addition to spatial light modulator units, projection optics assemblies, power driver integrated circuits and pixel modulation integrated circuits—these introduce constraints on minimum volumetric footprints that such light engines can have.

Laser scanning technologies have issues with speckling that require the use of optical and photonic diversity to reduce speckle contrast in the projected images and require the use of additional hardware. LEDs and laser diodes used as illumination sources in such systems take up volume and require extensive thermal management subsystems. Sizes of such devices can only be managed by reducing the total light output of such systems and even then, the system volume cannot practically be reduced much further, limiting adoption in wearable technology systems.

As is apparent, conventional wearable gesture recognition and projection systems are based on technologies that do not conform well to wearable device form-factors or are severely restricted in allowable designs. This also constrains the design of systems with multiple embedded pico projection elements and restricts designs to those intended for displaying projected images on a single surface.

Conventional attempts do not consider that many projection surfaces (e.g., human skin) have inconsistent optical characteristics. Projected light on a user's skin surface is transformed by a non-linear gain function based on the optical characteristics of the skin surface, the ambient illumination of the room, as well as the posture/gesture of hand. Screen-gain and ambient illumination are already significant challenges for on-wall projection displays and are generally solved by using high intensity lamps, and on-body projection constrains make such display quality even more challenging.

Conventional art pico projection approaches do not account the fact the geometry of a projection surface for a wearable device may not be planar and may be on a 2D skin surface with 3D time-varying deformations. Any motion of tendons under the skin surface and any soft-tissue deformation causes the reflection of projected light in multiple directions, creating loss in contrast as well as loss of efficiency and brightness. The problem becomes more difficult if the body part upon which the display is projected undergoes a posture change during display.

A common assumption made in pico projection technology is that the intended projection surface is, or will be, perpendicular to the projected light. If the projection surface is rotated in-plane, then it is rotated by a consistent angular value. This is used in keystone correction. But on-body surfaces will likely have multiple non-linear curvatures and none of the conventional approaches account for this. Accounting for such non-linear curvatures requires conversion of image resolution from linear to non-linear and must be accounted for physically in the display technology or by using software warping algorithms which are known to reduce the effective resolutions used in such displays.

Certain conventional approaches claim to use gesture recognition technologies that do not return information about actual tissue deformation. For example, U.S. Pat. No. 8,619,049, filed May 17, 2011 by C. Harrison et al. discusses the use of bioacoustic sensing whose deficiencies were discussed earlier. U.S. Patent Publication No. 2012/0249409, filed Mar. 31, 2011 by A. Toney et al. speculates on the use of low resolution technologies that do not provide actual posture recognition with any fidelity. Accordingly, these conventional solutions do not provide high resolution means to account for posture-induced, soft-tissue deformation.

As noted, the conventional approaches discussed above use discriminative approaches to recognizing gestures as opposed to using generative models. For example, U.S. Patent Publication No. 2012/0249409 requires the use of predefined activation positions, and U.S. Pat. No. 8,619,049 uses discrimination-based prior training data. This limits these approach's interaction modalities and projection capabilities greatly.

What is needed is a gesture recognition and pico projection system and method that addresses the above deficiencies in the conventional approaches and that provides high resolution gesture recognition that takes advantage of the large gesture alphabet of the human hand and wrist or other anatomical features.

BRIEF DESCRIPTION OF THE DRAWINGS

FIGS. 2A-B Illustrate an embodiment of an example system in an open and closed position respectively, where the system may be worn on a user's wrist or forearm.

FIGS. 7A-C Illustrate various anatomical references used to describe 3D motion of the parts of a human hand according to one example embodiment.

FIGS. 8A-F Illustrate representative gestures made using the five digits of a human hand to interact with display content projected on to its palmar or dorsal surfaces according to one example embodiment.

FIG. 13A-K Illustrate a variety of exemplar combinations of finger and wrist postures including orientation of the forearm recognizable by a system according to one example embodiment.

DETAILED DESCRIPTION

Figure 1A:
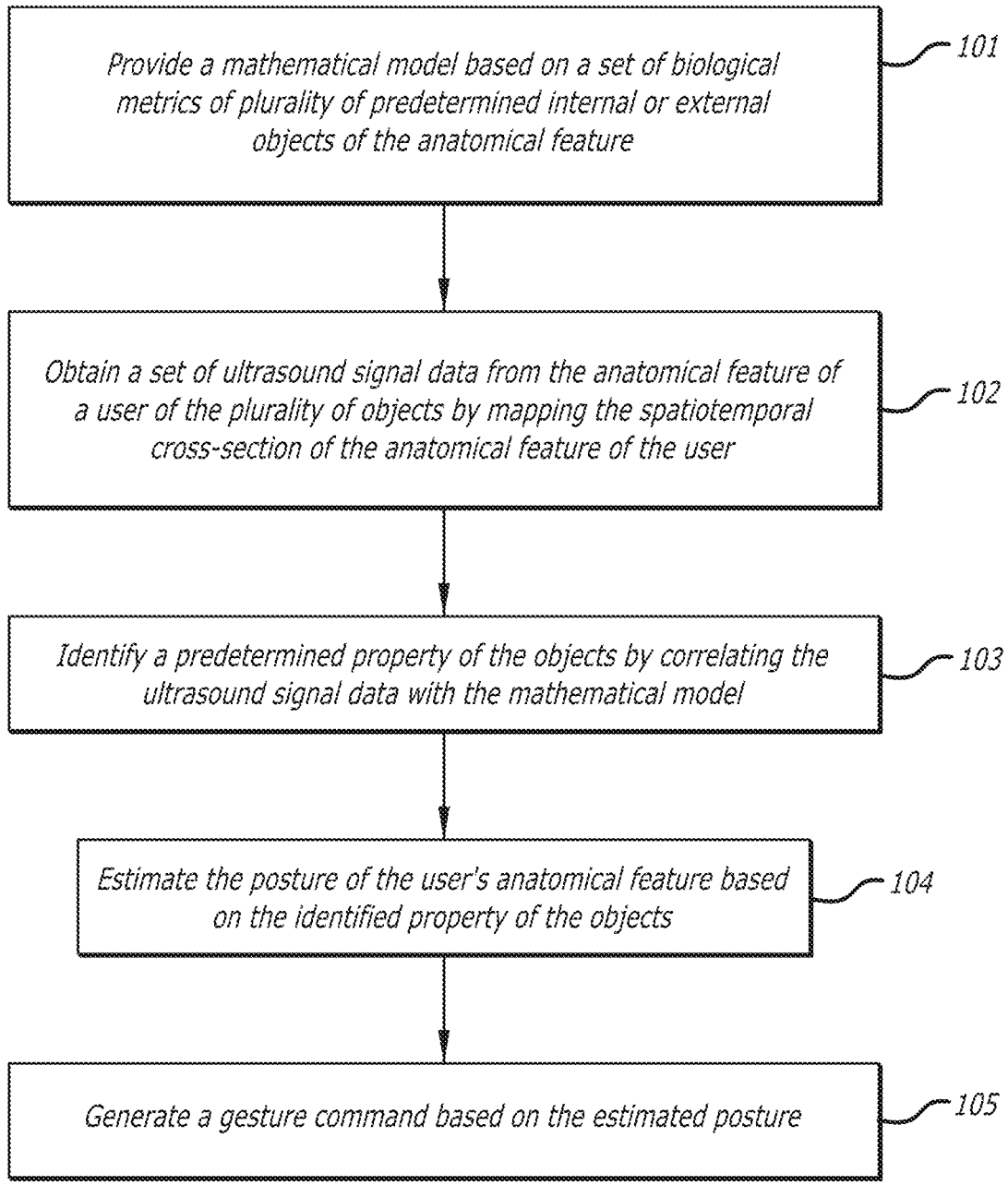
FIG. 1A Is a flow chart illustrating a set of steps in a method according to an embodiment described herein.

To overcome the limitations described above, the system and method of the embodiments described herein enable a wearable and mobile gesture recognition system comprised of a plurality of projection and traditional display systems while obtaining high fidelity user gesture input using a plurality of ultrasound transceivers and sensor elements.

In an embodiment, the system may be worn on the wrist while display projection surfaces are provided by the dorsal and volar aspect of the hand. In this embodiment, user gesture inputs are received by articulating the wrist, hand, finger and thumb postures, and a US spatio-temporal cross-section map of the anatomical objects comprising the wrist is acquired, a posture estimated and converted to executable computer instructions. The executable computer instructions are obtained using a mathematically-modeled, simulation-based gesture recognition system method, which system and method may also receive inputs from one or a plurality of user-defined mechanical and electronic sensors.

For purposes of the instant application, the term "posture" refers to the static or instantaneous dynamic position, orientation or both, of one or a set of human anatomical features. By way of example and not by limitation, a posture may include the position or orientation or both, of a human hand, wrist, thumb and fingers such as where the index finger is extended substantially horizontally and the thumb and remaining fingers are held close to the palm of the hand in a "pointing" position. These postures are identified uniquely by a combination of the states or values of degrees of freedom (DOFs) at each joint as shown in FIG. 7.

Another example of a posture may include an orientation wherein the fingers and thumb of the hand are held upward and against each other with the flattened palm facing vertically outward as might be exhibited as a command to "stop" or "halt".

For purposes of the instant application, the term "gesture", may refer to an individual posture, as earlier defined. Further, the term "gesture" may refer to a set of individual postures that are serially assumed, either statically or at instantaneous points along a motion path, i.e.; a set of instantaneous postures comprising a motion path of a human anatomical feature such as the waving of a hand from one angle wrist position to one or a plurality of different angular wrist positions along the motion path. A further example of a gesture may include the closing or clenching of a fist from an open palm position to a closed position. A unique gesture may comprise of multiple unique transitions between multiple sets of states or values of degrees of freedom of the joints, i.e., postures.

As can be envisioned, a dynamic gesture (i.e., movement) can be recognized if the set of individual postures that comprise the gesture can be identified. Because of the number of, and the many degrees of freedom of, the joints of the wrist, fingers and thumb of a human hand, it is readily apparent there are many possible static or instantaneous dynamic postures and gestures that a hand, fingers and thumb can assume.

It is expressly noted that while the described examples of a posture and gesture herein are with respect to a human hand, fingers, thumb and wrist, the terms "posture" and "gesture" are to be regarded as applicable to all aspects of human and non-human animal anatomy including without limitation, the face, neck, head, arm, elbow, shoulder, spine, hip, leg, knee, or ankle of a human or animal.

One embodiment disclosed herein utilizes, in part, a novel mathematical model of the selected human anatomical feature comprising a predetermined "object" data set that is mathematically representative of the internal and external human tissue elements ("objects" herein) that make up the anatomical feature as a baseline data set for generating the mathematical model. The predetermined object data set may be provided by downloading the data set to the system from the "cloud" or other external data storage medium or source.

The object data set is representative of a plurality of user-defined biological or biomechanical characteristics or metrics (collectively, "biological metrics") of predetermined internal and external tissue objects of the relevant anatomical feature and is used as the initial set of variables to develop the model of the objects that comprise the anatomical feature.

In one embodiment, a model is provided which mathematically describes the anatomical feature and its tissue objects using the object data set of biological metrics and equations to establish a large number of mathematical relationships between the biological metrics and thus the objects. The model may comprise any combination of governing, constitutive or kinematic equations and constraints as is known to persons reasonably skilled in the mathematical modeling arts.

The object data set may be representative of one or a set of average or typical biological anatomical feature metrics for a selected subset of the human population, such as by weight, height, gender, age, ethnicity or any user-defined subset of the human population. The object data set may include any combination of user-defined biological metrics. By way of example and not by limitation, the object data set may comprise a set of biological metrics (e.g., physical, physiological or biomechanical) for a plurality of internal or external body structures, tissues or elements. Objects may comprise, for instance and without limitation, muscles, tendons and ligaments, bones, blood vessels, epidermis or dermis or any combination of such objects.

The object data set may comprise a user-defined set of biological metrics of the objects, which metrics may comprise any one or combination of, for instance, object location, its relative location to another object in the anatomical feature, maximum expected object displacement or deformation, object range of motion, relative range and angle of motion with respect to other objects in the anatomical feature, object degrees of freedom, radius, circumference, echogenic (i.e.; ultrasound) properties, elasticity, shape, length, thickness, width, cross-sectional geometry, or density or bone processes and other biomechanical features properties or properties capable of being mathematically modeled including such as by finite element analysis (FEA) or deformable dynamic mesh analysis.

In one aspect of the method shown in FIG. 1A, a method for generating a gesture command to a computing device or processing element in a human-computer interface system is disclosed. At block 101, a mathematical model of a plurality of predetermined internal or external objects of an anatomical feature of a user is provided. In the illustrated embodiment, the anatomical feature is a human wrist. The mathematical model provides the technology to simulate ultrasound measurements from any arbitrary configuration of such objects in the human body and to compare the simulated measurements with practically measured ultrasound data obtained from block 102 and assess the fitness of the model and the arbitrary configuration in predicting the actual configuration of the objects.

At block 102, a set of ultrasound signal data is obtained from the anatomical feature of the user of a plurality of internal and external biological elements, structures, features, i.e., "objects" (e.g., bone, muscle, tendons, etc.) by ultrasonically mapping a spatio-temporal cross-section of the anatomical feature of the user.

At block 103, at least one predetermined property of the object or objects of the anatomical feature of the user is identified (e.g., deformation, velocity, shape, position, among others) by correlating the ultrasound signal data with the simulation results obtained from the mathematical model of the configuration of objects. At block 104, a posture of the user's anatomical feature is then estimated based, at least in part, on the identified property of the object or objects.

The posture estimation of the method may be further based on receiving a sensor output from a sensor element that is configured to measure at least one of a predetermined event, environmental or physical change or state of the user.

The sensor element of the method may be comprised of one or more of the group of an accelerometer; a gyroscope; a pressure sensor; a GPS sensor; a microphone; an electromagnetic imaging sensor; an ambient light sensor; a color sensor; an angular sensor; an electrophysiology sensor; an EMG sensor; a bioacoustic sensor; an RFID antenna; an ultrasonic ranging sensor; a high frequency transceiver array; an electromagnetic field and a proximity sensor.

In the embodiment of FIG. 1A, the method may further generating a predetermined executable computer instruction or command based on the estimated posture or postures and the identified gesture at block 105.

The computer instruction of the method may be configured to modify a display information on a computer screen or to modify a display information projected on a surface, which surface may be the non-linear surface (i.e., skin or clothing) of a human anatomical feature.

In a further embodiment, the system may be used without being worn and any available surface, such as a wall or table, may be used as the projection display surface. In such case, the user inputs may be received through a selection of electro-mechanical switches and electromagnetic/mechanical vibration sensors that are embedded in the band element of the system. In another embodiment, the system can be used to monitor biometric and health data of an anatomical feature over computer networks or using onboard systems by transmitting the identified property of the object over a computer network to a remote location for analysis by a healthcare professional.

Figure 1B:
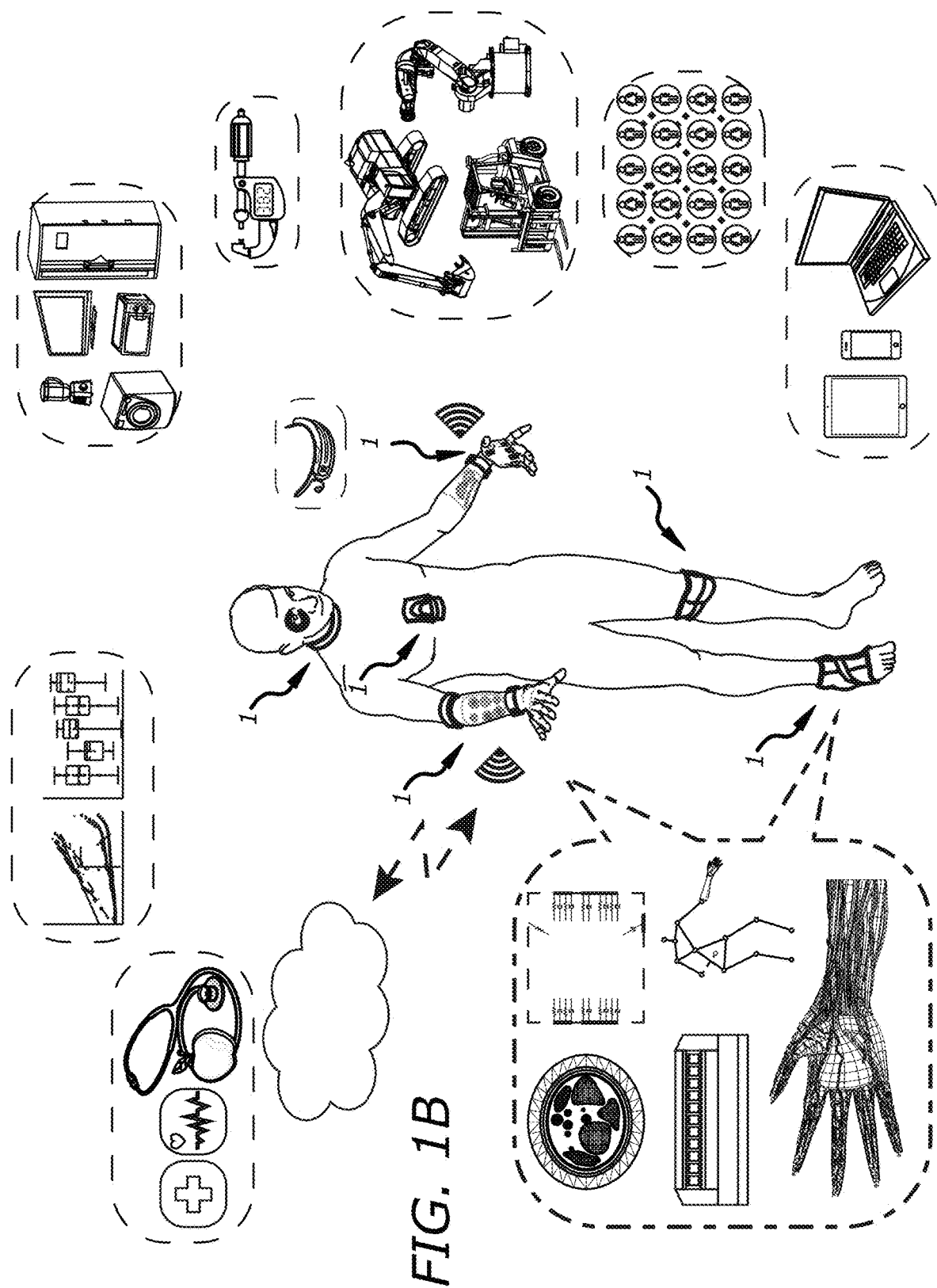
FIG. 1B Depicts a user wearing a system according to one embodiment on multiple body parts ("anatomical features" herein such as a human hand, wrist, elbow, head, etc.).

FIG. 1B is a non-limiting illustration of certain embodiments of the wearable system 1 that may be worn on, for instance, a human wrist, forearm, upper arm, on either left or right arms, or around the neck, or affixed near the eye or to any region across the torso. System 1 may also be worn around the thighs, knees, ankle, on either the left or right legs or feet. In some embodiments or applications of the embodiments described herein, such as those used for medical applications, system 1 need not include image display or projection elements.

Other embodiments may be configured to receive and send data using a smartphone or mobile device or over wired or wireless networks. In another modality, the system may be provided with pico projection display modules and may have one or more fixed displays, for example, LCDs. As shown in FIG. 1B, in some embodiments, one or more systems 1 may be used in combination. In these embodiments, systems 1 are in communication with each other to share information.

FIGS. 2A-2B illustrate an embodiment where a system (such as system 1 shown in FIG. 1B) is worn around a wrist. When worn around the wrist, system 1 may comprise a band element 5 for wearing about the circumference of a wrist and comprises a hinge 10 and latch 15 as shown. System 1 may also include one or more ultrasound (US) transceivers 25, as well as electronic LCD displays 20'.

While band element 5 is described for purposes of illustration, it is noted that a generally planar structure can be affixed to the surface of a human anatomical feature such as a torso rather than a band element 5 and such a structure is contemplated as falling within the scope of the claims herein.

Figure 3:
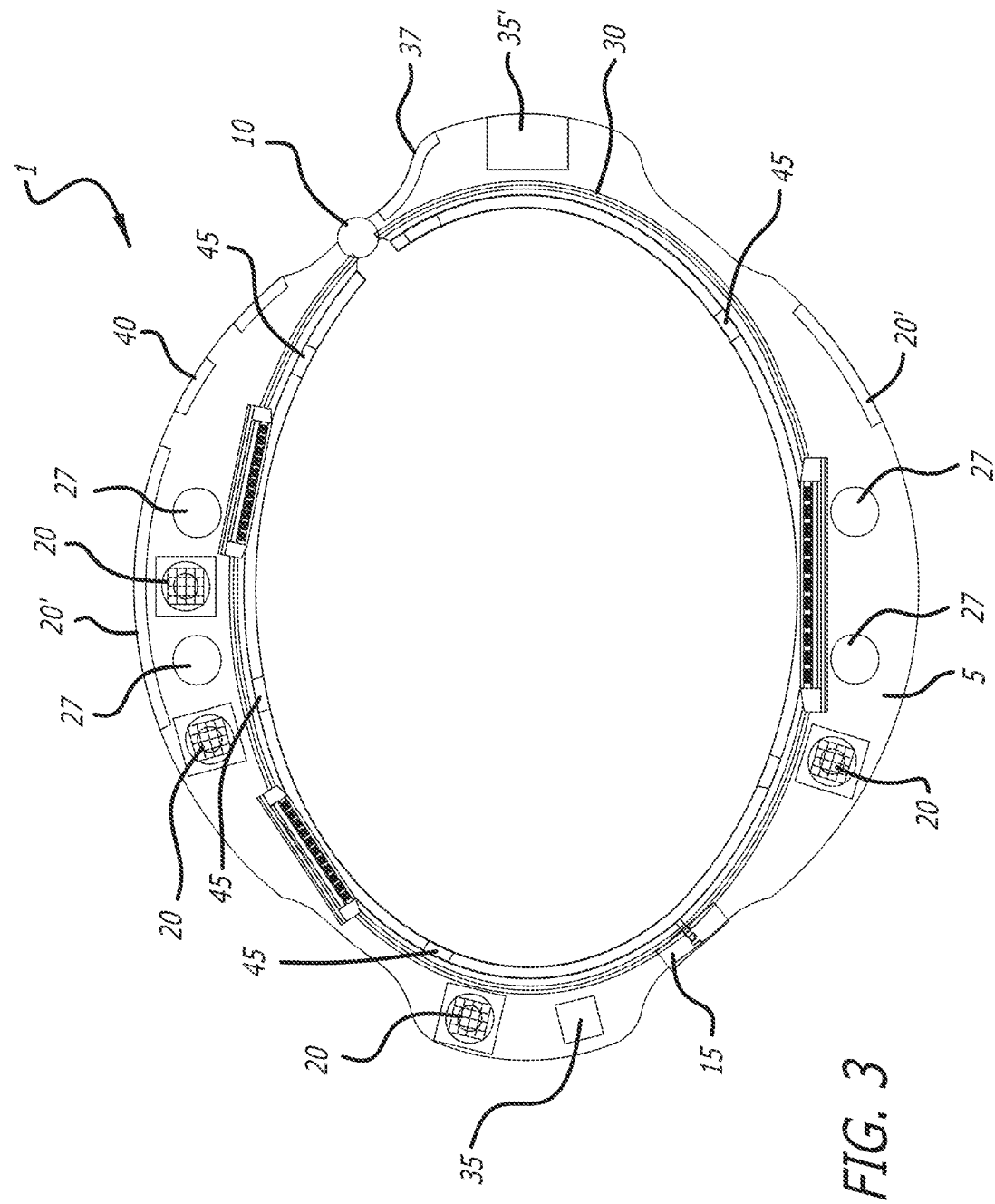
FIG. 3 Illustrates various sub-systems that may comprise an example embodiment of a system.

FIG. 3 illustrates exemplar representative hardware subsystems that may comprise system 1. A first projection display component may be a miniaturized display projection module, referred to herein as a "pico projector" 20. As a representative example, FIG. 3 depicts multiple pico projectors 20 and electronic LCD displays 20' disposed at predetermined, spaced-apart locations around the surface of the external circumference surface of band element 5.

One or multiple ultrasound ("US") receiver/transmitters or US transceivers 25, (which may be in the form of US transceiver arrays comprised of an array of US transceiver subunits) are disposed at predetermined, spaced-apart locations around the interior circumference surface of band element 5. Transceivers 25 are coupled to electronic and processing circuitry configured to enable the transmitting and receiving of ultrasound energy and configured for the mapping of a spatio-temporal cross-section of the subject anatomical feature.

System 1 may further comprise common electromechanical input system elements such as buttons, switches, wheels, and touch surface elements 27 for inputs to system 1. System 1 may comprise variable-tension latches 15 and hinges 10 to introduce an electronically-controlled variable tension in band element 5. Latches 15 and hinges 10 may be configured to sense and provide pressure-based haptic feedback to a user.

System 1 may comprise one or more polymer acoustic layers 30 functioning as an interface and disposed between band element 5 and the user's skin. Acoustic layer 30 is designed to provide user-defined acoustic attenuation, thermal isolation, and to create soft and continuous contact with a user's skin to facilitate a compliant interface between the skin tissue and system 1.

System 1 may comprise one or more color RGB cameras 35 comprising pixel arrays configured to capture a user's skin tissue tone and color and/or the ambient illumination around the user. System 1 may comprise additional cameras and optics subassemblies 35' for the purpose of user-defined digital image acquisition. One or more portions of band element 5 may be used for I/O for wireless antenna communication 37 of system 1.

System 1 may comprise one or more speaker/microphone subsystems 40 arranged in a user-defined pattern for the purpose of sound output, capturing user speech or for estimating user head location. System 1 may comprise one or more vibration feedback systems (not shown) arranged in an array or grid to provide vibro-tactile feedback to a user.

As depicted in FIG. 3, the system may comprise one or more temperature sensor mesh arrays 45 coupled to a user's skin or to the internal system temperature of the user's body. Temperature sensors 45 may be provided as a mesh array to monitor the user's internal body or tissue temperatures for fail-safe thermal monitoring.

Figure 4:
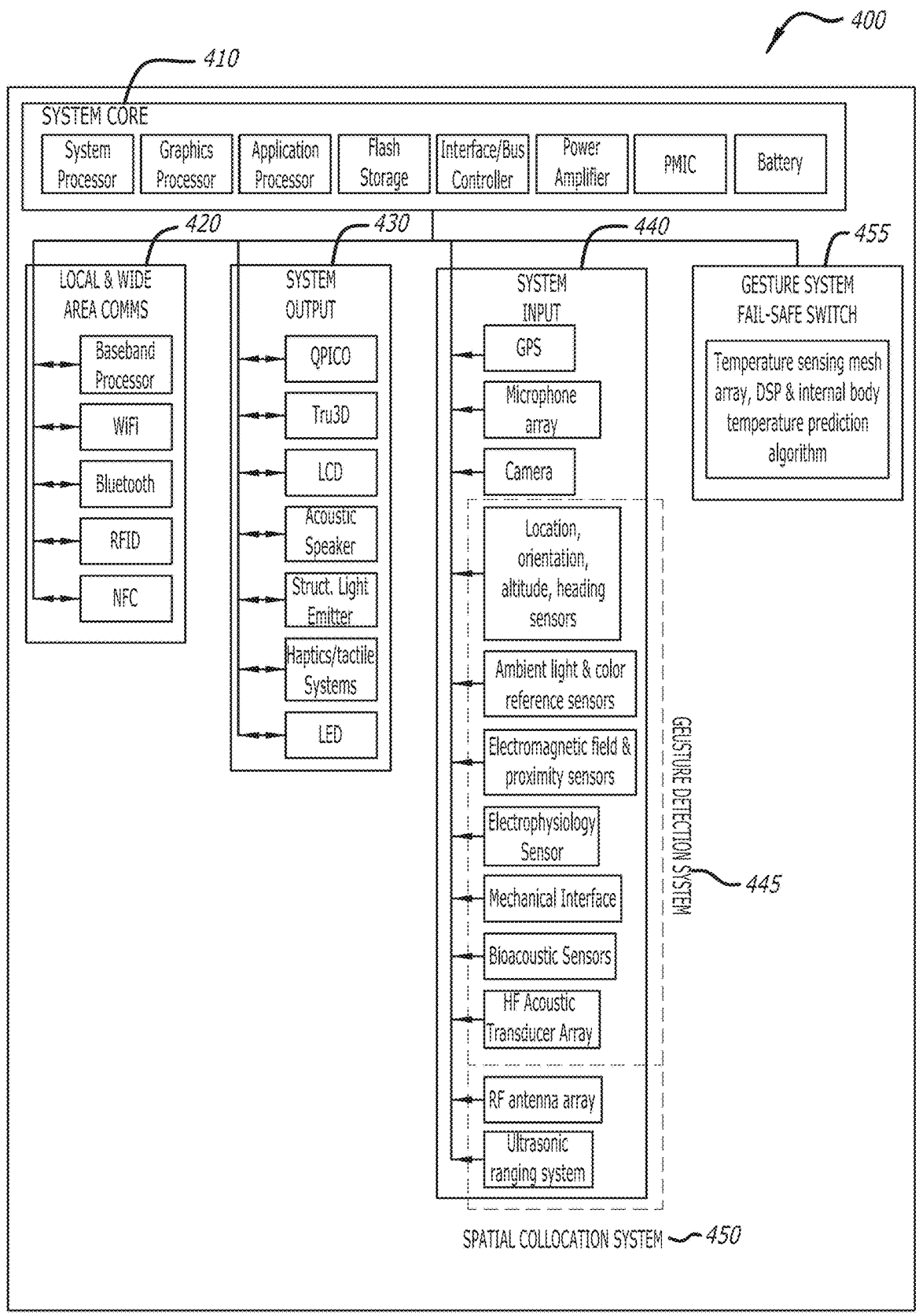
FIG. 4 Depicts an example system architecture of a system according to an embodiment.
Figures 5A, 5B:
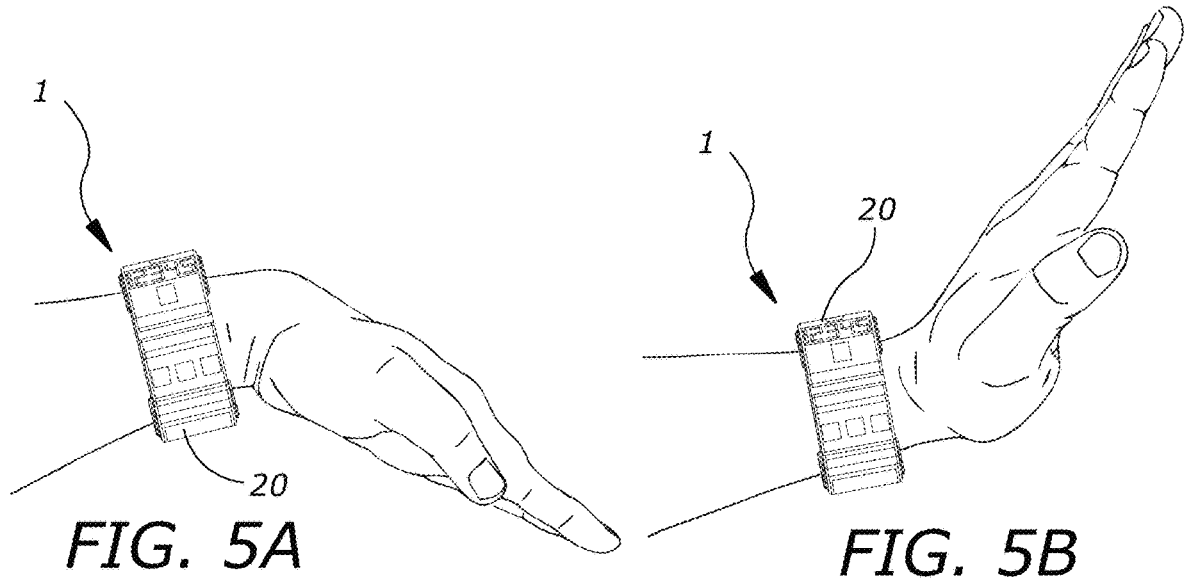
FIGS. 5A-D Show various body surfaces upon which display projection may occur simultaneously or singularly according to an embodiment of the system.
Figures 5C, 5D:
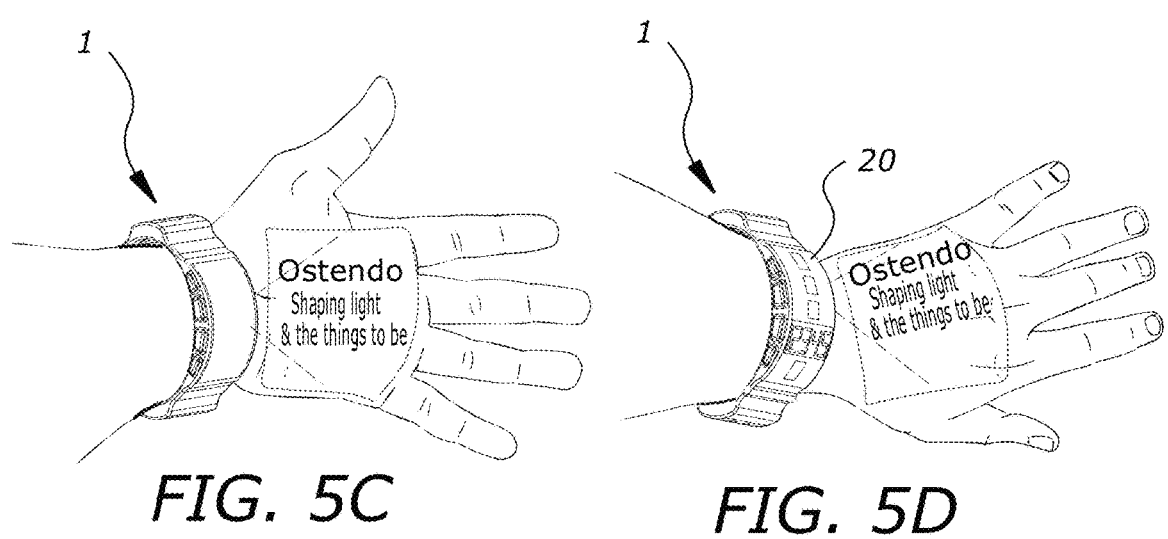

FIG. 4 illustrates a system architecture 400, describing a set of example subsystems for a system such as system 1 that may be provided, depending on the user application and illustrates a set of system core elements 410.

The architecture may comprise one or more communication interfaces 420 such as Wi-Fi, Bluetooth, wired, RFID or near-field communication. System 1 output elements 430 may comprise electronic display elements such as emissive and non-emissive 2D displays, light field or 3D displays, speakers, or tactile systems. In one embodiment, the light field display system is a wearable near eye display system comprising an augmented reality display system or virtual reality display system. Example 3D displays, ultra-high resolution 2D displays or 2D/3D switchable displays with extended viewing angle suitable for use with the embodiments described herein include, without limitation, those disclosed in U.S. Pat. No. 8,854,724 issued Oct. 7, 2014 to Hussein S. El-Ghoroury et al., entitled "Spatio-Temporal Directional Light Modulator", the entire contents of each of which are incorporated herein by reference. System 1 inputs 440 may comprise inertial measurement sensors such an accelerometer or gyroscope, pressure sensors, GPS sensors and receivers for location data, a microphone, an electromagnetic imaging sensor, an ambient light sensor, a color sensor, an angular sensor, an electrophysiology sensor, an EMG sensor, a bioacoustic sensor, an RFID antenna, an ultrasonic ranging sensor, a high frequency transceiver array, or an electromagnetic field and a proximity sensor.

The example subsystems depicted in FIG. 4 may further comprise of one or more processors, graphics processors, application-specific processors, memory, interface controllers, portable power supply units and power management subunits. System 1 may comprise local and wide area communication hardware and software to enable low-power, short-range communications as well as provide access to standard wireless networking hardware using antenna 37. The illustrated communication subsystems of FIG. 4 may be configured to connect system 1 with multiple other electronic or computing devices including devices identical or similar to system 1. In addition to pico projectors 20 and conventional displays 20' referenced herein, system 1 may comprise LEDs and electro-optical units to provide visual feedback to users.

As shown in FIG. 4, in addition to the ultrasound transceivers 25, system 1 may comprise one or more of inertial and/or magnetic measurement or attitude heading sensors and reference subsystems 445; for example, such as those based on micro-electro-mechanical accelerometers, gyroscopes and magnetometers. System 1 may further comprise electromagnetic field sensors, electromechanical proximity or strain sensors, electrophysiology sensors and vibration sensors.

System 1 may be configured to receive inputs from a spatial collocation system 450 that uses in-air acoustic ranging transceivers or electromagnetic antenna-based sensors. Such a spatial collocation system may be used to determine the position of system 1 relative to the user's body. As shown in FIG. 4, system 1 may also include a gesture system fail-safe switch 455. Gesture system fail-safe switch 455 may comprise one or more temperature sensor mesh arrays coupled to a user's skin or to the internal system temperature of the user's body. The temperature sensors may be provided as a mesh array to monitor the user's internal body or tissue temperatures for fail-safe thermal monitoring.

FIGS. 5A-D illustrate example on-body projection surfaces that can used by pico projector 20 of system 1. The multi-pico projector 20 system shown can be used with at least one pico projector 20 and is capable of projection on one to four body surfaces. The display projection may occur simultaneously at one or two or more body surfaces as shown in FIGS. 5A-D. For example, system 1 may project onto the palm surface of the hand as well as the ventral surface of the forearm as illustrated. In an alternative embodiment, when a user removes band element 5, any external surface can be used to act as a projection screen The illustrated projection surfaces of FIGS. 5A-D on the body are selected in view of the fact the forearm can maintain relative stability between the eyes and the projection surfaces. In one embodiment, to prevent repetitive strain injuries (RSI) by attempting to maintain rigid arm postures, pico projectors 20 may be configured to switch between the hand palm and ventral forearm surfaces to the dorsal hand and forearm surfaces automatically based on the gesture and transition between postures of the arm.

Conventional pico projectors discussed earlier use DLP, LCoS or laser beam scanning-based technologies. However the projection technology and pico projectors 20 of an embodiment of system 1 are based on the Quantum Photonic Imager or "QPI®" imager. (QPI®" is a registered trademark of Ostendo Technologies, Inc. See U.S. Pat. No. 8,049,231, filed Mar. 19, 2010 by H. El-Ghoroury et al.) which is a micro-emissive solid state light emitting structure technology that has power and logic circuits integrated into the backplane of a high resolution GaN—GaAs layered pixel array and has micro-optics layer integrated on top of the pixel stack directly. This form of pico projector 20 creates a power-efficient pico-projection display that occupies a very small volume.

Example QPI imagers (micro-emissive solid state light-emitting display elements) suitable for use with the embodiments described herein include, without limitation, those disclosed in U.S. Pat. Nos. 7,623,560; 7,829,902; 8,567,960; 7,767,479; 8,049,231; and 8,243,770; each entitled "Quantum Photonic Imagers And Methods Of Fabrication Thereof" and assigned to the Applicant herein, the entire contents of each of which are incorporated herein by reference.

The above-referenced QPI imagers feature high brightness, very fast light multi-color intensity and spatial modulation capabilities in a single emissive display device that includes all necessary display drive circuitry. Within the context of the embodiments described herein, the term "pico projector" is intended to encompass an optoelectronics device that comprises an array of emissive micro-scale solid state light (SSL) emitting pixels. The SSL light emitting pixels of such a device, hereinafter referred to as simply a pico projector, may be either a light emitting diode (LED) or laser diode (LD) or any solid state light emitting structure whose on-off state is controlled by drive circuitry contained within a CMOS circuit upon which the emissive micro-scale pixel array is formed or bonded.

The pixels within the emissive micro-scale pixel array of a QPI imager are individually addressable spatially, chromatically and temporally through its drive CMOS circuitry enabling a QPI imager to emit light that is modulated spatially, chromatically and temporally. The multiple colors emitted by a QPI imager beneficially share the same pixel aperture. QPI imager pixels emit collimated (or non-Lambertian) light with an angle of divergence ranging from ±5° to ±45°. The size of the pixels comprising the emissive array of a QPI imager are typically in the range of approximately 5-20 micron with the typical emissive surface area of the device being in the range of approximately 15-150 square millimeters. A QPI imager can be designed with a minimal gap between its emissive pixel array and the physical edge of the imager, allowing a multiplicity of QPI imagers to be tiled to create any arbitrary size display area.

Due to the smaller distances (throws) involved in the projection, a projected display using a QPI imager can be very bright without requiring significant power. The micro-optics and the focusing modules of a QPI imager of the above-listed U.S. patents are expressly designed in consideration of non-linear projection surfaces and throws. Of course while QPI imagers are ideal for use as or in the pico projectors of the present invention, the invention is not so limited, and other imagers may be used as or in the pico projectors of the present invention as desired.

The projection surface of a human anatomical feature (i.e., skin or epidermis) is itself soft, deformable tissue that deforms as a function of gesture. The skin surface is not a consistent neutral color, varies between users and contributes to color corruption, has variable reflectivity and degrees of glabrousness (hair) that all depend on body location (for example, a dorsal hand surface is darker and has a different reflectivity as compared with the palmar surface). The final projected display quality is strongly dependent on ambient illumination in the environment of the projection surfaces. Such issues must be considered to provide an improved on-body display experience to a user.

A software component of the projection system comprises an algorithm, herein referred to as a "skin engine", which compensates and adjusts the projected display output from pico projector 20 to account for the variable nature of a human skin projection surface. The skin engine acquires image data of the skin projection surface received from camera 35 and modifies the projected display output based on tissue deformation, hand posture, projection surface, reflectivity, ambient illumination, skin color, and user head/eye locations. The image to be displayed is modified using static and dynamic contrast enhancement, color correction, gamma, aspect ratio, image distortion and deformation calibration before transmitting the image to the projection system frame buffers prior to display on a skin surface.

The methods described herein take advantage of a non-invasive US sensing modality that looks deep inside the body for the biomechanical signals from internal objects and structures that necessarily accompany changes in human anatomical feature posture. All voluntary and involuntary gestures and postures of the body are always accompanied by biomechanical tissue deformations. Extraction and digitization of such biomechanical deformation signals enable the capture of the relevant, highly compressed and least redundant datasets that represent posture and gesture information. Mathematical modeling and analysis of these digital representations enables high resolution discrimination between individual postures and gestures of a human anatomical feature.

The US transceivers 25 are provided with electromechanical transmitters that emit non-ionizing, acoustic pressure waves into tissues. The emitted pressure waves propagate in the tissue at about the speed of sound, interact with the dynamic tissue structure of internal objects and are reflected, refracted, diffracted and attenuated based on the unique echogenic properties of the tissues making up the objects of the anatomical feature. Such acoustic transmission components of the wavefront are detected using electromechanical receivers placed around the US-imaged tissue region. The received signals from the transducers are referred to as "V". The characteristics of the received signals encode the spatiotemporal distribution and properties of the tissues of the internal objects with which the original emitted wavefront interacted. Transceivers 25 may also be configured to transmit pre-determined encoded and directional wavefronts that return user-defined specific and filtered US information.

High-frequency acoustic waves or ultrasonic waves are commonly used to collect information about biomechanical tissue structures in a field referred to as "ultrasonography". Such ultrasonographic techniques are usually coupled with array-based US transceivers and image formation/scan conversion hardware and/or software to produce two dimensional images representative of human body cross-sections for viewing and analysis. Such cross-section images are useful in medical fields where the tissue structural information may reveal the internal conditions of tissues. It is common practice in ultrasonography to use the same electromechanical elements as both transmitting as well as receiving elements, commonly referred to as a US transceiver.

Ultrasound imaging machines are large and cumbersome and meant to be operated manually across multiple locations over the entire human body using a liquid or gel-based transmission coupling. These machines are necessarily large, in part because manufacturers tend to, 1) use off-the-shelf circuitry, 2) increase modularity for re-purposing, and, 3) support high-resolution reconfigurable feature sets using the same hardware.

The wrist-worn embodiment of system 1 as depicted in FIGS. 1A-5D enables the near real-time mapping of a spatio-temporal cross-section of the human wrist and does not require the process-intensive step of scan conversion. Since the wrist contains the confluence of all of the musculoskeletal mechanical elements of the hand, thumb and fingers (flexors/extensors/abductors/adductors tendons, neighborhood ligaments and bones), their flextensional/extensional motion, and surrounding and background tissue deformations, can be detected using the compact ultrasound transceiver 25 as disclosed herein. The acquired spatio-temporal signal map is correlated using a biometric-based mathematical model of the wrist directly with a 3-dimensional mechanical posture and gesture of the wrist with greater accuracy than other commercially available human interface devices.

In an embodiment where system 1 is worn directly over and around the wrist and biomechanical signals are obtained from inside the body, there are no field of view restrictions on the user and no part of the useful US signal is occluded. The US echogenic object signal data obtained for hand gestures is independent of orientation and posture of the rest of the forearm or upper arm. Accordingly, the user can choose to operate the device while engaging in other activities, e.g., the user can gesture with the user's hand inside a pocket of an apparel. The flexibility of system 1 avoids problems with gorilla arm syndrome or RSIs that plague external camera-based machine vision gesture systems.

The methods disclosed herein do not merely look at the kinematics of tendons (unlike U.S. Pat. No. 8,292,833 or 5,818,359), but instead consider the full deformation and multiple biomechanical and deformation characteristics of tissues and objects located in the cross-section of the respective limb including, but not limited to, deep muscles, vasculature and bones. This is an important feature because as tendons deform, their echogenic properties change drastically and may not be detectable using prelocated sensors as in conventional approaches. The absence of clear US signals from a tendon prevents accurate recognition of posture if only tendons are used for posture detection.

The human musculoskeletal system shows remarkable plasticity in acquiring precision voluntary and spatial motor skills. This is a reason users prefer electromechanical keyboards with physical buttons and also why tactile input has the highest bandwidth of all other input modalities. Therefore, the closure of the sensorimotor feedback loop realized by producing projected light interfaces near the digits of the hand, whose postures are sensed using the gesture recognition method and device disclosed herein is a major advantage. Direct feedback allows reinforcement learning and training of the human sensorimotor complex, leading to highly intuitive user interfaces. An effect of this loop closure is that users can easily acquire gesture skills.

Figure 6:
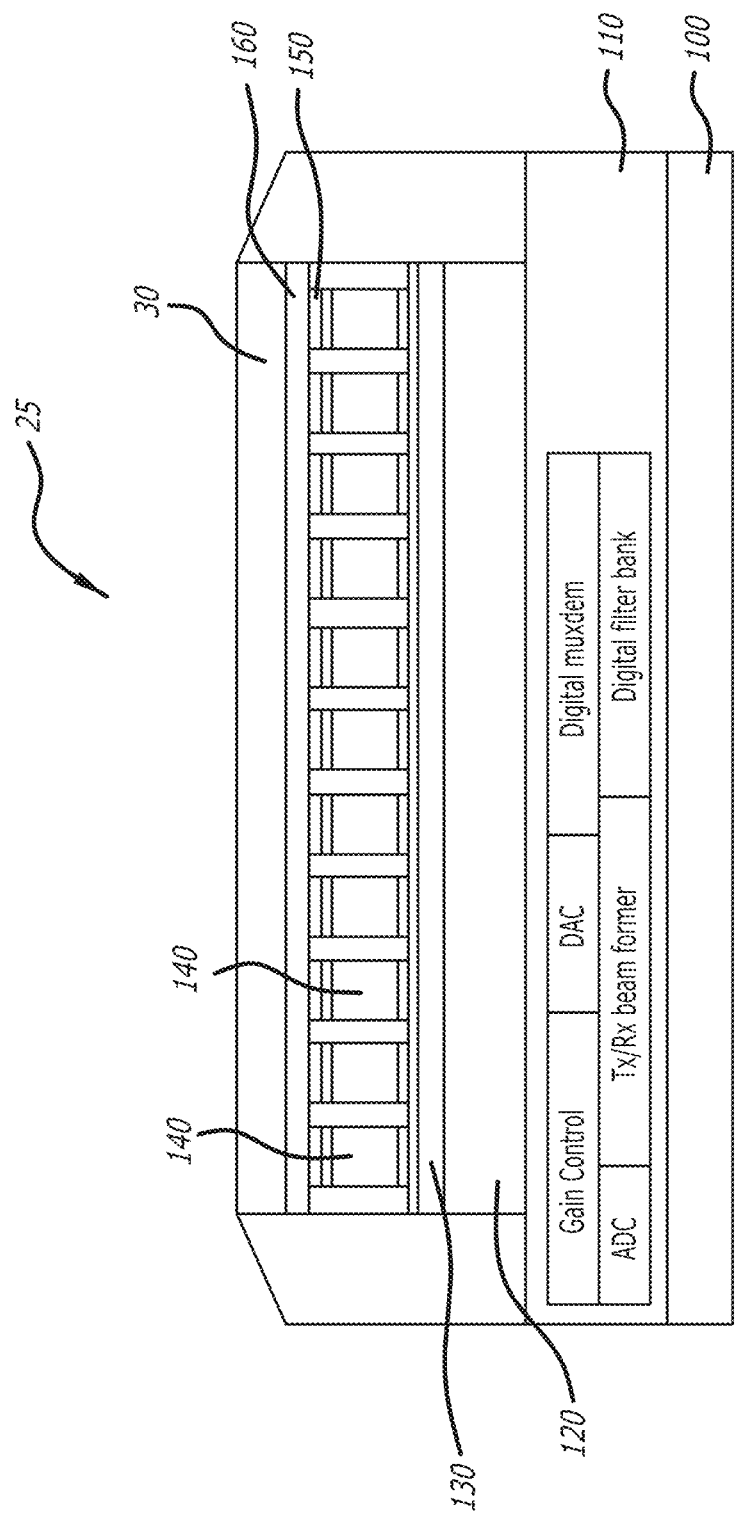
FIG. 6 Illustrates an ultrasound transceiver array of sub-units of a system according to one example embodiment.

FIG. 6 illustrates an example embodiment of the ultrasound transceiver 25 arrays shown in FIG. 3. Design in the placement of transceiver 25 arrays should consider the ability of the configuration to image tissue deformation in the region under consideration, the avoidance of shadowing of the transmitted waves from anechoic mineralized tissue (like bone) while accounting for the statistical variability in human anatomy. For example, a single transceiver 25 placed on the ventral side of the wrist region might not be able to extract signals from the extensor tendons that generally pass superficially closer to the dorsal surface of the wrist.

Therefore, in embodiments of the system (such as system 1), transceivers 25 are placed according to a quadrant, or may be placed asymmetrically to maximize tissue visibility based on the region of interest for specific applications. Transceivers 25 may desirably be arranged orthogonally to other transceivers 25 to permit different signal reception modalities. In certain embodiments, not all transceivers 25 need be used continuously or periodically and selected transceivers 25 may be activated specifically to enable esoteric or user-defined sensing objectives.

With respect to FIG. 6, the ultrasound transceiver 25 of a system (such as system 1) may be fabricated on a hard or flexible substrate 100 on which an application specific integrated circuit (ASIC) 110 or a digital signal processor (DSP) may be mounted. Substrate 100 may function as a through-hole interconnect layer connecting power and digital signal lines from system 1 to ASIC 110. A high voltage pulse generator circuit 120 supporting transceiver 25 array may be provided as a part of ASIC 110 or may be an independent die packaged along with ASIC 110.

As illustrated in FIG. 6, in one embodiment, substrate 100 may comprise transmit and receive beam-former circuits, digitizer circuits, digital to analog converter circuits, gain control circuits, memory, switches, multiplexers/demultiplexers and programmable analog or digital filters among other similar electronic and processing circuitry used to support US imaging. An acoustic transmission blocking layer 130 may be disposed on the surface of ASIC 110 and high voltage pulse generator 120 circuits. Blocking layer 130 may be used to actively or passively block reverse acoustic transmissions and may be designed to provide specific acoustic impedances. Blocking layer 130 may comprise a semiconductor material. Additionally, ASIC 110 may also comprise circuits specific to spectral Doppler signal processing.

Transceiver 25 may comprise an array of active, electromechanical US transceiver substructures 140 or "cells" and may be located on top of blocking layer 130 and may be used as US transmitters or US receivers or combinations of the two. The ultrasound transceiver substructures 140 that make up an array of transceivers 25 may, for instance, comprise micro electromechanical elements (MEMS) or may be comprised of composite ceramic layers. There may be a plurality of transceiver substructure elements 140 arranged in linear, two dimensional rectangular or elliptical grids on supporting substrate 100. The pitch and geometry of the plurality of substructures 140 are determined based on desired spatial signal resolutions and beam-steering parameters. The geometry parameters may also be selected to prevent hair on the skin from interfering with ultrasound wave transmission or reception. Individual transceiver 25 substructure elements 140 may be reduced in size to obtain higher resolution US signal transmission and acquisition dependent on required resolution levels (for example, imaging smaller vascular features).

An alternative embodiment of transceiver array 25 may comprise capacitive micro-machined ultrasound transceiver arrays that are fabricated from semiconductor wafers and photolithographic or surface micromachining processes. Such embodiments permit high-density integration using proven fabrication methods used in 3D integrated circuit interconnects and packaging technologies. In such embodiments, ASIC 110 may be fabricated monolithically along with the transceivers 25 and may form the backplane of the transceiver 25 layer. In other embodiments, the capacitive elements may be replaced with piezoelectrically-active material layers, such as aluminum nitride, that may be deposited through vapor deposition processes on the surface of micromechanical membrane structures.

Transceiver elements 25 may be provided with active or passive matrix electrode substructures 140 connecting individual transceivers 25 or transceiver arrays with the ASIC 110 and power circuits. Transceiver 25 arrays themselves may be mounted on micro-electromechanical translator stages that can be vibrated periodically or provide translation methods relying on piezoelectric, electromagnetic or electrostatic actuation strategies to generate 3D volume scans. Subunits 140 in the transceiver 25 array may configured to operate in selected wavelength/frequency diversity schemes where mixed frequency or multiple frequency transceivers are used to increase depth-of-focus.

Transceivers 25 may further comprise one or more acoustic matching layers 150 deposited on the surface of other transceiver elements to lower the acoustic impedance mismatch between transceiver 25 and the tissue medium. Acoustic matching layer 150 may comprise a polymer acoustic lens layer 160 to focus US transmitted wavefronts. Acoustic lens layer 160 may be encapsulated by a high-tack and compliant polymer-based acoustic layer 30.

An alternative embodiment of system 1 makes use of an instrumented approach to the type and nature of US signal beam-forming which is determined algorithmically by the application modality. Due to the configuration of multiple transceiver 25 arrays, individual transceiver substructures 140 or arrays may be operated in conventional pulse-echo signal transmission and reception modes as well as configured for pitch-catch or through-transmission modes. The embodiments may use the harmonic content in returned US signals in light of the fact conventional fundamental frequency ultrasound is not well-tolerated for about 30% of the human population.

Ultrasound transceiver arrays are commonly used in a scanning mode in traditional ultrasonography. While adequate for US imaging purposes, a scanning mode reduces the rate at which data can be collected from a US system and reduces responsivity. To overcome this deficiency, in addition to the scanning array mode, the embodiments may utilize a plane wave beam-forming approach to permit both faster as well as safer signal modalities. Since the targeted application of the embodiments disclosed herein is inherently non-imaging, the embodiments can use multiple different modalities to monitor tissue changes in the cross-section region of the wrist. This approach is an instrumented approach where multiple frequencies and multiple scan types are used in the imaging algorithm to extract maximal information about changes and deformations in tissue objects in the wrist. Integral and hold-shift methods may be used to produce US datasets. Beam-steering algorithms may be used to focus on off-axis regions (both in the transceiver plane as well as in the elevation plane) or focus on specific features for higher accuracy readings.

In a yet further alternative embodiment, the individual transceiver 25 substructures 140 of an array may be activated in either shear or longitudinal vibration modes using piezoelectric, electrostatic, electromagnetic, magnetic, electronic or mechanical phase transition, or photonic pressure-induced oscillations. The transceiver 25 substructures 140 may be coupled with at least one acoustic impedance matching layer 150.

Substrate 100 may be designed to mechanically or electronically prevent or impede signal transmission opposite the target location. Each substructure 140 may be configured to act both as a transmitter and a receiver, i.e., a transceiver 25. In this manner, a sequence of spatially and temporally grouped US oscillations may be used as generators and a sequence of spatially and temporally grouped oscillators may be used in either pulse-echo, pitch-catch or through transmission modes to receive the wavefronts after they interact with the biological tissue objects and are returned. This ensures minor perturbations do not affect acquired US signals by using multi-focal and multi-scan averaging using specific weighting functions.

Many conventional approaches rely on the use of scan conversion to generate images from ultrasound pulse-echo data. The scan conversion process basically translates US data that is captured by a transceiver into Cartesian coordinates to be suitable for display. In an ultrasound system, the input to the scan converter is the acquired echo data and the output is data that is displayed on a monitor. It is noted however that the methods disclosed herein do not use scan conversion techniques on the hardware itself, and instead operate directly on the received US response signals to minimize hardware, software and complexity overheads. Scan conversion undesirably introduces image artifacts that require further calibration to be removed. Another scan conversion deficiency is that images from radial transceivers, due to their radial nature of beam-spreading and focusing, introduce shadow regions that, despite having little entropy, take up memory in buffers. Nonetheless, ultrasound echo signals, specifically from the same regions, have little entropy. Such redundancy is leveraged in the embodiments disclosed herein to improve frame rates and scanning target acquisition. High frame rates enable the use of the beam-forming methods of the embodiments disclosed herein in a closed loop and also enable the tracking of specific tissues.

For example, due to the statistically-conserved spatial distribution of tissues and vessels and tendons in the human body, the methods disclosed herein can take advantage of dictionary-based encoding methods to achieve greater compression for transmitting data over networks. The methods disclosed herein take advantage of more efficient computation algorithms that operate directly on compressed data and exploit the sparse nature of the signals; reducing overhead. Wavelet transforms can be used for transform coding, then the coding is quantized based on characteristics of the specific signal generation to remove reception modality, then finally are dictionary-encoded. This method eliminates the possibility of scan conversion-based 2D image formation artifacts.

However, the methods disclosed herein may, in an alternative embodiment, incorporate a scan-conversion routine on cloud servers or on the network where streamed data from a device may be used to generate an image upon request. To prevent unauthorized access of the ultrasound data, the scan conversion algorithm access may be configured to be encrypted and/or released only to accredited medical professionals upon authentication.

In an alternative embodiment, transceiver 25 is comprised of a 2D phased array of transceiver substructure elements 140 configured to transmit a broad beam of ultrasound that diverges away from transceiver 25 and to sweep out in pyramidal volumes. The returned echoes are detected by the 2D array of transceivers 25 and then processed to display, in real-time, multiple planes from the volume. These planes may be chosen interactively to allow the user to view the desired region under investigation.

A health risk from ultrasound comes from tissue heating through long term exposure to acoustic waves, dangers of fluid cavitations and acoustic streaming in body fluids. Generally, risks from thermal heating of tissues are minimized because there is operator oversight, and the probe is not commonly stationary with respect to a specific region, and blood perfusion typically prevents any localized heating. However perfusion time constants for muscle and fat tissue are larger, thus much slower.

Manufacturers commonly calculate and present US dosimetry data with mechanical and thermal indices to radiology practitioners. The embodiments disclosed herein use similar approaches, except acoustic dosage is determined and monitored algorithmically where the system algorithm controls frequency and power contained in the acoustic signals, and uses beam-steering to prevent continuous monitoring of the same regions. Since the embodiments disclosed herein are generally used in a non-diagnostic application that does not rely on high resolution imaging, the system algorithm controls the incident US intensity to be at an average. This is further aided by the safety instrumented approach based on multi-frequency transceivers, synthetic focusing, and steerable arrays.

In one embodiment, the temperature sensor mesh array 45 discussed earlier is an independent fail-safe circuit with multiple redundant thermal sensor elements that tracks, monitors and estimates the temperatures inside the targeted tissue region and includes multi-tissue calibration factors in a closed control loop. If any pre-determined safe operation temperature threshold is approached or exceeded, the circuit can warn the user or break all power to the transceiver circuits. Data from temperature sensor array 45 is also fed forward to the system algorithm that controls the acoustic exposures and doses.

As the body changes posture, an inertial motion is induced in the human tissues of the relevant anatomical feature as well as in system 1 due to their respective masses. The tissue and digits also experience deformation due to the presence of gravity. For example, the rest posture of a hand when pronated is substantially different from the rest posture of a hand in supination. To account for such influences, inertial measurement sensors, such as accelerometers, gyroscopes and magnetometers, may be included in the embodiments herein. Inertial measurement sensors are particularly useful since body parts may deform significantly under the effect of gravity without causing noticeable changes in the structure of internal tissues. An inertial measurement sensor incorporated into system 1 may be configured to provide coarse estimates of the feature and body orientation with respect to gravity, acceleration and angular velocity measurements. These measurements are provided to the system algorithm, discussed below, which takes inertial motion of the tissues and device into account for gesture recognition.

Since inertial measurement sensors are generally worn coupled to the user's body, they can be used to reconstruct a low-fidelity model of the posture of the user's entire body. Such posture data is used to coarsely discriminate between when the user is standing, moving, walking, sitting or laying down. The use of inertial measurement sensors enables recognition of when the body undergoes sudden motion for example, from impacts or contacts with external objects.

As earlier noted, pressure from a device attached across a body part can cause significant and uncertain deformation and rearrangement of tissues in the neighboring region. Conventional attempts at wearable US gesture recognition either do not make clear how the related transceivers attach to the user's body or assume use of adhesive materials. Instead, band element 5 is under a slight compression load on the user. A tension sensor and actuator pair (not shown) may be used for variably controlling the shape, tension and deformation of band element 5. Such compressive pressures may then be accounted for and actively controlled. The use of variable tension latches 15 and hinges 10 discussed earlier beneficially addresses these concerns.

An embodiment of the system 1 may use structural band elements 5, hinges 10 and latches 15 made of shape memory alloys (SMA). As is known, SMAs are engineered to undergo phase-transition at certain temperatures upon the application of heat and change their shape to a pre-memorized form. The heat is commonly applied through resistive heating of the SMA members by passing a current through them. Such electromechanical tensioning systems can be used to regulate the pressure or tension applied across band element 5 to tighten or loosen the tension of band element 5 structure or to optimally distribute pressure across ultrasound transceivers 25 at desired locations, as well as provide some controllability of the actual shape of band element 5. Such deformation profiles under compression loads are unique to each user and may be algorithmically adjusted for optimal sensing and precision. The disclosed shape memory alloy band element 5 or hinge 10 or latch 15 can also be used to provide haptic feedback by 'gripping' the user's hand gently.

Medical ultrasound devices typically use liquids, oils and gels to ensure acoustic transmission between the rubber acoustic lenses and the skin. These approaches are wet technologies and cannot be used in the consumer electronics space. To avoid such wet coupling media, the embodiments take advantage of a polymer-based polymer acoustic layer 30 as illustrated in FIGS. 3 and 6.

While U.S. Patent Publication No. 2013/0041477 discusses the use of PVA or Polyurethanes for use as such coupling materials, these represent a broad, non-specific class of materials with highly variable mechanical, thermal and environmental properties. The embodiments disclosed herein are not focused merely on acoustic aspects, but on mechanical and thermal properties of its constituent structures as well as manufacturing ease. Accordingly, in addition to matching tissue acoustic impedances, the polymer acoustic layer 30 material is conformal, compliant and tacky to adhere uniformly with skin, enable seal formation over glabrous or non-glabrous (hairy) skin alike by specifically employing sweat produced through diaphoresis or perspiration to fill vacancies and folds in epidermis and to otherwise create a mechanical coupling surface that is both comfortable to wear while accounting for variations in radial compression through variations in wrist dimensions. Acoustic layer 30 acts as a thermal isolator for electronics and as a mechanical damper to arrest coupled tissue-bracelet vibrations. This conformality may be aided through the use of SMA-based structures, latches 15 and hinges 10.

In some embodiments, acoustic layer 30 is comprised of soft and tacky thermoplastic elastomer polymer blends, such as those formed by isoprene polymer, or styrene-butylene block copolymers or poly(styrene-ethylene-butylene) copolymers with specific additive tackifier resins to control adhesion characteristics, residue-free polymerizing oils to control mechanical consistency, and various other additives that impart thermal stability at normal device operation and environmental temperatures, optical quality, color, and hydrophilic coatings. The benefit of such polymer blends is that they can be easily injection-molded or compression-molded and engineered in conjunction with regular manufacturing techniques. The specific processes employed during manufacture allow the addition of passive and electronic components to such polymers. The dimensions of such material are adjustable to compensate for the user's anatomical dimensions, inertial motion of the device and radial compressive loads applied through the latches.

Acoustic layer 30 may be designed to be user replaceable. The active or passive electronic circuitry contained in acoustic layer 30 may be used to transmit unique data identifying the characteristics of the acoustic layer 30 to system 1. For example, characteristics required of the acoustic layer 30 may include mechanical compliance, date of manufacture, contiguity, resistivity, among others.

For sterile applications, such polymer material may be used to construct full gloves or just the cuff portions of the glove that overlap with the forearm. This allows the use of the embodiments described herein in environments where the use of sterile or clean-room attire is desired.

In the case of inaccessibility or of malfunctioning of acoustic layers 30, simple tap water can be used to establish an interface between the body and the device. This temporary interface can be expected to be maintained through the capillary action of sweat over the long term.

As stated earlier, an embodiment may include one or more camera devices 35 and 35' that allow users to take photographs. Cameras 35 and 35' may also be configured to implement a display quality feedback system to improve the pico projector 20 quality using metrics, such as, but not limited to, contrast, brightness, color gamut. Cameras 35 may be dedicated to discriminating between ambient light, skin color and optical characteristics of the skin.

The spatial collocation system (SCS) refers to a modality in the architecture of system 1 that allows the absolute spatial coordinate of the wrist to be sensed with respect to the body and reported to the system's application processor. For multi-system hierarchies, the SCS can provide relative spatial locations between multiple systems. This information can be employed to provide interactive services in multiple scenarios. An example of such a scenario would be to detect the relative stretching of the arm with respect to the mid-sagittal, coronal and transverse planes of the human body for fitness or medical or interactive entertainment applications. In an embodiment, SCS may be implemented using in-air ultrasonic transceivers or electromagnetic field sensors, or infrared transceiver pairs, or structured light emitter-sensor pairs or depth sensors or may use microphone arrays for head (speaker) localization. The SCS may also be used to estimate information about the horizon or the ground plane.

Additionally, system 1 may be provided with other types of sensor elements, such as mechanical thin-film strain gauges or dry electrophysiology sensors, and piezoelectric vibration sensors. Such sensors enable the use of the embodiments described herein in an off-body modality. System 1 may include one or more lumped or distributed portable power supply systems with its own power management circuitry. These power systems may comprise lithium polymer ion technology. System 1 may include one or more vibration actuators that generate haptic feedback for the user. Such actuators may be used either exclusively or in conjunction with the SMA tactile constriction feedback actuators. The microphone/speaker arrays 40 described earlier may be used for communication purposes where the array signal processing technology is used to provide a method to separate speech from noise.

The embodiments disclosed herein may operate in conjunction with a distributed or cloud-based computing systems. Therefore, an embodiment may include one or more hardware interfaces such as antenna 37 for network or peer-to-peer connectivity, for example, but not limited to telephony, Wi-Fi, Bluetooth, wireless radios, near field communication (NFC). Multiple systems 1 may be configured to communicate with each other and be used to create a local mesh network among each other and transmit information such as relative positions, orientations, current gesture type, etc. Since system 1 transmits and receives data to a computer and the cloud, all of the embodiments may be either used to interface with local machines or remote/virtual machines.

Figure 7A:
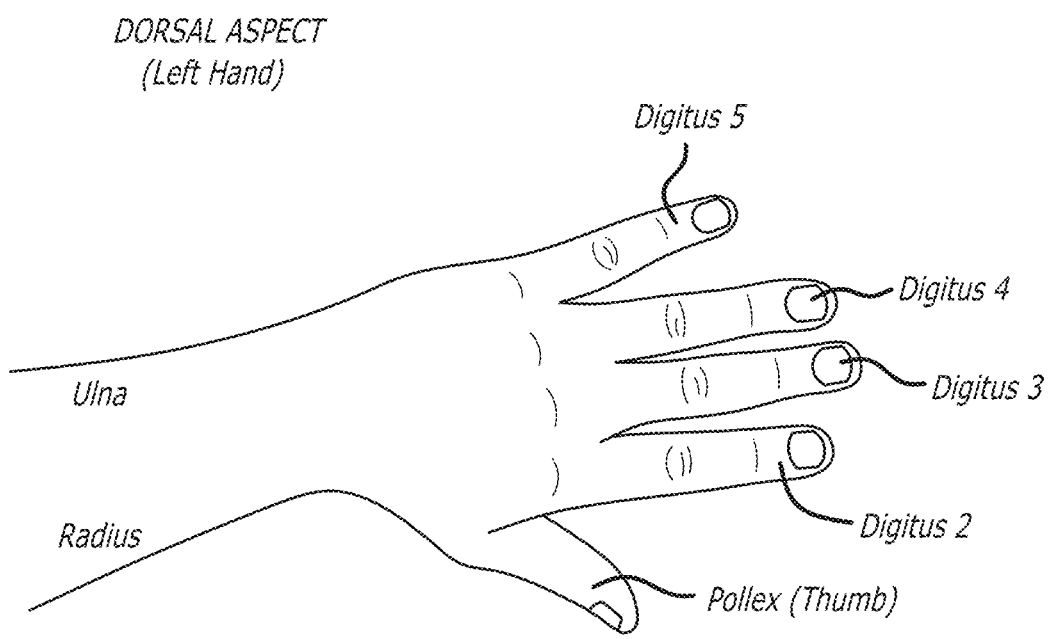

FIGS. 7A-C show anatomical nomenclature used and definitions of the degrees of freedom that system 1 may use. A reference frame may be defined with respect to the wrist about the location of the carpal tunnel. Articulations about certain axes are not possible to detect with low errors merely from ultrasound data since some of the activation muscle groups are contained in the palmar region, such as the lumbricals, palmaris brevis, and pollicis group, and are not accessible to the ultrasound transceivers 25. Certain conditions occur where system 1 is unable to capture either the PIP (proximal inter-phalangeal) or DIP (distal) articulations of the fingers precisely. However these axes are estimated using a method that exploits the redundancy in the kinematics of the hand as well as using the sympathetic strain fields generated in the tight packed tissue structure of the wrist.

FIGS. 8A-F show representative gestures that interact with a user interface that may be mediated by the skin engine. In one embodiment, the skin engine algorithm presents the digit articulation (posture) information to the skin engine which then highlights a particular icon corresponding with the digit. This can occur for projections on either dorsal or palmar surfaces. The particular icon is selected using a clenching or clawing or grabbing gesture that involves articulations of all five digits. Since users typically have five digits, the five icon or task menu has a particular significance to the skin engine. The skin engine controls the deformation and modification of the projected light field to account for soft surface tissue deformations and lighting. The actual interaction between posture and digital information is exactly the same way users interact with physical objects. Though FIGS. 8A-F show a palmar or dorsal hand surface projection, the same user interface concept applies to forearm surface projections, where gestures from each finger are used to control five icon menus on the forearm surface.

Figure 9A:
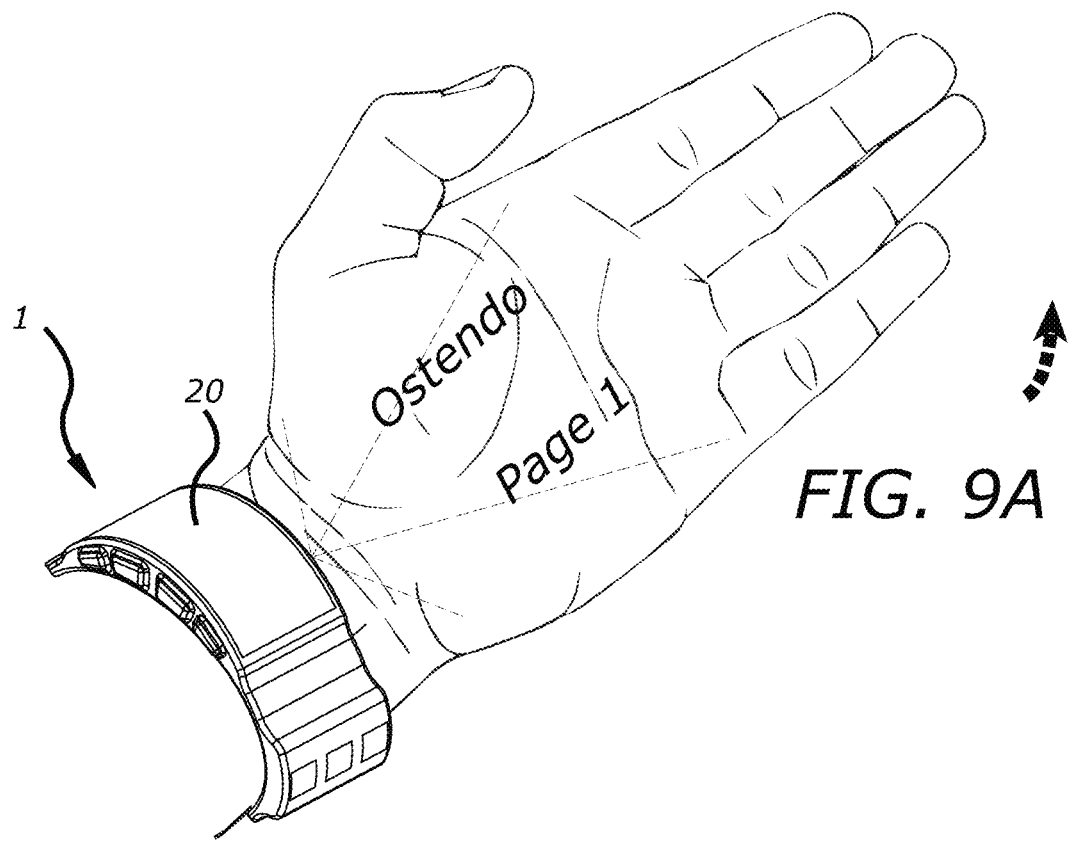
FIGS. 9A-B Illustrate a representative gesture in a "pitching" motion about the carpal axis (radial and ulnar) as referenced in FIGS. 8A-F according to one example embodiment.
Figure 9B:
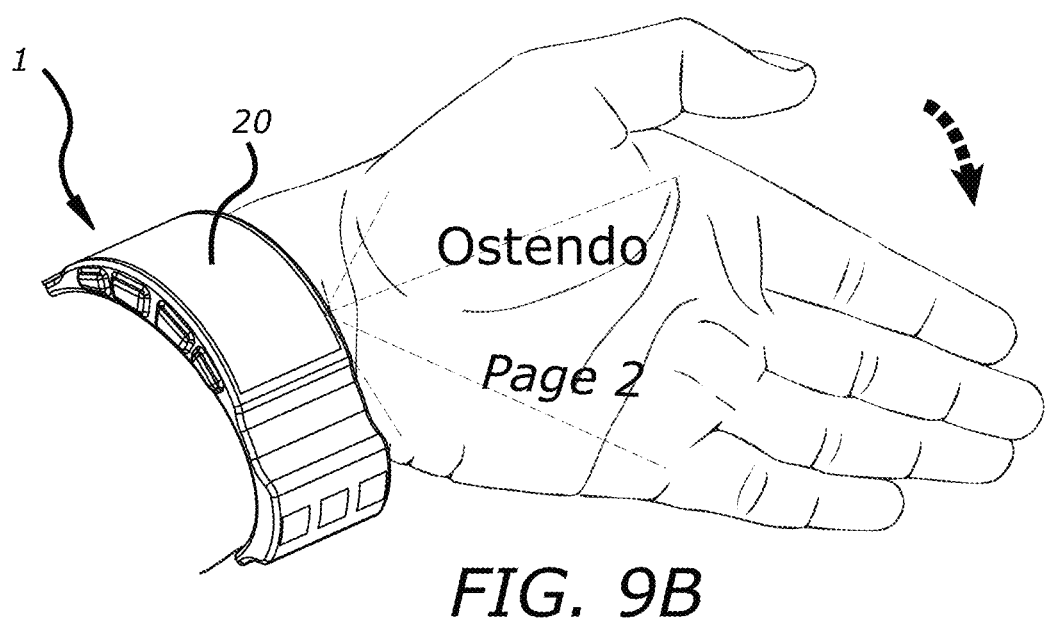

FIGS. 9A-B illustrate an example of how a physically intuitive, page turn gesture can be used to interact with the projected light field. In this embodiment, a pitch about the carpal axis (described in FIGS. 7A-C), otherwise referred to as a radial-ulnar deviation, is used to implement a page turn or scroll through gesture.

Figure 10A:
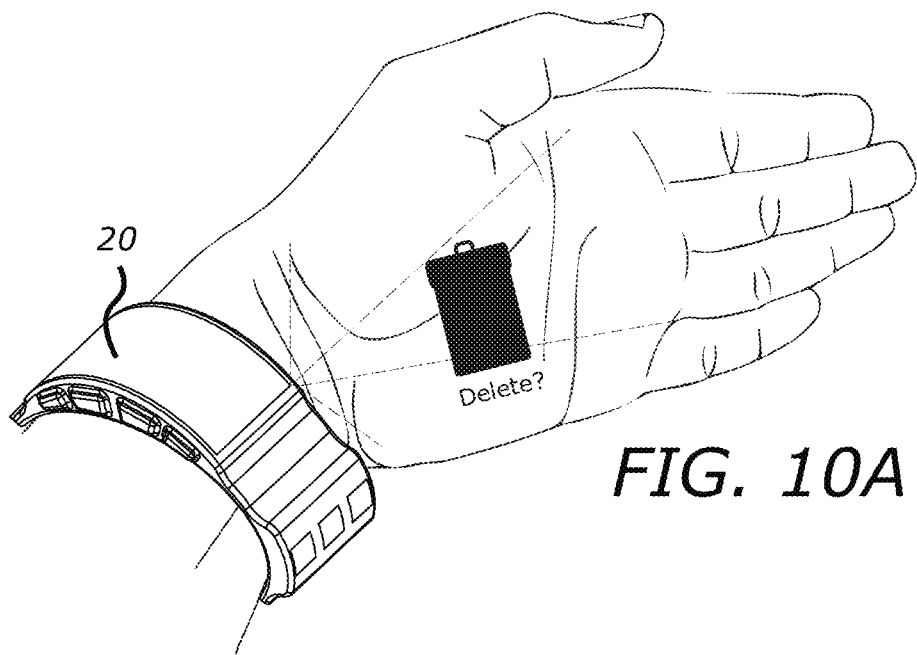
FIGS. 10A-B Illustrate a representative "clenching" motion gesture involving the yawing articulation of the proximal and intermediate phalanges where the digits are brought into contact with the palmar surface according to one example embodiment.
Figure 10B:
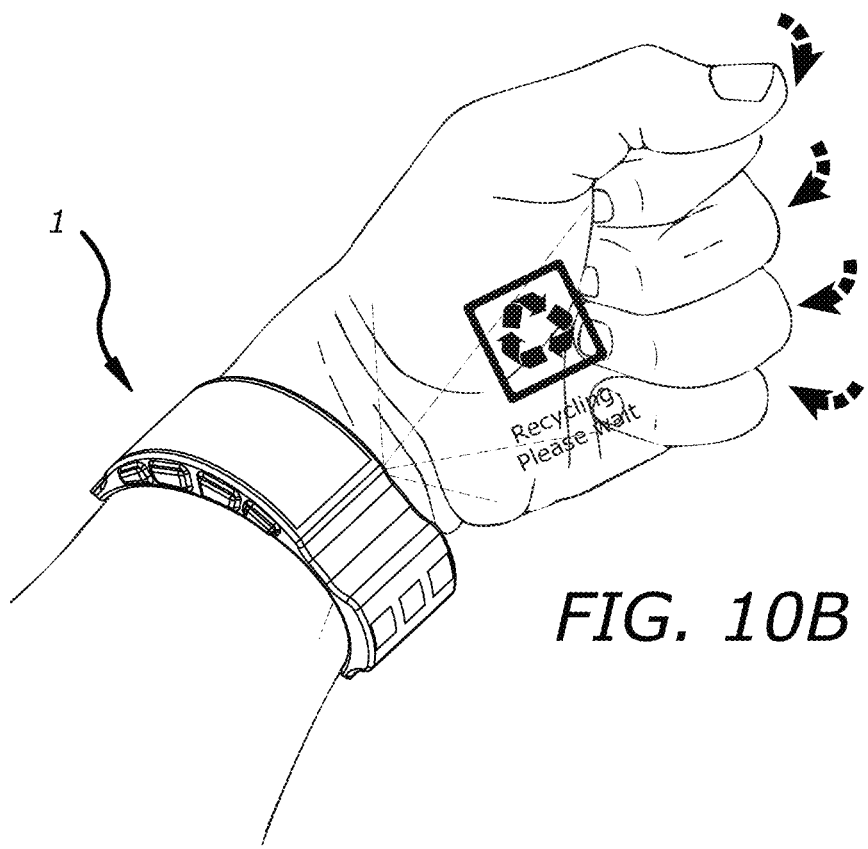

Similarly, FIGS. 10A-B illustrate an example of how a clenching action can be used to select a task.

Figure 11A:
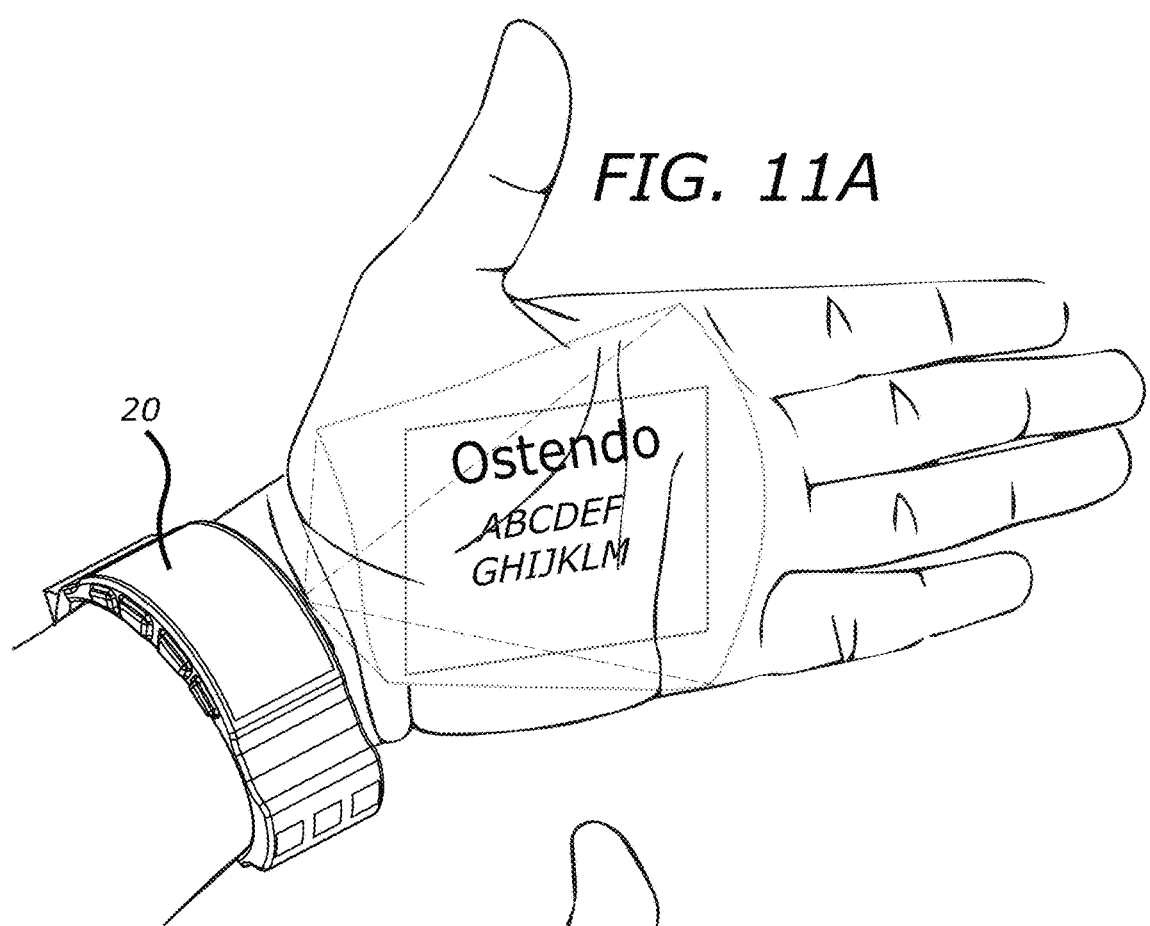
FIGS. 11A-B Illustrate a representative gesture involving the yawing articulation of the proximal and intermediate phalanges without bringing the digits into contact with the palmar surface according to one example embodiment.
Figure 11B:
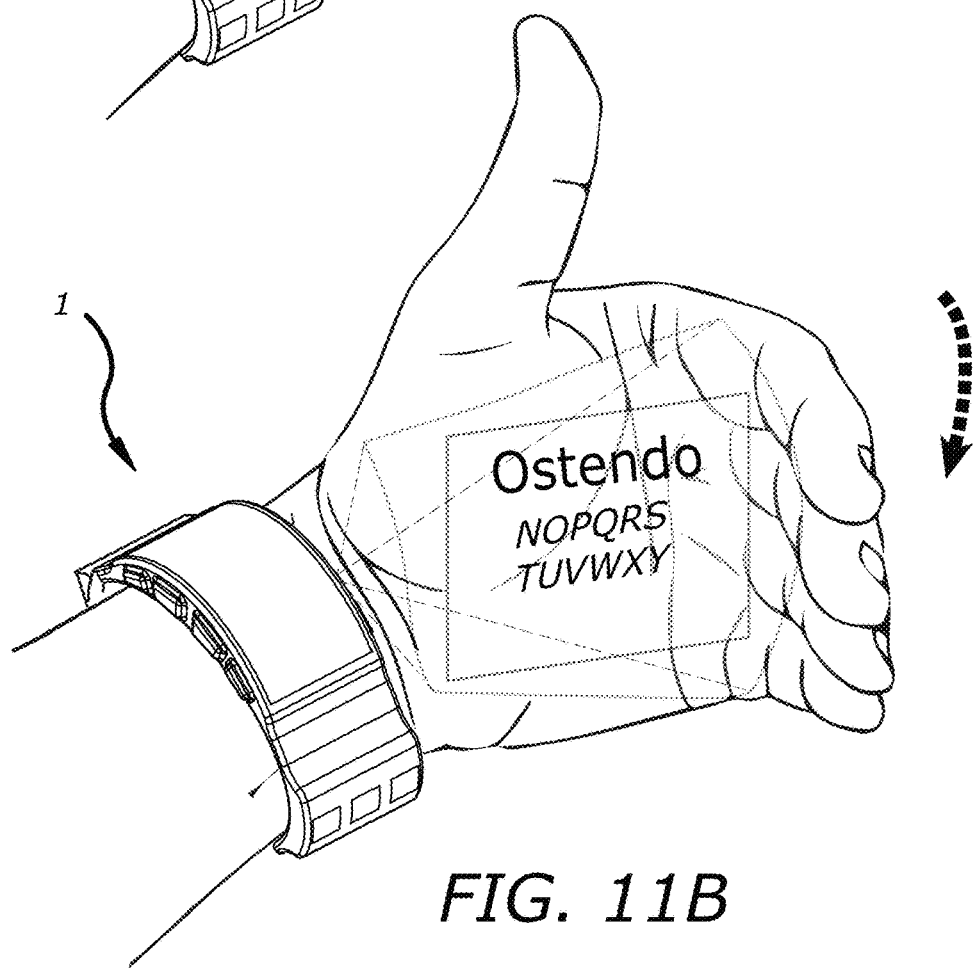

FIGS. 11A-B illustrate an exemplar gesture similar to the one shown in FIGS. 10A-B. FIGS. 10A-B show a page turn or scroll through interface based on articulation of the proximal phalanges of four digits excepting the thumb.

Figures 12A, 12B:
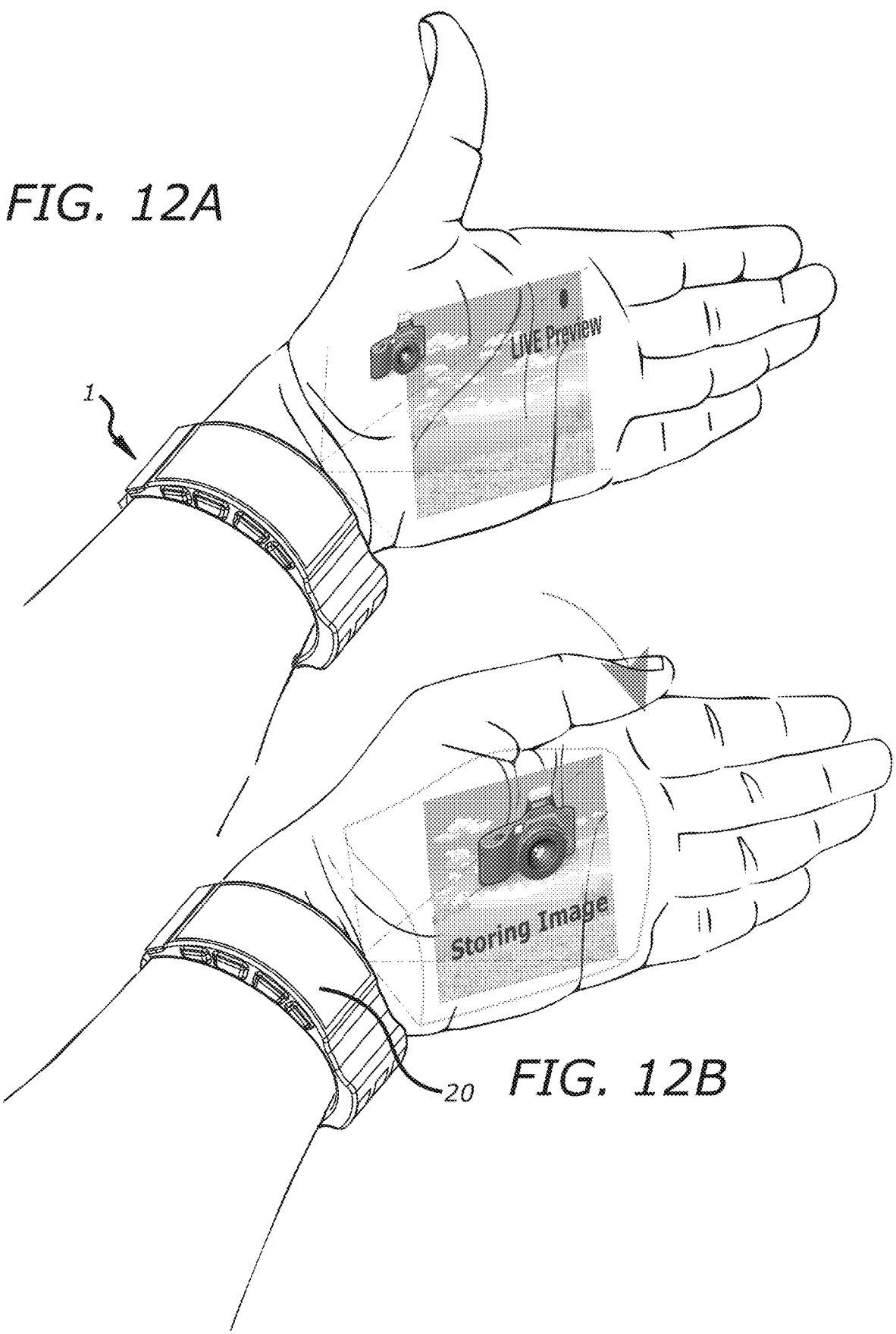
FIGS. 12A-B Illustrate a representative "pitching" motion of the thumb at an orientation of the wrist according to one example embodiment.

Similarly, FIGS. 12A-B show a selection action or a button press action implemented by detecting a thenar pitch gesture. In this illustration, a camera interface is shown where the thenar pitch gesture instructs system 1 to take a photograph. Each digit on the hand may be ascribed to a single button push-like activity.

FIGS. 13A-K illustrate a variety of multiple finger gestures system 1 can distinguish. Such gestures are useful in non-verbal communication modalities.

Figure 14C:
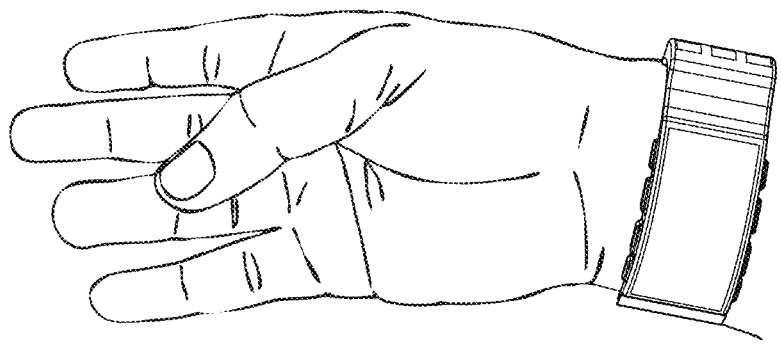
FIGS. 14A-C Illustrate exemplar compound gestures recognizable by the system by pointing the tip of the thumb at various digital and interphalangeal creases and finger-tips while maintaining the wrist at a steady posture and orientation according to one example embodiment.
Figure 14B:
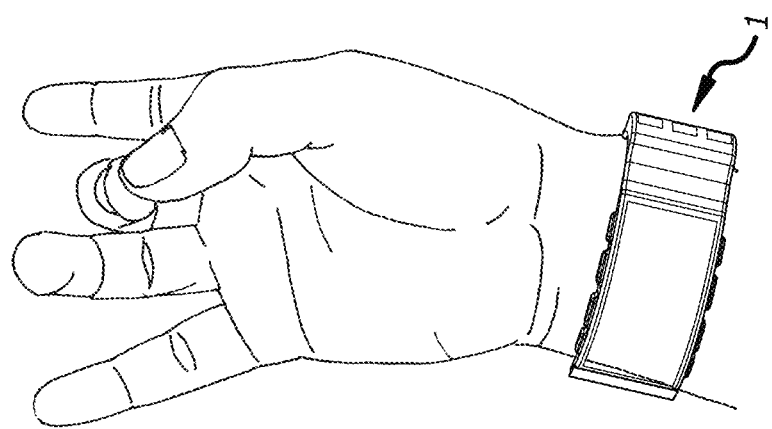
Figure 14A:
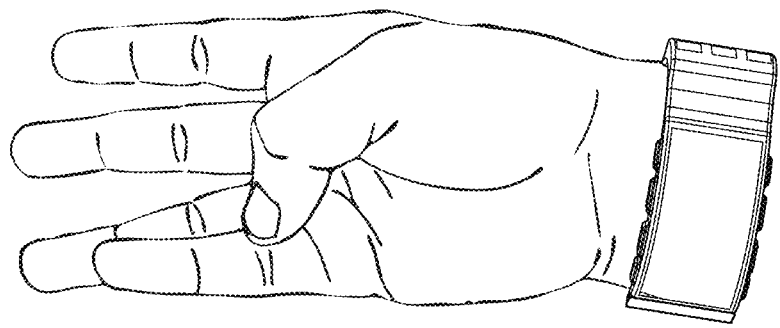

A further gesture illustration is presented in FIGS. 14A-C where the thumb is used as a pointer to digital creases. Each posture represents a unique gesture that can be used to convey pre-determined information.

Figure 15A:
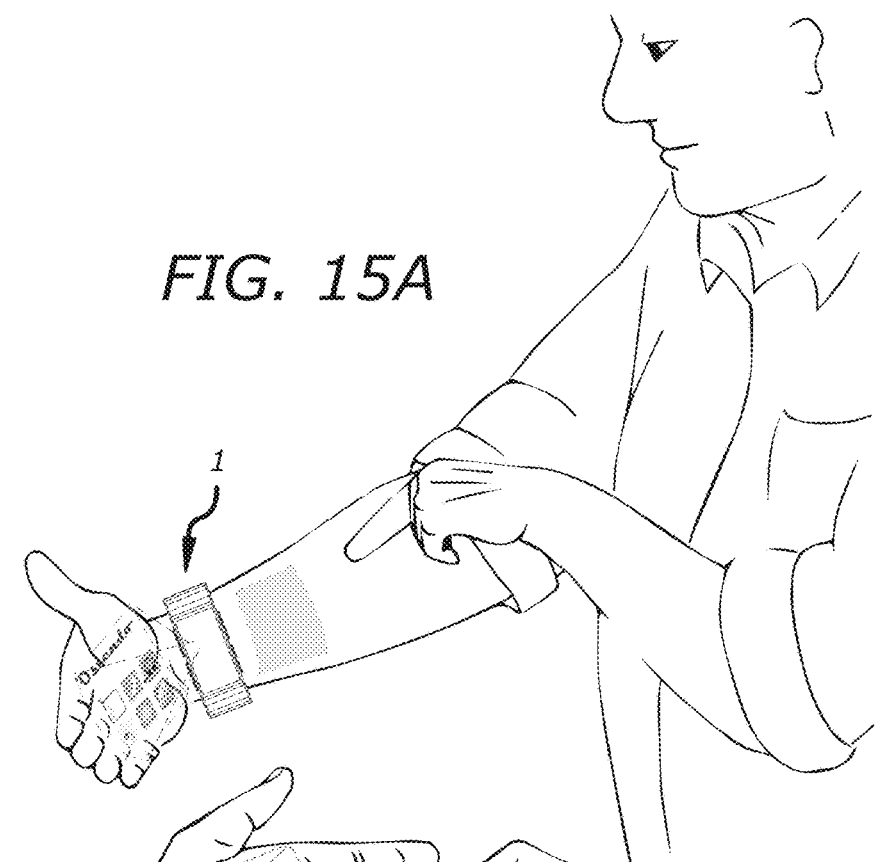
FIGS. 15A-C Illustrate a modality of gesture interaction where a finger of a user's arm is used to interact with the display projected on a surface of the opposite arm according to one example embodiment.
Figure 15B:
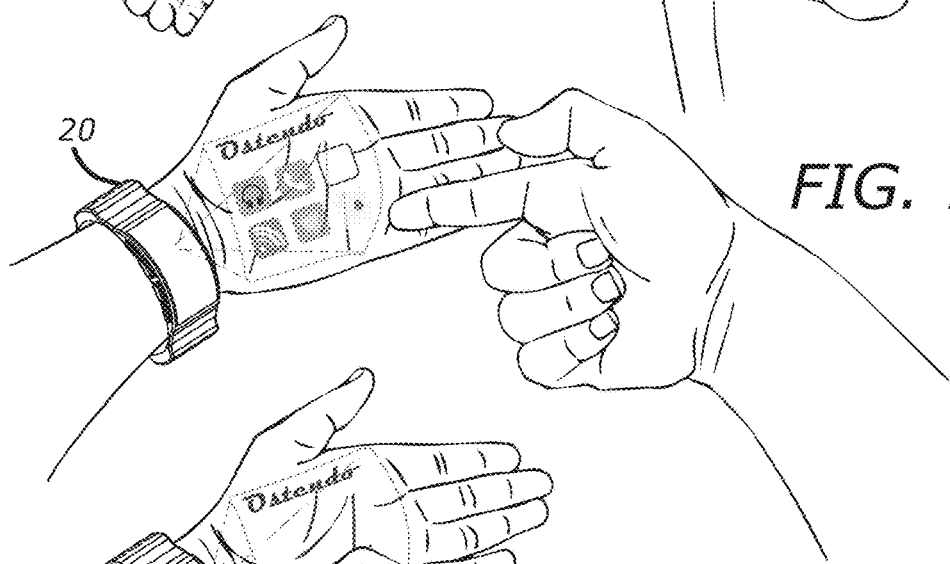
Figure 15C:
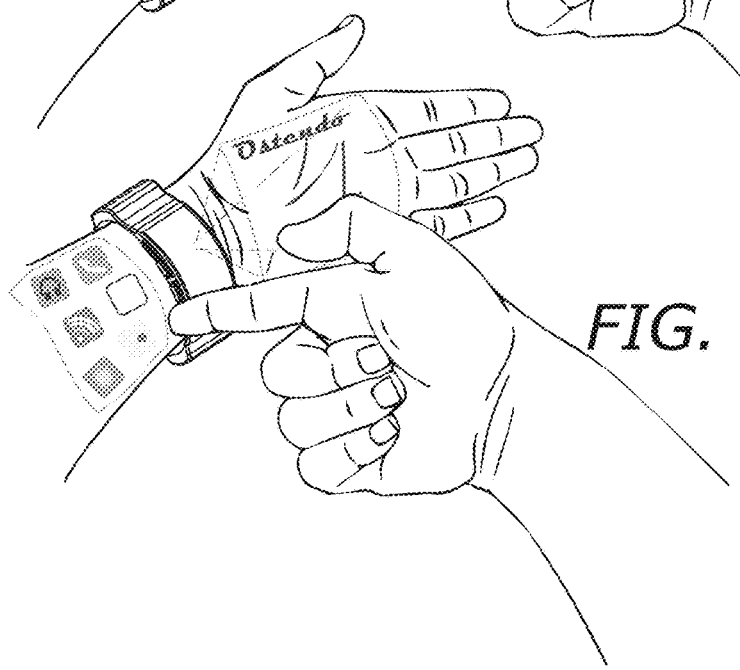

External pressure sources can be localized in the ultrasound signals with a limited resolution. Such localization can be used to implement interactivity. FIGS. 15A-C show embodiments where the projected display is generated on one hand while the other hand is used to apply a point pressure on to the palmar or forearm surface. Using such localization coarse touch gestures can be recognized and represents a two-handed interaction modality.

Figure 16B:
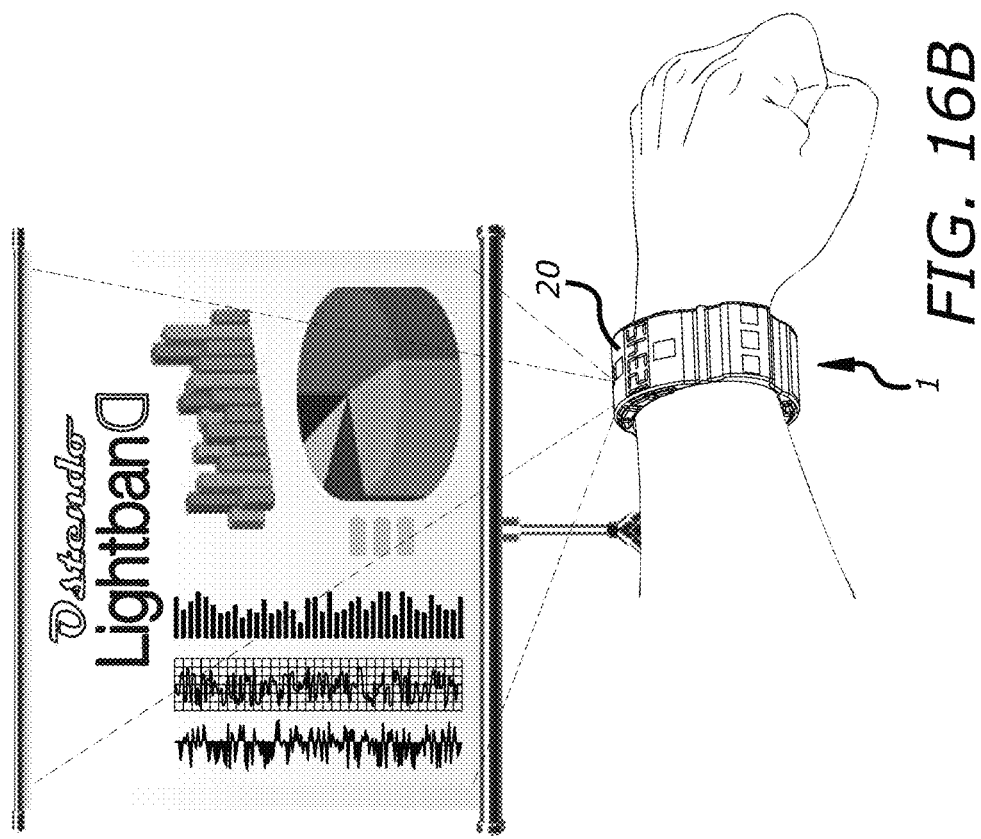
FIGS. 16A-B Illustrate an external display surface being used as the projection surface for a displayed image of the system according to one example embodiment.
Figure 16A:
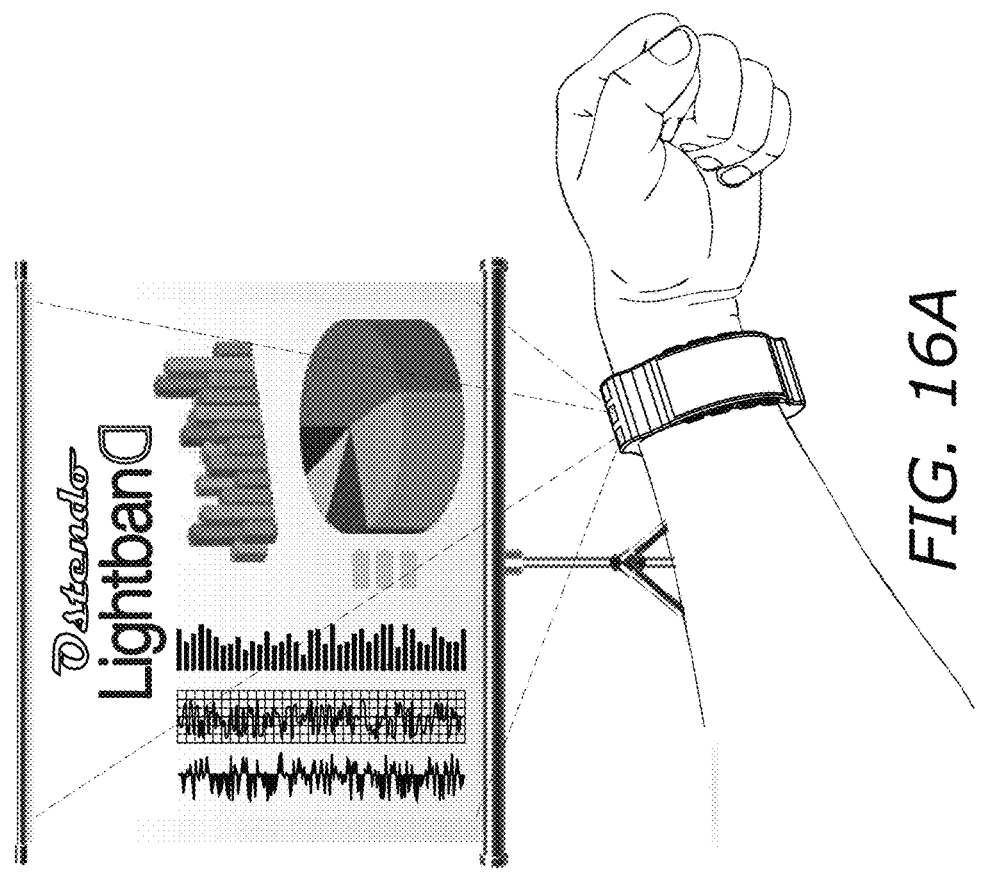

FIGS. 16A-B show an embodiment where instead of projecting the display on a body surface, the projection is directed to an external screen. Such externally projected displays can use hand-based gesture inputs and jitter control managed by use of appropriate software in the skin engine.

In an embodiment, system 1 is worn in or adjacent the orbit region of the skull around the eye (see FIG. 1B) and can be located on either of the zygomatic, temporal, sphenoid or maxilla bones using an adhesive patch or equivalent method. Transceivers 25 may then be used to track the activities of the six ocular muscle groups (superior, inferior, lateral and medial rectus (left/right) and superior and inferior obliques (L/R)) along with levatorpalpebraesuperioris, orbicularis occuli, zygomaticus major/minor and levatorlabilisuperioris. Based on the location of the hardware and the objective of the application, system 1 may track eyelid activity, saccades of the iris, rotation of the scleral region, cheek expression, mouth opening structure, deformation of the ear among other applications. This embodiment is of importance in applications where it is important to track the eye, such as in augmented and virtual reality wearable displays.

Similarly, system 1 may be worn on the human throat (see FIG. 1B). Similar to the previous application, system 1 can be used to track rapid fluctuations in the human vocal tract and associated biomechanical structural changes. These fluctuations can be used in multiple applications. For example, specific voluntary changes in the structure may be used to define gestures similar to how hand postures are used to recognize gestures.

As discussed above, a gesture may comprise a set of postures in a transition between postures or positions of the body or hand. Postures may include information like extension or compression displacements and angular articulation of joints in the hand and body, and corresponding joint velocities. The total number of joints about which such articulations or displacements may take place is referred to as the degrees of freedom ("DOF") of the system. These DOFs may be defined with respect to the body or a body part, such as a wrist or any of the axes or planes of the body or body parts. A collection of postures may be labeled as a gesture. Gestures may include both magnitude of positional displacement or angular articulation information as well as time and velocity information such that the same gesture repeated slowly may be defined differently or may constitute a different gesture.

Figure 17:
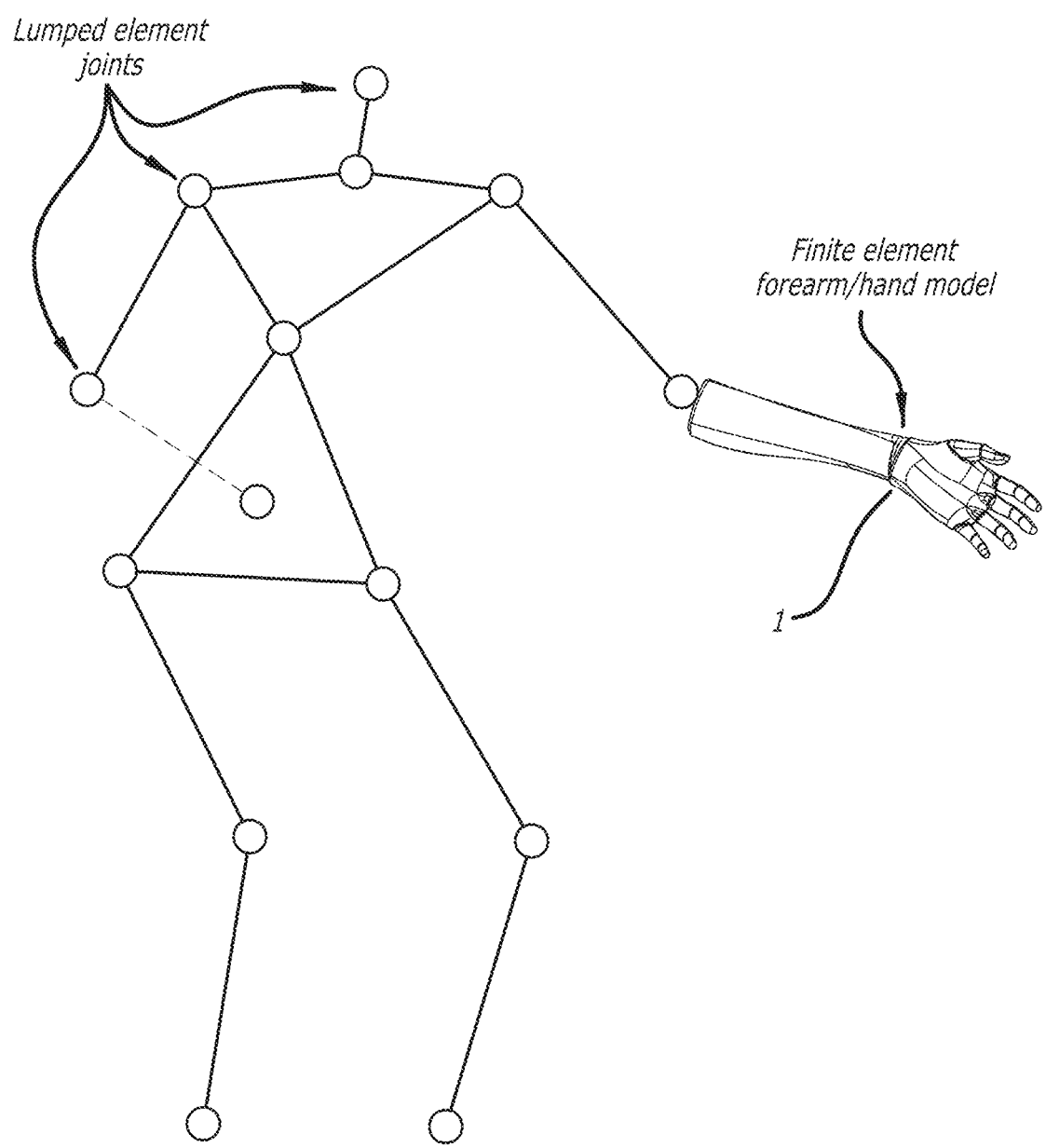
FIG. 17 Illustrates a kinematic model used in an embodiment of the system in reconstructing a full body posture.

Posture of the degrees of freedom in the hand is determined using system 1 and that of the rest of the body is determined using the inertial motion sensors referred to as "I" data. This posture information is used to construct a representative coarse kinematic posture model of the body and the hand as shown in FIG. 17. FIG. 17 illustrates an embodiment where the system (device) is worn on the left hand. This hand region is modeled with high resolution. The rest of the posture of the human body is modeled using coarse lumped elements.

The human body coarse posture model may be constructed using data from the inertial measurement "I" and other sensors contained in the wrist-worn embodiment. Data from such sensors may be processed using model-driven adaptive and non-linear filtering techniques (See Yun, X., Bachmann, E R., *Design, Implementation, And Experimental Results Of A Quaternion-Based Kalman Filter For Human Body Motion Tracking*, IEEE Trans. Robotics, 22 (6), 2006) to obtain and track posture. It is expected that unless another system 1 is worn on the right hand, some degrees of freedom of the lumped human body posture will have higher errors associated with it that are proportional to their distance from the inertial measurement sensors. However, such a body posture model is merely used to coarsely classify the posture of the body into major body posture classifications, such as sitting, standing, walking, kneeling, and crouching, among others and such data is referred to as "B". An approximate location of the head may be estimated with acoustic microphone arrays using sound source localization and a beam-forming algorithm framework. See Zhang, C. et al., *Maximum Likelihood Sound Source Localization and Beamforming for Directional Microphone Arrays in Distributed Meetings*, IEEE Trans. Multimedia, 10 (3), 2008.

Figure 27:
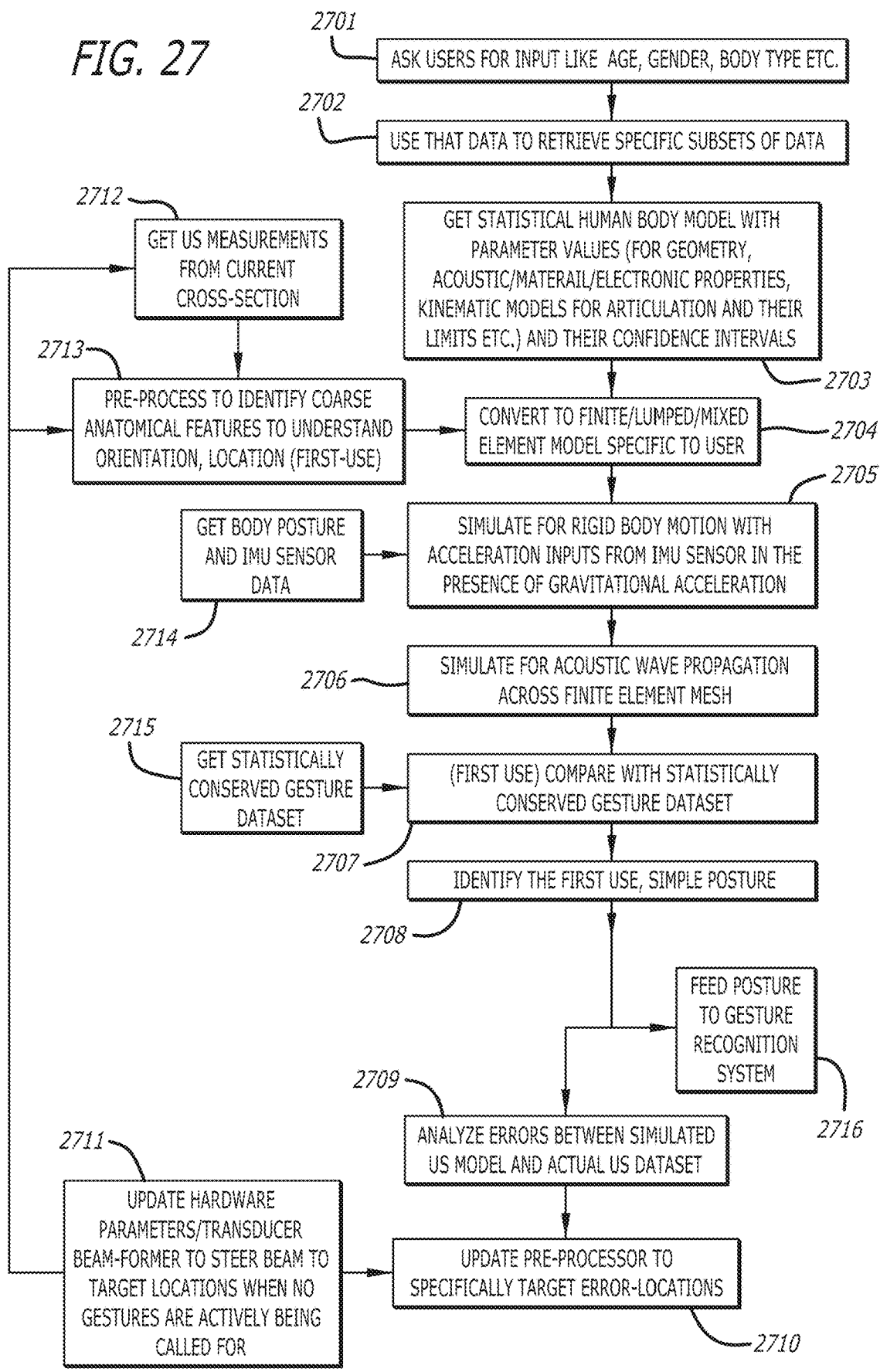
FIG. 27 Illustrates a flow diagram for explaining an example gesture recognition process performed during a startup period of a system according to an embodiment herein.

In a first-use situation of the system and method according to one embodiment, the user may be asked to enter self-identification information, such as age, weight, height, gender, and skin tone, among others. This information may be used to select the initial statistical biological metrics from a database as discussed. Such biological metrics may be provided to automatically populate statistical information about weights and dimensions of different body-parts, tissue thickness among others in a population. This evaluation may be used to determine the initial conditions for the system algorithm and the effect of this identification is gradually removed as more user-specific data is accumulated during use of system 1 and is updated in the biological metrics database. An example process of this first use embodiment is illustrated by FIG. 27. As shown in FIG. 27, at block 2701, a user is prompted for input such as age, gender, body type, etc. At block 2702, the input information is used to retrieve specific subsets of data. A statistical human body model is obtained at block 2703 with parameter values such as geometry, acoustic information, material information, electronic properties, kinematic models for articulation and limits thereof, among others. Confidence intervals for these parameter values may also be obtained.

Based on initial conditions, a simple ultrasound signal generation and acquisition modality, such as A-mode scanning, may be used for the first-use situation as shown in block 2712. At block 2712, ultrasound measurements are obtained from a current cross-section and provided to the pre-processing algorithm at block 2713 to obtain information about orientation and location of the system worn by the user. The data obtained from such scanning along with other sensor or actuator modalities allows the identification of certain biometric parameters, such as the location of the device on wrist or the arm on which system 1 is worn, the circumference of the wrist, and the orientation of band element 5, among others. This initial information may be used to assess locations of certain internal object landmarks, such as radial and ulnar bones, and pulsatile tissue, such as arteries and veins and approximate locations of tendons and other tissue. For example, system 1 may detect its initial orientation by examining the relative sizes of the anechoic bone regions and whether they appear to the left or right with respect to system 1.

At block 2704, the statistical human body model downloaded earlier is converted to a finite element model specific to the user, according to one example embodiment. In some embodiments, the statistical human body model is converted to a lumped element model or to a mixed element model. In one embodiment, the model may be comprised of a dynamic and deformable mesh. In one embodiment, the model may be comprised of at least one numerical optimization routine that operates subjected to kinematic constraints. In one embodiment, the model may be comprised of at least one unsupervised statistical learning model. In one embodiment, the model may be comprised of at least one supervised statistical learning model. In one embodiment, the model may comprise of at least one probabilistic graphical model. This conversion may also consider output from block 2713 which performs pre-processing to identify coarse anatomical features to obtain information about orientation and location of the system with respect to the user. At block 2714, body posture and inertial sensor data (IMU sensor data) is obtained and used at block 2705 to simulate for rigid body motion of the system with acceleration inputs from the IMU sensor in the presence of gravitational acceleration.

At block 2706, acoustic wave propagation across the generated finite element mesh model is simulated. At block 2715, a statistically conserved gesture dataset is obtained and compared at block 2707 to the simulated dataset obtained in block 2706. At block 2708, a first-use, simple posture is identified through the comparison and the posture is passed to the gesture recognition system at block 2716. At block 2709, errors between the simulated ultrasound model and actual ultrasound data are analyzed and the pre-processor, a control program resident in memory with reconfigurable instructions, is updated to target the error locations at block 2710 and obtain higher quality data from the error locations, where higher quality is defined by the tunable acoustic focus depth, number of scan elements, filter parameters, among others. At block 2711, hardware parameters stored in volatile or non-volatile memory used in scanning are updated to attend to error or uncertain regions. For example, the beam former may be tuned to steer a beam to target locations when no gestures are actively being called for by the system.

Due to the statistically similar nature of human anatomy, some simple gestures, such as those from the articulation of the wrist or clenching motion of the palm, may be directly recognized without any further input or training by the system 1 from the data obtained from block 2716. For example, pronation and supination or roll at the wrist as shown in FIGS. 7A-C results in significant relative bone displacement and can be readily detected. Similarly, carpal yaw may generate rotations of system 1 due to skin tissue piling at the edges of band element 5 which can be detected through inertial sensors. Therefore such simple gestures may be used immediately in controlling the device while finer aspects of such gestures are being learned by the system 1.

After such initialization, system 1 may direct the user to go through certain pre-determined sequences of postures or gestures meant to improve the identification and targeting of internal tissue engaged in biomechanical motion. This is referred to as "initial algorithm adaptation".

Conventional approaches rely on creating numerous "tags" for datasets by requiring the user to perform a specific gesture that is correlated with the tag and then storing the data related to the tag. These gesture recognition processes then merely correspond to measuring the highest correlation between current and stored data and returning the tag as the identifier of the gesture.

A problem with creating tagged datasets is that expert supervision is required to maintain tag consistency. For example, upon being asked to articulate the forefinger, if a user moves their middle finger, that gesture ends up being identified as a forefinger gesture. Therefore, such training approaches require the user to pay significant attention to ensure correct responses. Another problem with this conventional approach is that there is sympathetic coupling between finger movements—different people have different abilities to move one finger independent of another and repeatedly. This confuses discriminative algorithms even if the user believes they only moved a single finger.

Instead, the methods disclosed herein do not use tags or labels-based training. During the "initial algorithm adaptation" process, no particular gestures or actions are suggested to the user. They may merely be provided a spatial feature or icon using the projected light display on the palm or forearm that users are expected to react to using whatever gesture is convenient, intuitive or natural to them. Additionally, users may be asked to extend or flex their fingers and wrists to the maximum and minimum comfortable limits to determine their unique joint flexural/extensional limits. These requests may be presented in a particular sequence by system 1 selected to highlight specific anatomical features as the user undergoes motion. For example, an icon representing a button may be displayed that the user may interact with using the flexion of one finger. In another example, a game may be used to the same purpose. The process may be repeated several times including projections over either dorsal or palmar/ventral surfaces. During this "initial algorithm adaptation" process various statistical, machine learning and optimization algorithms are used to construct higher fidelity models of the users specific internal anatomy.

During such interaction, the tissue object US data is collected, stored and processed either locally or over a network. Information is collected on muscle, tendon, vasculature, and tissue biomechanics, and deformation to inform the mathematical model of system 1.

Figure 18A:
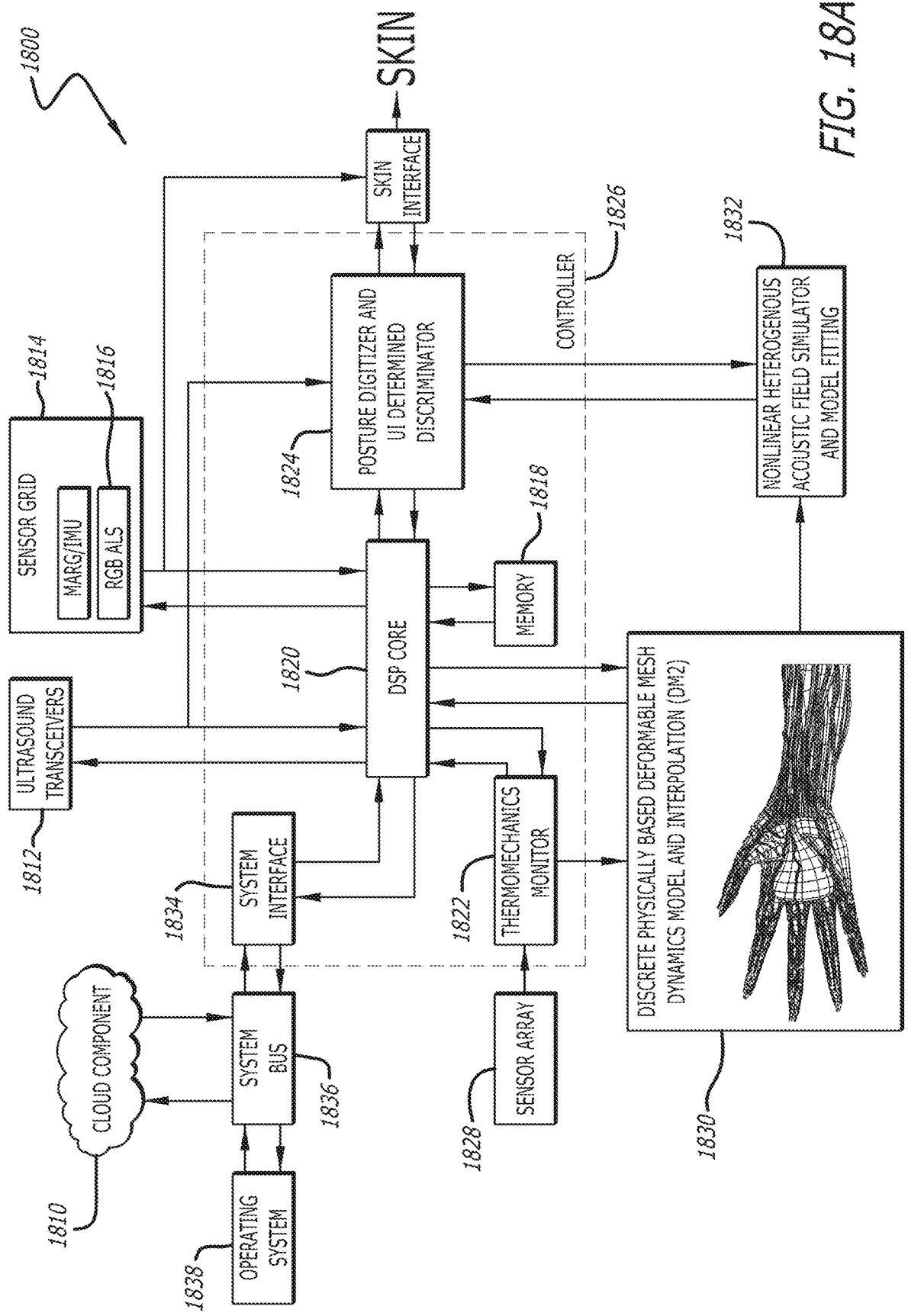
FIG. 18A Illustrates an architecture of the ultrasound transceiver-based, on-body gesture recognition system according to one example embodiment.

FIG. 18A illustrates an example architecture 1800 of the posture and gesture recognition system (such as system 1) according to an embodiment herein. It comprises a software or hardware application controller which communicates with ultrasound transceivers 1812 (e.g., arrays of US transceiver 25), other sensors in the system 1814 and 1816 and the operating system 1838 of system 1. It may be connected to an external software or hardware appliance accessible over a wide area network through the operating system 1838, referred to as the cloud component 1810 of system 1.

As depicted in FIG. 18A, the controller 1826 may comprise of networking and communications peripheral interfaces 1834, memory 1818 and a digital signal processor (DSP) core 1820. The DSP core may have dedicated segments that perform specific functions. For example, the data from the mesh grid thermal temperature sensors 1828 (such as temperature sensors 45) may be fed to a thermo-mechanical monitor segment 1822 that tracks internal tissue temperature distribution. Other dedicated segments on the DSP may be a posture digitizer segment 1824, an acoustic field simulator (AFS) segment 1832 and a physically-based deformable mesh dynamics model (DM2) simulator 1830 in addition to the pre-processor 2710 and hardware settings 2711. Each of these segments may benefit from the input sensor signals from the sensor grid received by the controller 1826.

The controller 1826 functions to collect and process signals received from ultrasound transceiver 1812 and ASICs (such as ASICS 110), determines the instrumented signal generation and acquisition algorithms and protocols, configures, maintains and updates the pre-processor 2710, analyzes and deciphers the internal tissue object structure, analyzes and deciphers the posture and gesture based on the user interface controller, verifies and tracks posture data using the simulator segments or lookup tables (LUT) and feeds the posture data forward to the pico projector 20 interface. The controller 1826 opportunistically stores and analyzes algorithm parameter data and passes it to the cloud component 1810 of system 1 via system bus 1836. The cloud component may be configured to modify some or all of the parameters related to instrumented signal generation and acquisition algorithms.

Upon first-use, such as that presented in FIG. 27, the controller retrieves biological metrics data for the tissue objects specific to the input provided by the user such as from the cloud component and uses it to populate parameters in the local AFS and DM2 models. The object data provided by the first-use algorithm adaptation process may be used to identify tissue, bone, vasculature, and liquid segments, landmark features, and correlate the data with data contained in the biometric mathematical model. This correlation process may modify the biological metric data to reflect biological object data specific to the user. Additional tissue object data from the adaptation sequence identifies the deformation bounds for all such features including joint flexural and extensional limits. After adapting the parameters, this object data is submitted to the local DM2 simulators that generate a volumetric finite-element-based or mathematical description of the anatomical feature, as well as to the cloud component of system 1.

Some tissues in the body, such as the tendons, may deform, rotate and bend in three dimensions while changing postures, or such as when the arm is in contact with other surfaces, or if pressure is applied to the skin on the forearm. This may correspond with an inertially-induced rotation or slip of band element 5 with respect to the hand or elastic deformation of an internal tissue structure. It is known that tendons and muscles have highly anisotropic US acoustic properties. Therefore, such rotations and deformations may cause the tissues to not be observable by transceivers 25. Also, when an arm is at rest against a surface, the quality of the sonographic signals is markedly different from that obtained when the arm is hanging free. Consequently, it is desirable to account for such conditions to improve user experience and the usability of the device. The DM2 and AFS simulators of system 1 are configured to take such situations into account.

Figure 18B:
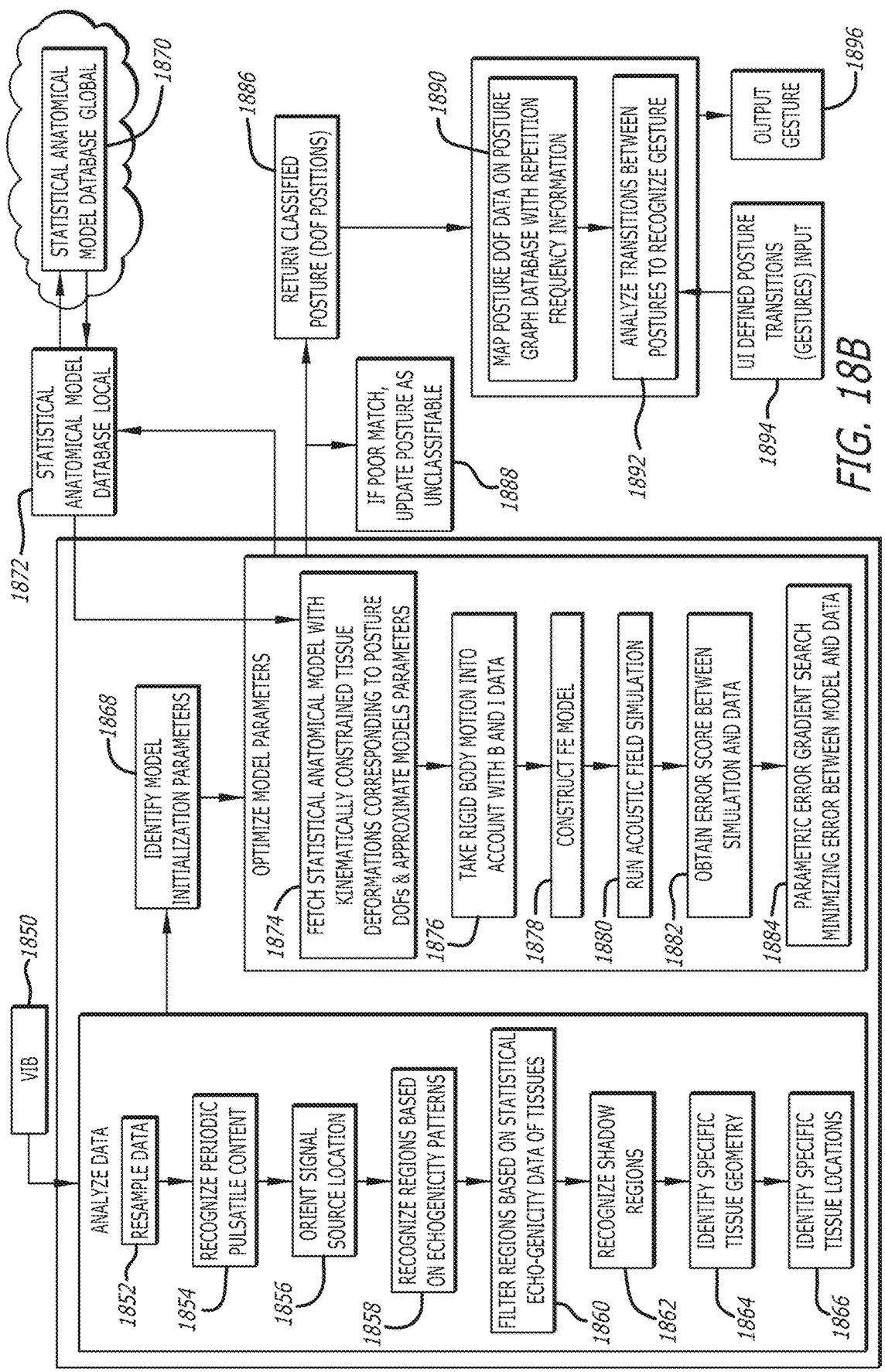
FIG. 18B Illustrates a flow-chart of a set of process steps according to one example embodiment.

In an embodiment of the method of FIG. 18B, inputs 1850 in the form of ultrasound signal voltages from transceiver 25 ("V"), inertial measurement sensors ("I") and body orientation values ("B") are received in system 1 memory for processing (collectively referred to as "data" in FIG. 18B). In embodiments involving one or more systems 1, this data may also include ultrasound signal voltages, interial measurement sensors and body orientation values from the other systems.

In an example embodiment, the received data is resampled at block 1852 and analyzed to identify periodic pulsatile content at block 1854, then analyzed to orient the tissue object signal source location at block 1856, the output of which is analyzed for recognition of tissue object regions based on echogenicity patterns at block 1858.

At block 1860, object regions may be filtered based on statistical echogenicity data of human tissue/anatomy and shadowed regions in the data may be segmented and identified as shown in block 1862. At blocks 1864 and 1866, specific tissue object geometries and locations may be identified using the output of the previous step which may then be used to identify and generate a set of model initialization parameters for the DM2 mathematical model. A collection and repetition of such steps are collectively represented by the block 1868.

The generated model initialization parameters are identified and optimized from the analyzed tissue object data using statistical anatomical model database both from the cloud and locally in system 1.

Using the optimized model parameters, a statistical anatomical model with kinematical constrained tissue deformations corresponding to approximated posture degrees of freedom ("DOF") and approximate model parameters are each fetched from system 1 memory at block 1874. At block 1876, information on rigid body motion is collected from the inertial measurement sensors (I) and body orientation values (B) data. At block 1878, mathematical model of the anatomical feature is constructed such as by using lumped and finite element analysis techniques.

Figure 35:
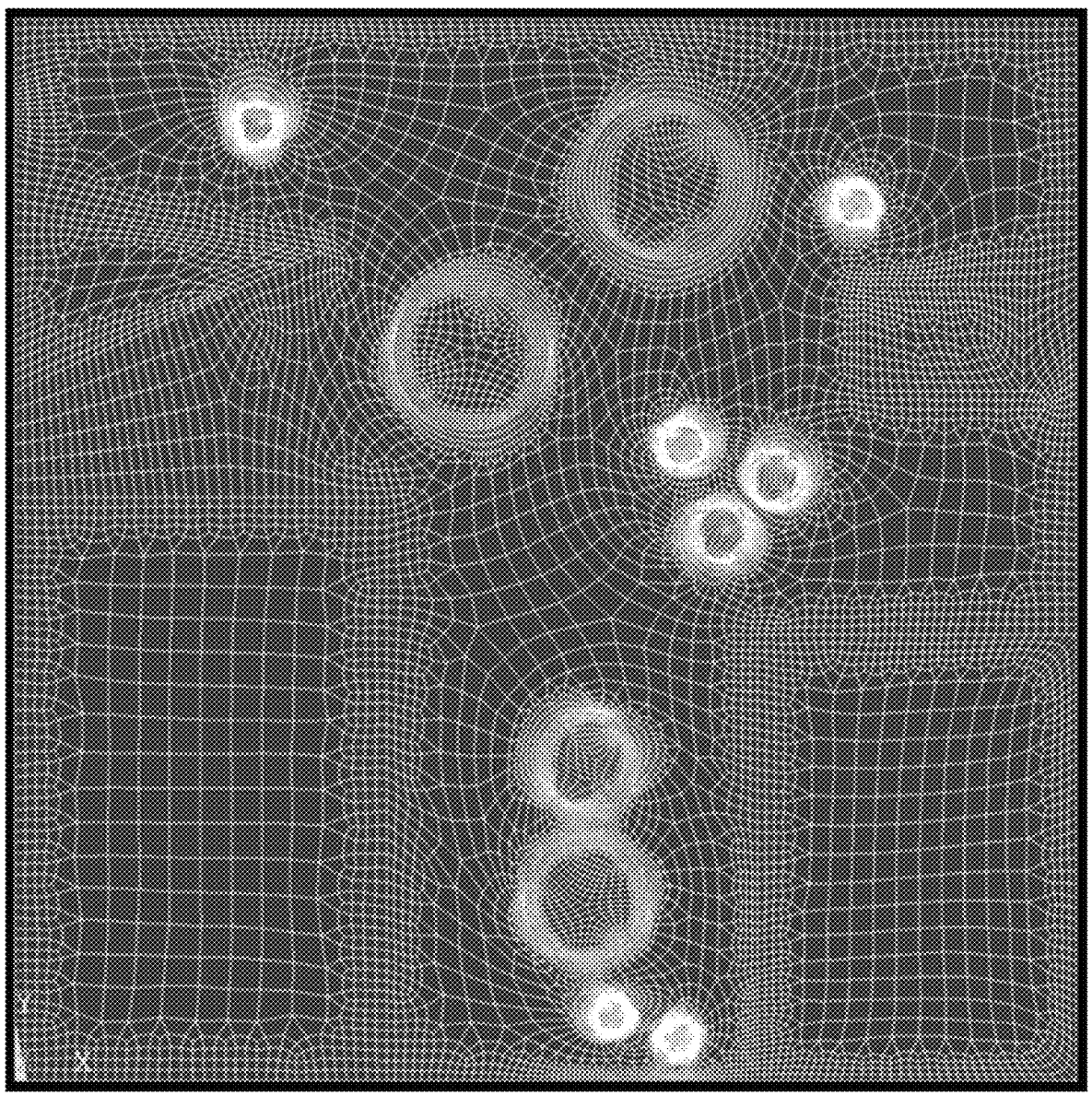
FIG. 35 Is a representation of meshes generated from simplified boundary information according to an embodiment herein.

The IMU input "I" is used to define the coordinate reference frame translational and rotational accelerations, which sets up the inertial reaction (inertial relief) forces used in a mathematical finite element model comprised of the entire system hardware, human body anatomical features, as well as the entire interface between the human body and the system. An example of the mathematical system of equations used to construct the finite element representation is given by:

$$M\ddot{u}(t) + C\dot{u}(t) + Ku(t) + F^I(t) = F^a(t) \text{ with,}$$

$$F^a(t) = F^{nd} + F^{ac} + \sum_{m=1}^{N}(F_e^{th} + F_e^{pr}) \text{ and,}$$

$$a_c = \begin{bmatrix} a_t \\ a_r \end{bmatrix}$$

$$a_t = a_t^d + a_t^l + a_t^r$$

$$a_r = a_r^l + a_r^r$$

where: M is the structural mass matrix, C is the structural damping matrix, u(t), u̇(t) and ü(t) are the nodal displacement, velocity and acceleration vectors, K is the total stiffness matrix, $=\Sigma_{m=1}^{N}K_e$, where N is the number of elements, $K_e$ is the element stiffness matrix, $F^l(t)$ and $F^a(t)$ are internal and applied load vectors, with $F^{nd}$, $F^{ac}$, $F_e^{th}$, and $F_e^{pr}$ the applied nodal load, the acceleration load, element thermal load and element pressure load vectors respectively, with the total mass matrix given by $\Sigma_{m=1}^{N}M_e$ where, $M_e$ is the element mass matrix. Also, $a_c$, $a_t^d$, $a_t^l$, $a_t^r$, $a_r^l$, and $a_r^r$ represent total acceleration vector, accelerations in global Cartesian frames, translational acceleration due to inertia relief, translational acceleration due to rotations, rotational acceleration due to inertia, angular acceleration due to input rotational accelerations respectively. FIGS. 19 and 35 show the graphical illustration of the elemental matrices used in the present application. The IMU provides the accelerance information used in the mixed elements formulation presented here.

The finite element formulation aspect of the mathematical model allows the system to take mechanical deformations, translations, rotations, vibrations and elasticity of the objects constituting the entire system hardware, human body anatomical features, as well as the entire interface between the human body and the system into account. Since some specific tissue, such as bones, may not be compressible as compared with surrounding tissue such as muscle or blood, they may be modeled more simply as lumped elements with no compressible or elastic degrees of freedom associated with them. A combination of such lumped elements along with finite elements is referred to as "mixed elements" henceforth. It is conceivable that such a full mixed elements simulation may be pre-computed off-line or elsewhere and only pertinent coefficients or LUTs may be directly obtained from the cloud component 1810 in real-time, with only a limited aspect of a simple interpolation scheme occurring on the device in real-time.

In an example embodiment, after the simulation with the mixed element formulation is finished and elemental deformations and displacements under the influence of body dynamics and gravity are calculated, the resulting system is then submitted for acoustic field simulation in block 1880. In this step, the generation and transmission of the ultrasound wavefront is simulated through the numerical mathematical model represented by the system of equations in the mixed element formulation. The simulated wavefront may then undergo reflection, refraction and scattering around the objects in the mathematical model and the reflection, refracted and scattered signals may consequently be sampled from the simulation to produce an estimate of the quality of the practically measured ultrasound signal collected by the hardware in system 1.

The acoustic field simulation model may comprise of a discretized version of the general inhomogeneous Helmholtz equation given by, $$\nabla \cdot \left(\frac{1}{\rho_0}\nabla p\right) + \frac{\omega^2}{\rho_0 c^2}p + j\omega\nabla\cdot\left[\frac{4\mu}{3\rho_0}\nabla\left(\frac{1}{\rho_0 c^2}p\right)\right] = -j\omega\frac{Q}{\rho_0} + \nabla\cdot\left[\frac{4\mu}{3\rho_0}\nabla\left(\frac{Q}{\rho_0}\right)\right]$$

where the finite element representation has the form, $$\iiint_{\Omega_F}\frac{1}{\rho_0 c^2}NN^T dv\ddot{p}_e + \iiint_{\Omega_F}\frac{4\mu}{3\rho_0^2 c^2}\nabla N^T\nabla N dv\dot{p}_e +$$

$$\iiint_{\Omega_F}\frac{1}{\rho_0}\nabla N^T\nabla N dv p_e + \oiint_{\Gamma_F} Nn^T N'^T ds \ddot{u}_{e,F} =$$

$$\iiint_{\Omega_F}\frac{1}{\rho_0}NN^T dv\dot{q} + \iiint_{\Omega_F}\frac{4\mu}{3\rho_0^2}\nabla N^T\nabla N dvq$$

and the discretized wave equation is given by:

$$M_F\ddot{p}_e + C_F\dot{p}_e + K_F p_e + \bar{\rho}_0 R^T \ddot{u}_{F,e} = f_F$$

where, c is the speed of sound in the medium, $\rho_0$ is the mean fluid density, K is the bulk modulus of the medium, u is the dynamic viscosity, p (=p(x,y,z,t)) is the acoustic pressure, Q is the mass source in the continuity equation modeled as a constant, t is time, j is sqrt(−1), w=2πf, f is the frequency of oscillations of pressure, dv is the differential volume in the acoustic domain $\Omega_F$, ds is the surface differential in the acoustic domain boundary $\Gamma_F$, n̂ outward normal unit vector to boundary $F_F$, q is the nodal mass source vector and $\dot{q}$ is the first derivative of the nodal mass source vector and $\bar{\rho}_0$ is the acoustic fluid mass density constant.

The acoustic fluid mass matrix is described by, $$M_F = \bar{\rho}_0 \iiint_{\Omega_F}\frac{1}{\rho_0 c^2}NN^T dv$$

the acoustic fluid damping matrix is given by, $$C_F = \bar{\rho}_0 \iiint_{\Omega_F}\frac{4\mu}{3\rho_0^2 c^2}\nabla N^T\nabla N dv$$

the acoustic fluid stiffness matrix is given by $$K_F = \bar{\rho}_0 \iiint_{\Omega_F}\frac{1}{\rho_0}\nabla N^T\nabla N dv$$

the acoustic boundary matrix is given by, $$R^T = \oiint_{\Gamma_F} Nn^T N'^T ds$$

and the acoustic fluid load vector is given by, $$f_F = \bar{\rho}_0 \iiint_{\Omega_F}\frac{1}{\rho_0}NN^T dv\dot{q} + \bar{\rho}_0 \iiint_{\Omega_F}\frac{4\mu}{3\rho_0^2}\nabla N^T\nabla N dvq$$

The elemental description used in the AFS is obtained from the results of the mixed-elements modeling and with pressure distribution, acoustic impedance values among others obtained from LUTs. At block 1880, an acoustic field simulation is run and an error score generated between the simulation data and the optimized data at block 1882. It is conceivable that such a full acoustic field simulation may be pre-computed off-line or elsewhere and only pertinent coefficients or LUTs may be directly obtained from the cloud component 1810 in real-time, with only a limited aspect of a simple interpolation scheme occurring on the device in real-time.

Subsequently, a parametric error gradient search may be performed to minimize the error between model parameters and measured data ("V") at block 1884. The output of the optimization process is then fed back to the local statistical model database at block 1872 and, in turn, to the global statistical object model database of biological metrics of the objects at block 1870. The output of the optimization step is used to return a classified posture represented as a set of DOF positions at block 1886 or, if a poor match, is updated as an unclassified posture at block 1888.

The output of classified posture may then be used to map the posture DOF data in a posture graph database or a probabilistic graph model along with, but not limited to, information such repetition frequencies at block 1890. This may then be used to analyze the transitions between postures to recognize a gesture at block 1892. Software user interface (UI) or application programming interface defined postures may also be received by the system 1 at block 1894. A gesture is then recognized and output at block 1896 and a gesture command in the form of an executable computer instruction is performed based on the mapped posture DOF data and analyzed posture transactions.

Figure 28:
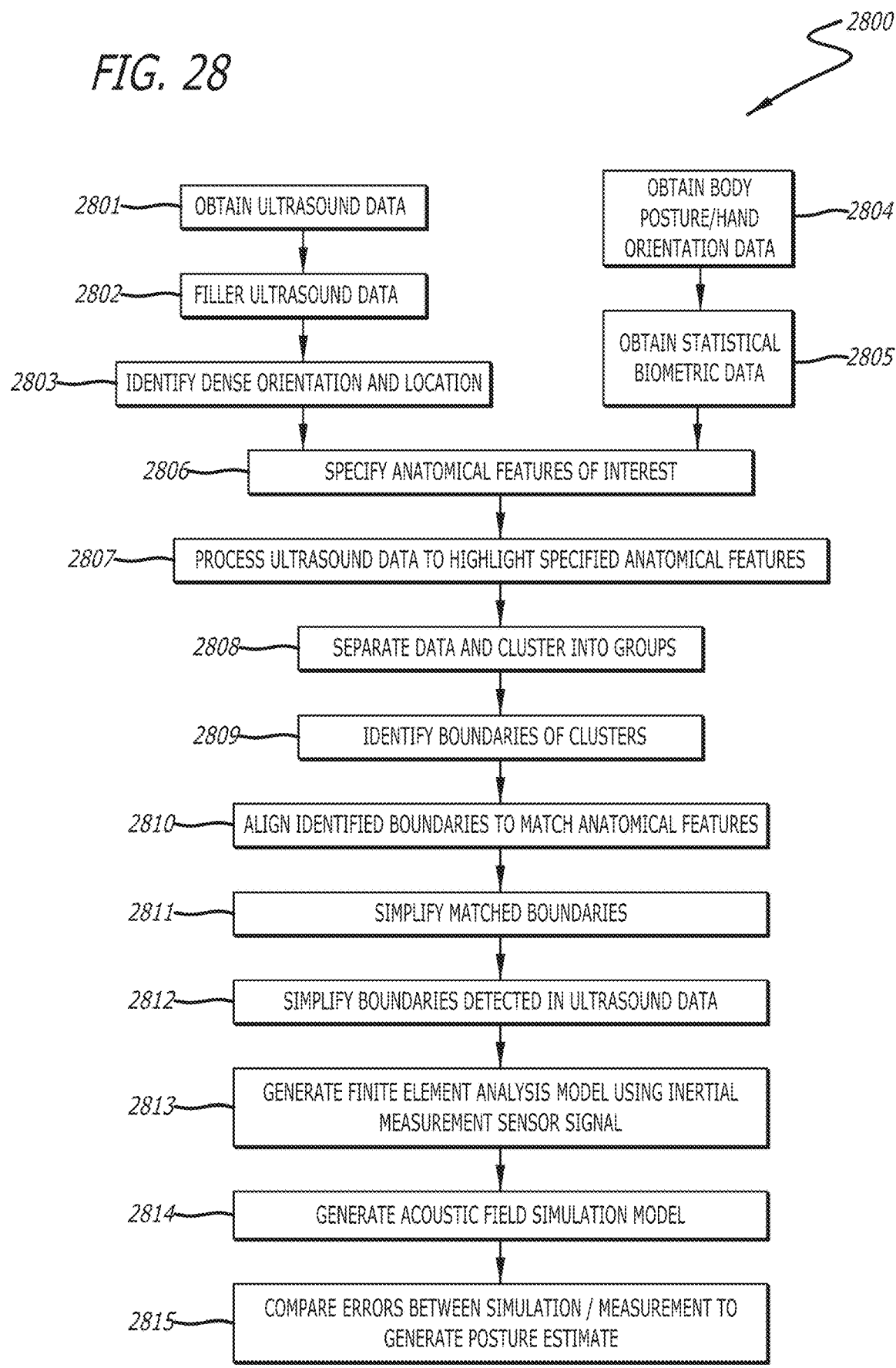
FIG. 28 Illustrates a flow diagram for explaining an example gesture recognition process according to an embodiment herein.
Figure 29:
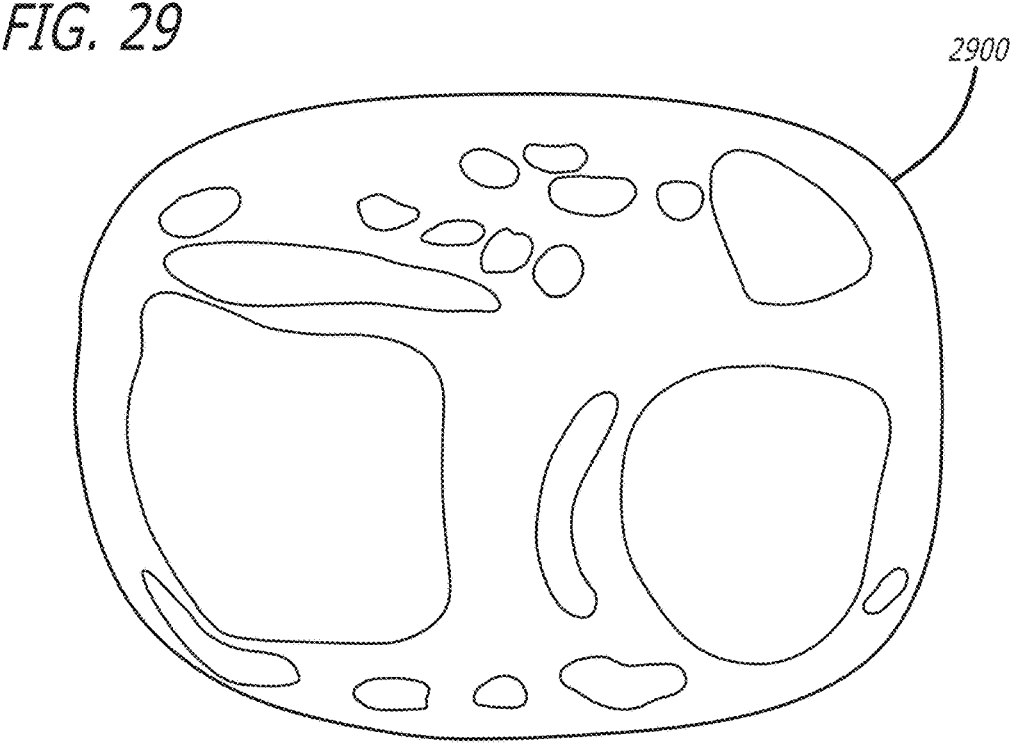
FIG. 29 Is a representation of a human body according to statistical biometric data according to an embodiment herein.
Figure 30:
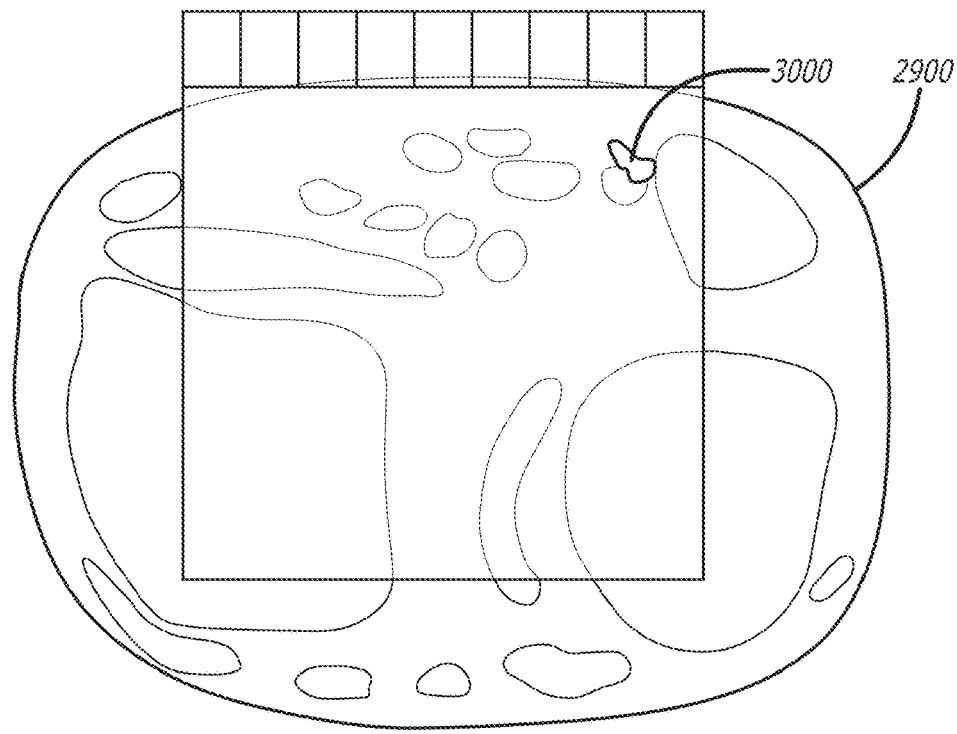
FIG. 30 Is a representation of an identified location of a system being worn by a user according to one embodiment herein.
Figure 31:
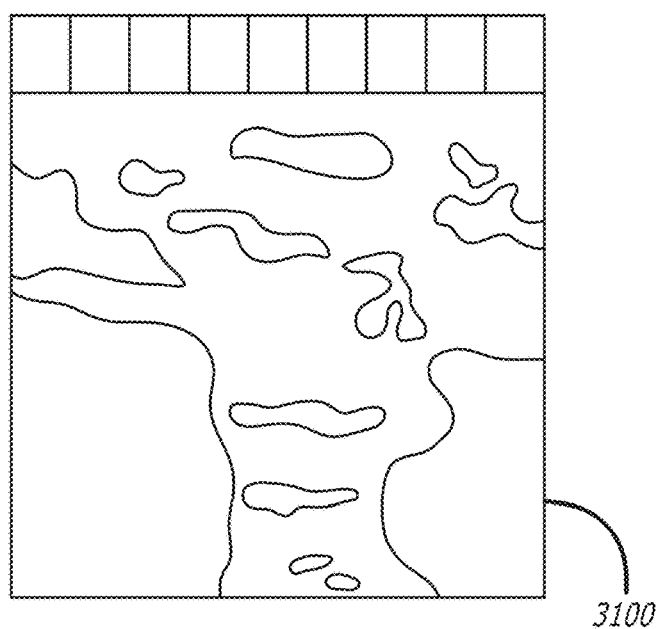
FIG. 31 Is a representation for explaining identification of boundaries of clusters of data that have been separated according to one embodiment herein.

Blocks 1850 to 1886 of FIG. 18B will now be described according to one example embodiment with reference to flowchart 2800 of FIG. 28. Turning to FIG. 28, at block 2801, ultrasound data is obtained from the system (such as system 1). In one embodiment, the set of ultrasound data may be sparse and banded, such that it may be sent using real time voice over IP protocols. The ultrasound data may be used to setup simulation parameters; however baseline simulation results may be on the cloud component. At block 2802, the ultrasound data from block 2801 may be resampled and filtered for noise and imaging artifacts. In one embodiment, the data may be filtered using time averaged filter techniques. At block 2803, the orientation and location of the system (device) can be identified with respect to anatomy of the human body. FIG. 30 illustrates an example identified location 3000 of a device with respect to anatomy 2900. At block 2804, body posture information and hand orientation data are obtained to identify query parameters for the body model dataset (which may be obtained from a cloud component such as cloud 1810). In this regard, inertial data may be used to construct database queries that are converted to closest posture approximations where the database comprises of statistical human body data and pre-simulated datasets. The dataset corresponding to the closest approximation may be returned to the device. At block 2805, statistical human body data comprising biometric data is obtained (which may be obtained from a cloud component such as cloud 1810). FIG. 29 illustrates an example of a representation 2900 of statistical human body data. Anatomical features of interest are specified at block 2806 using the localization information and the human body model. At block 2807, the ultrasound data is processed to highlight specific anatomical features of interest. Multiple thresholds and morphological features are examined. This processing may be considered a "pre-processing" technique and may be used to determine which hand a user is wearing the device on, for example based on radial or ulnar bone shapes, sizes and arterial regions. The processing at block 2807 results in segmentation of regions of interest from background data of the ultrasound signal. At block 2808, individual clusters of data are identified and separated. At block 2809, boundaries of the clustered data are identified as shown by representation 3100 in FIG. 31.

Figure 32:
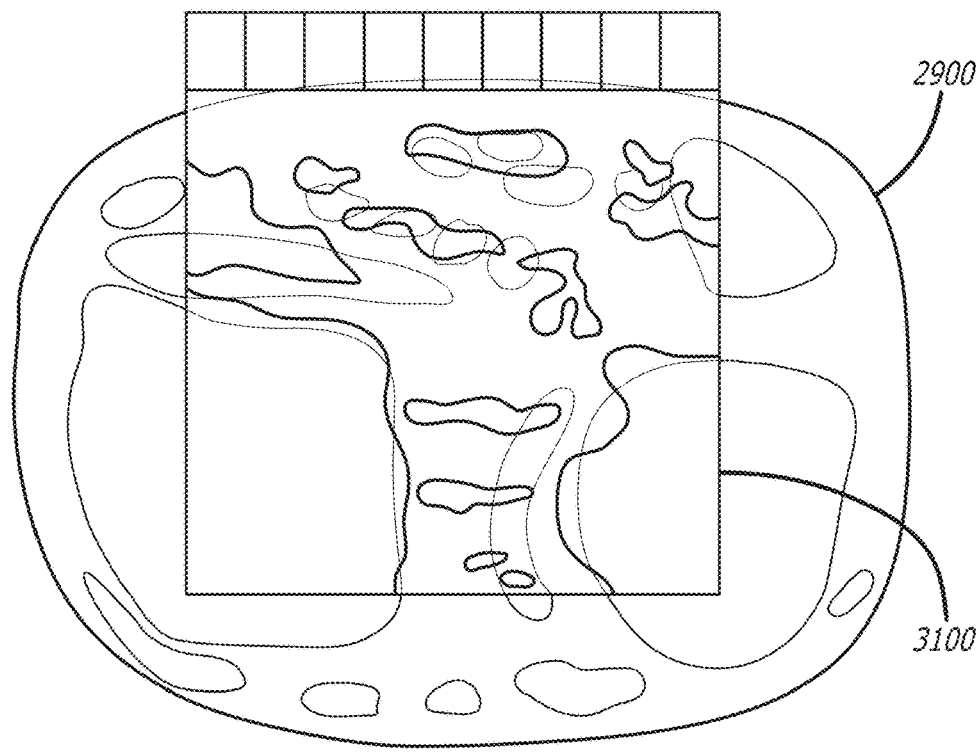
FIG. 32 Is a representation for explaining alignment of detected boundaries with anatomical features according to an embodiment herein.
Figure 33:
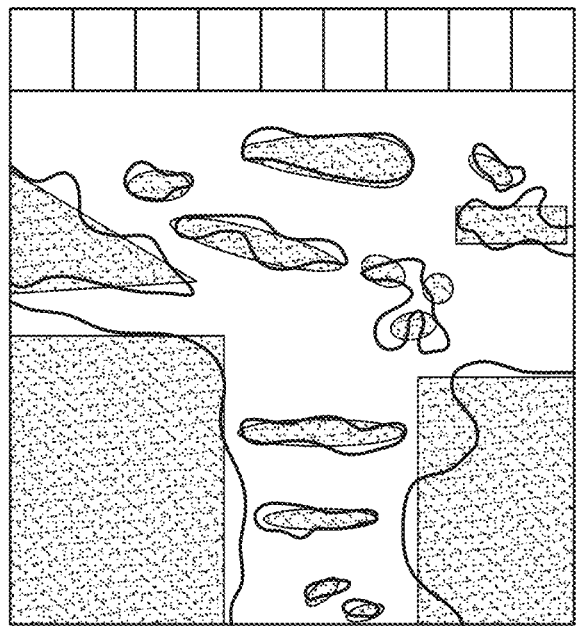
FIG. 33 Is a representation for explaining simplification of aligned boundaries through erosion or dilation according to an embodiment herein.
Figure 34:
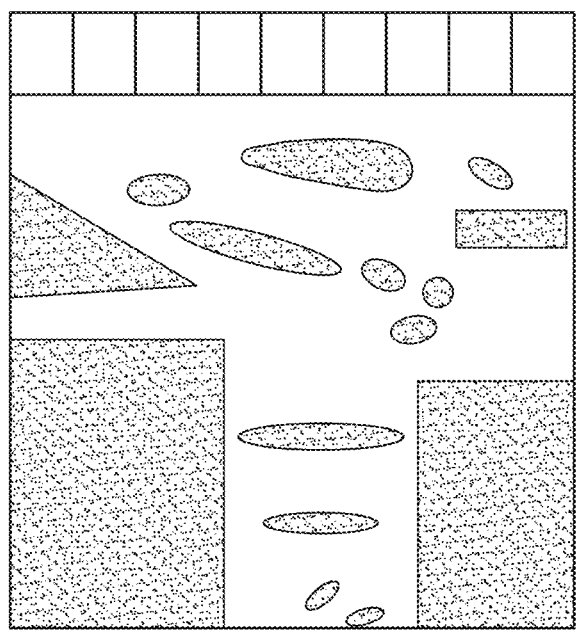
FIG. 34 Is a representation for explaining simplification of boundaries detected in ultrasound data according to an embodiment herein.

Identification of approximate regions may be used to determine approximate shapes, diameters, locations, geometry and striation density, among other features associated with the regions. These metrics may then be used to correlate the measured ultrasound signal with expected anatomical features. At block 2810, boundaries 3100 identified at block 2809 are aligned to best match anatomical features 2900 based on statistical human anatomy as shown in FIG. 32. At block 2811, the aligned boundaries are simplified as shown in FIG. 33, for example through erosion and dilation or keypoint removal techniques and at block 2812 simplified boundaries are detected in ultrasound data as shown in FIG. 34. At block 2813, meshes are generated from the simplified boundaries detected at block 2812. FIG. 35 illustrates example meshes generated from simplified boundary information. In one embodiment, rigid body motion of the system is considered by receiving input from inertial measurement sensors. At block 2814, an acoustic field simulation (AFS) model is generated. Finally, at block 2815, errors between the simulation data and the measurement data are compared to generate a posture estimate. As shown in FIG. 18B, this error information may be passed to the probabilistic graph/network.

It is to be understood that despite earlier and later references to specific image processing operations, the operations are carried out on sparse numeric arrays that encode the analytic envelope of echo data arranged per spatial distribution of scan-lines, among other features, and not "images" obtained from scan-conversion and grid interpolation as used for image formation.

Figures 19A, 19B:
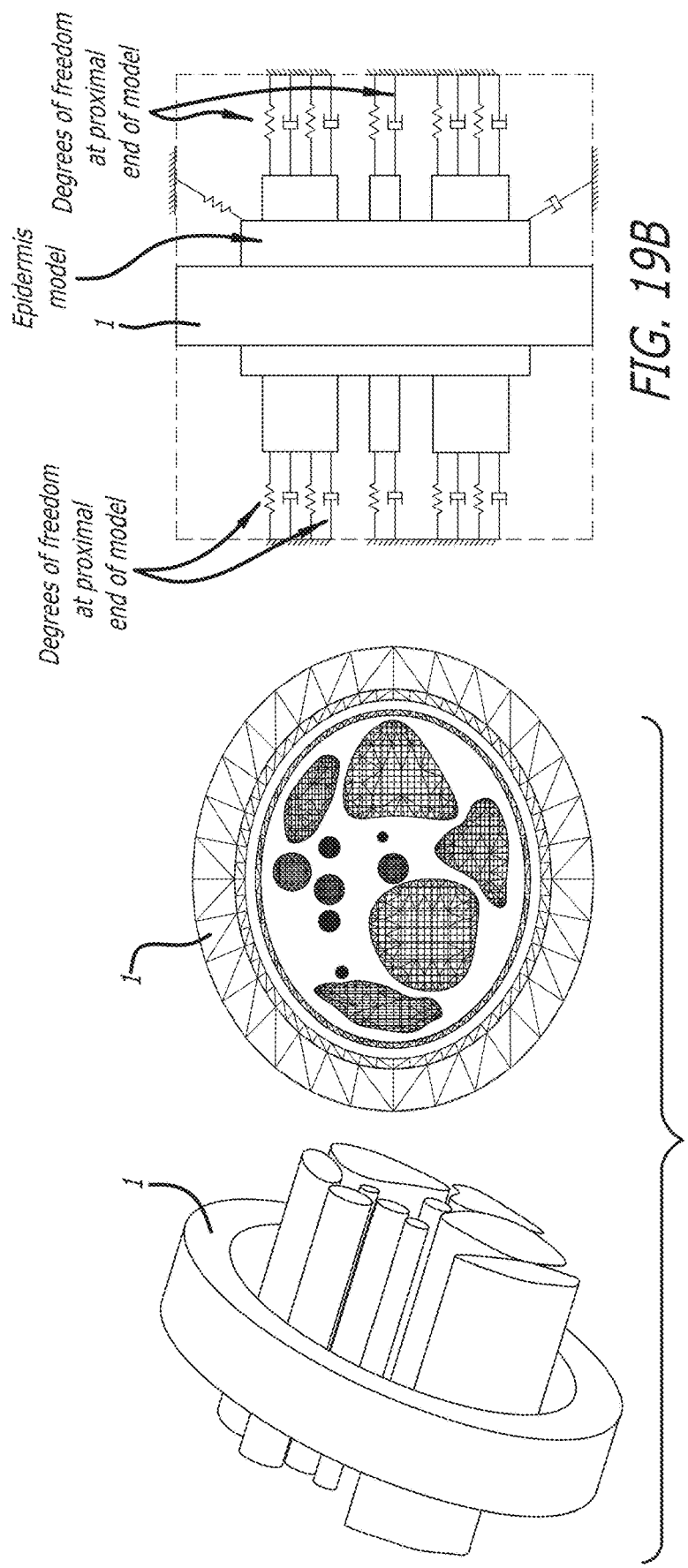
FIGS. 19A-B Illustrate reduced mixed element models of the wrist used in the biometric mathematical model of a method according to one example embodiment.

FIG. 19A shows a representative illustration of a component of the reduced order deformable mesh dynamics model or DM2 finite element human body model that may be resident in memory of system 1. Its function is to simulate tissue deformation, compliance, collision, packing, inertial and gravitational behavior of the combined system 1 and tissue objects based on a reduced configuration space of selected allowable degrees of freedom in the biometric model. This reduced configuration space accounts for principle postures that the hand or other body parts may attain. FIG. 19B shows representative kinematic degrees of freedom considered in the hand posture model with respect to FIG. 19A.

For example, FIG. 19A considers a cross-section of the wrist directly under system 1. Individual tendons, bones, device hardware, polymer layers are mathematically-modeled as either elastically deformable or rigid elements that have nodes associated with their ends. Some tissues, such as bone, may be simply modeled as inelastic structural elements; other tissues, such as veins and arteries, may be modeled as elastic structural elements. Yet other tissues, such as tendons, may be modeled as actuator elements that show self-tensioning (for example, extensors during flexion) or self-relaxing (flexors during extension) behaviors in correlation with data received from ultrasound transceivers 25. Nodes in the model representing edges and geometry of all tissues are modeled using three-dimensional non-linear, anisotropic and time-dependent mechanical compliance and dissipation elements under a base excitation generated by the articulation of the arm. Such base excitation acceleration and mobility information may be returned by the inertial measurement sensors of system 1. Additionally, such models may include provisions for self-collision detection and simple geometric penetration stiffness for modeling self-contact.

The parameters required for generating such mathematical models are partially-obtained from the first-use algorithm adaptation process as presented earlier and the rest of the parameters are obtained from the cloud component or external database. Additionally, signals from ultrasound transceivers 25 may be used to identify the internal state of the tissues using a constrained Lagrangian dynamics model, and then may solve a constrained forward kinematics model under small deformations assumptions that returns an estimate of the posture of the hand. The results may then be further filtered or smoothed using adaptive, stochastic, tracking or optimal filters as may be obvious to one versed in the art.

The posture of the body and hand as obtained from 1886, 1888, 2716 or 2815, may then be used to identify if there is a chance of the arm being at rest against a surface. In such cases, when the arm is suspected of being at rest or if there is a gross shift in signal quality corresponding to inertial motion, the acoustic field simulator is used to generate data that, when compared with the actual ultrasound data, can assist in assessing the confidence in the posture data returned by the forward kinematics solution. The acoustic field simulator may take temperature of the tissue into account since speed of sound in tissues may increase with temperature slightly. Such temperature measurement may also be used to trigger a dosage or an auto-shutdown alarm if a particular region experiences greater intensities than recommended.

The controller shown in FIG. 18A has another segment described as a posture digitizer 1824. The posture digitizer controls the definition and identification of gestures. It may receive input from the main DSP core of the controller, the acoustic field simulator, the ultrasound transceiver as shown in 1886, 1888, 2716 or 2815 and from the user-interface (UI) which identifies the kind of gestures the UI expects to receive 1894. The posture digitizer may also detect erroneous posture input from the main controller and may feed this information back to the controller as shown in 1888 and 2710.

The DSP core 1820 calculates the articulation values of each of the joints in the kinematic model and pushes the results to the digitizer. Based on the input from the user interface and criteria determined by the operating system or the cloud component, the digitizer may quantize the value to an integral representation lying between two values. The resolution for such quantization may be determined by the user interface or the operating system and the range of the two values may correspond to the statistical range of articulation for the joint, or it may be obtained from the values determined to be extreme, maximum and minimum values, during the initial algorithm adaptation process. Such values may be scaled and rounded for simplicity.

Figure 22A:
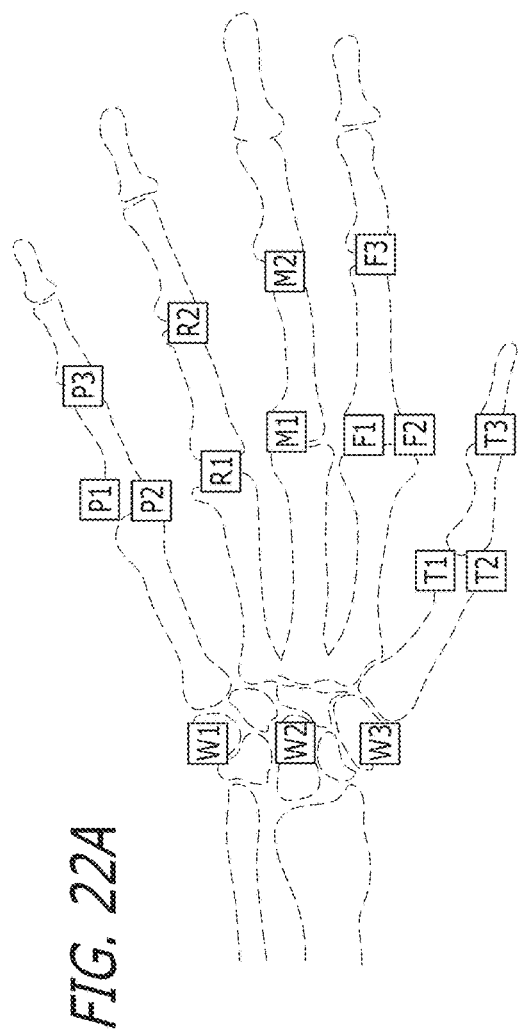
FIGS. 22A-C Illustrate wrist and hand joint labels, digital joint representations and depict how digital joint representations transform during gestures according to one example embodiment.

FIG. 22A shows an example reduced kinematic model of the hand that may be connected to the DM2 model. This figure uses the joint definitions shown in FIGS. 7A-C and shows a total of 16 joints. The DSP core calculates the articulation values of each of the joints in the kinematic model and pushes the results to the digitizer. Based on the input from the UI and criteria determined by the operating system or the cloud component, the digitizer may quantize the value to an integral representation lying between two values. The resolution for such quantization may be determined by the UI 1894 or the operating system and the range of the two values may correspond to the statistical range of articulation for the joint, or it may be obtained from the values determined to be extreme, maximum and minimum values, during the initial algorithm adaptation process. In example embodiments, such values may be scaled and rounded for simplicity.

Figure 22B:
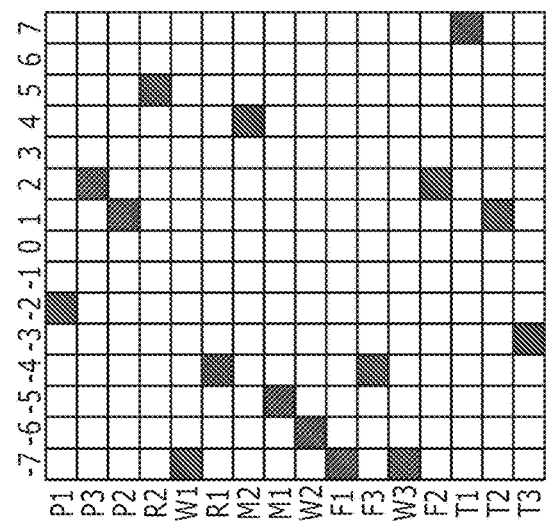

For example, fifteen such discrete values allowed uniformly between −7 and +7 for each of the 16 joints may be used as is shown in FIG. 22B where a representative matrix is constructed with the joints forming the rows and the joint articulations forming the columns of the matrix. The filled, black squares represent the digital value of the articulated joint—for example, joint P1 (digit4, proximal phalangeal yaw) is articulated by −2, and joint W1 (wrist/carpal yaw) is articulated by −7. Such a matrix can be called a posture matrix.

It can be observed that each row in such a matrix can only have exactly a single non-zero value, and such matrices might be used to represent the data from the controller for every sequential measurement. The total number of such possible posture matrices may be calculated to be $$N=\Pi_{i=1}^{I} n_i,$$

where, I is the total number of joints and $n_i$ is the number of quantizations of the $i^{th}$ joint. In the example shown in FIG. 22A-C, $N=15^{16}$, a very large number representing the total number of symbols or alphabets that theoretically can be used to create gestures.

Figure 22C:
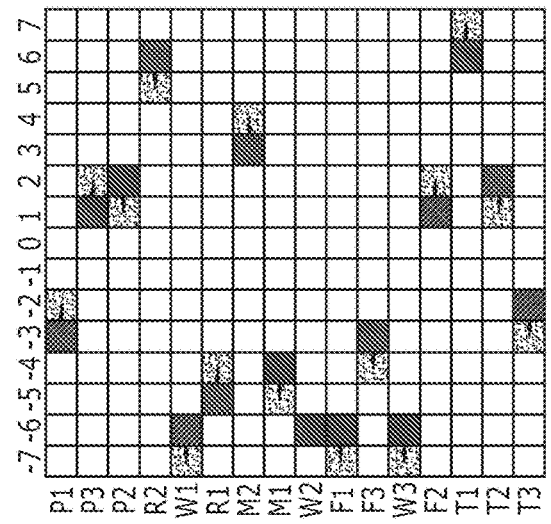

FIG. 22C shows the same matrix from FIG. 22B but with sequentially measured data corresponding to the next frame. The grey squares show the joint values from the previous frames and the black squares show the new joint values. The new values are either left or right shifted or they remained the same. For example, joint P1 has now articulated to a value of −3 and W1 is now at −6. It can be seen that a fast acquisition frame rate and a coarse enough digital resolution are required for the articulated value at each joint to only transition within positions in the immediate neighborhood of the preceding frame. For example, an element located at (i,j) in the matrix may only move to one of the three states given by {(i,j), (i,j−1), (i,j+1)} states if quantization j is not equal to 1 or 15, or may only move to one of two states, {(i,j), (i,j−1)} for j=15, or may only move to one of two states {(i,j), (i,j+1)} for j=1. This is described as the nearest-neighborhood transitions in posture and follows from the constraint-based kinematics of the joint model that does not allow any singularities in the configuration space.

As postures are measured, there may be noise related to model uncertainty, calculations, integer math and approximations that may show in the posture matrices. Some of this noise may be logically rejected to disallow non-nearest neighbor transitions, while substituting values obtained from filters. This method also enables optimal detection even if some tendons show large rotations and cannot be tracked. If a discriminative approach is used to identifying postures, then this method may also be used to increase the efficiency of the search by limiting it to nearest neighborhood configurations.

The nearest-neighborhood configurations may also be used in the ultrasound transmit and receive beam-forming process to scan only regions where such transitions may occur. This may be used to increase the scanning rates, as well as reduce the effective insonification of the tissue. If a user starts to generate a posture that does not correspond with the gesture that the user interface expects, then the nearest-neighbor transition may be used to declare an input error before the user finishes the erroneous gesture. In addition to the noise rejection application mentioned earlier, this method may be used to monitor and calibrate noise and drift process models that may be obtained when a posture is held steadily. The statistical metrics from such noise and drift models may further be used in medical applications.

It is seen that N was shown to be a very large number for the situation presented in FIGS. 22A-C. In a simple modality, the total number of joints may be reduced and may have reduced quantization levels. This may be determined by the user interface 1894. For example, an embodiment of such system may only allow a single degree of freedom per digit and three degrees of freedom at the wrist. There may be only three quantization levels defined per degree of freedom or joint. Such a system may be used for simple alphabets and will have 3^8 usable symbols in the alphabet. It is not necessary that quantization levels for all joints be the same.

Figure 23:
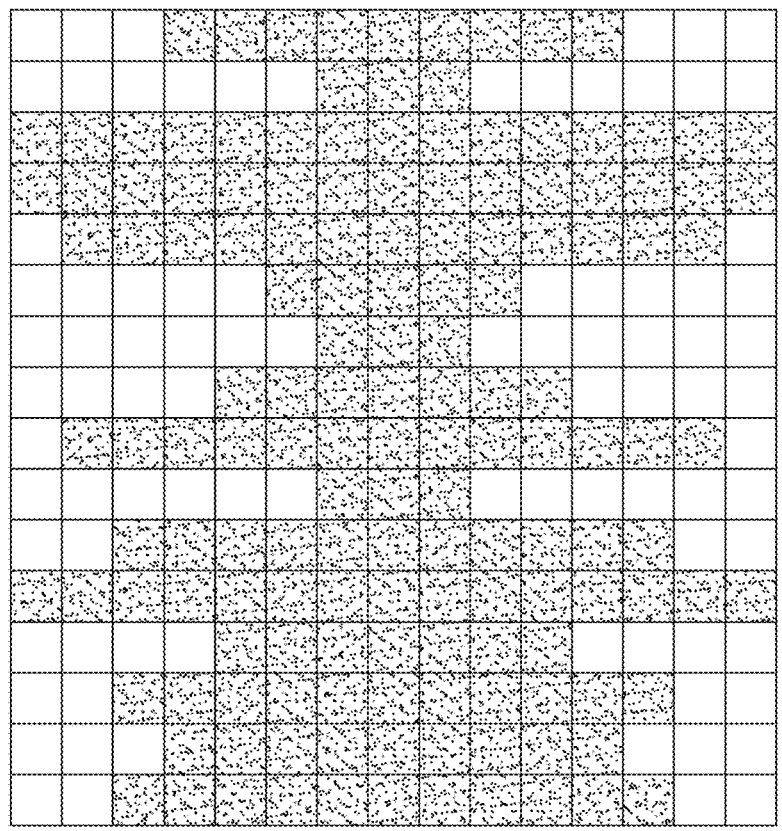
FIG. 23 Shows a digital joint representation where different joint measurements have different resolutions according to one example embodiment.

For example, FIG. 23 shows a matrix that has different quantization levels for each joint in a posture matrix. Such variable quantization values may be useful because not all degrees of freedom allow high articulation and abilities vary from person to person. For example, the distal pollex phalange may only articulate by 20 degrees though the proximal phalange on digit 1 may articulate by 110 degrees.

It should also be noted that even though the theoretical number of configurations of the posture matrix, N, is very large, not all postures are realizable by all users. The actual configuration space may be limited by sympathetic digit motion, disability, diseases, such as osteoarthritis, among others. Similarly, not all transitions between postures may be possible, and neither may many postures be detectable. Therefore, to take such observations into account, a probabilistic network model of the system is constructed.

Figure 24:
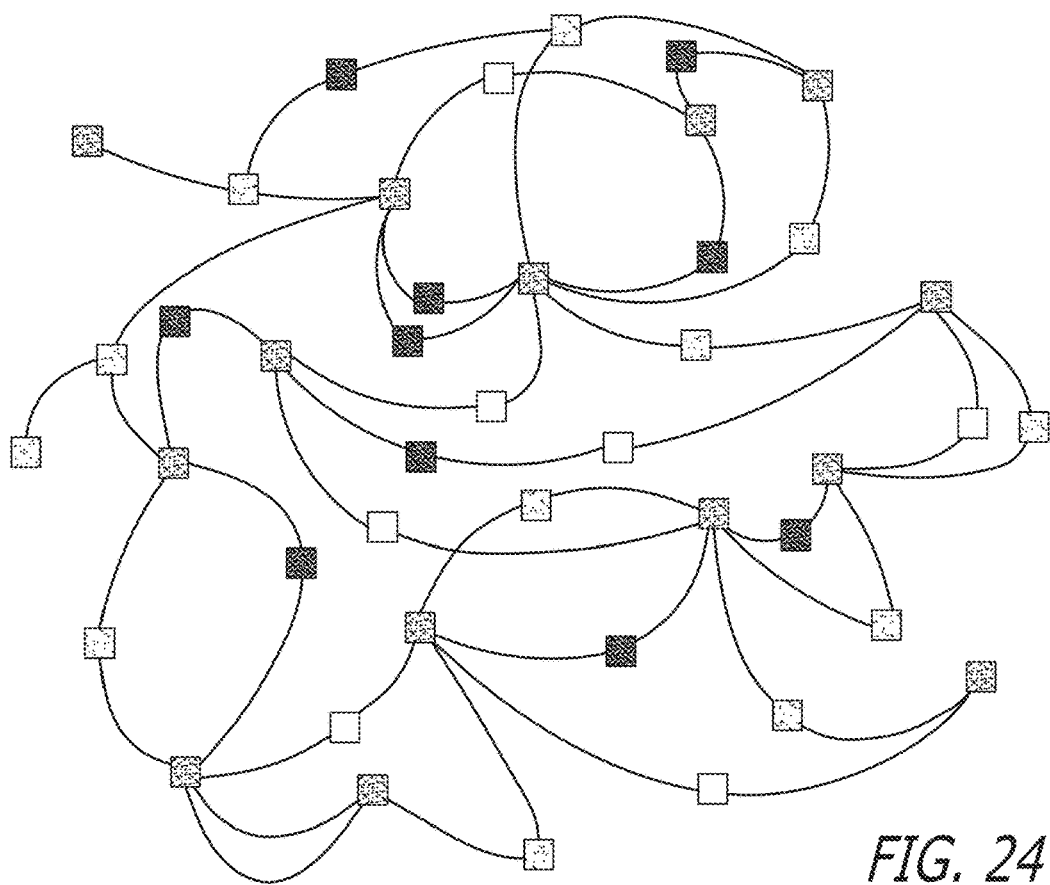
FIG. 24 Is a representation of a network graph constructed from gesture recognition using a method according to one example embodiment.

FIG. 24 shows a network model where nodes and vertices represent individual combinatorial postures (or posture matrices) where up to N such nodes may exist in the network. Such a network model may be downloaded to the local system from the cloud component and may comprise pre-populated graphs based on statistical biological metrics of a human population set. The network graph of FIG. 24 may be created by recording transitions between postures, transition times, dwell times, transition uncertainties between all the quantized posture states possible in the system. The edges in the graph are directional and weighted and may represent the transition probabilities between posture-nodes that have been calculated from statistical biometry data or simulations. Though FIG. 24 shows a planar graph for visualization, such graphs may in practice be represented in higher dimensions. The spatial arrangement or topology of the nodes may therefore be based on topological or dictionary-based metrics in one or more dimensions. A gesture can be defined as a "walk" or a motion path or a cycle between a set of connected nodes in such a graph.

Nodes may also be classified by probabilities that are calculated a priori or a posteriori. For example, the probability of finding a relaxed hand with a natural wrist posture may be higher than finding one in clenched state. The natural wrist posture may be influenced by orientation as well since gravity has a significant influence on relaxed postures. Certain postures may be uncomfortable to the user and therefore may show high transience and fast transition rates and may have low probabilities attached to those. Some postures though uncomfortable may be unavoidable when transitioning from one comfortable posture to another. The shade intensity of each node in FIG. 24 therefore represents the probability of the occurrence of each posture where the edges show transitions from one to another. In FIG. 24, black represents higher probabilities and lighter shades represent lower probabilities of postures.

Since gestures are classified by walks, paths or cycles in the graph, such probabilities attached to nodes and directed edges may be used to calculate the probabilities of gestures and this may be used as a metric to determine user comfort or preference. In an example, gestures that may result in lower probabilities may be avoided for use by the user interface algorithm. Such metrics and topological descriptions may additionally be used to minimize estimation errors and improve general acoustic-biomechanical modeling.

Since such networks may have cycles and strongly connected components, these may be detected using connected components algorithms, such as Tarjan's or search algorithms, such as breadth/depth first or optimal searches and combinations thereof. Number of walks of specific lengths may also be counted using spectral graph theory. Spanning trees may also be calculated using the combinatorial Laplacian approaches. Such metrics, among others, are calculated either locally or on the cloud component. These metrics may also have cumulative scores that may be derived from transition probabilities attached to them. Algorithms to calculate such metrics may use look-up tables and dictionaries to improve their calculation or search times.

These metrics may then be used to implement adaptivity in system 1. Due to human sensorimotor neuroplasticity, it is expected that users may also experience musculoskeletal training similar to how typing may be learned. For example, initial gestures may require coarse, or large motions; due to algorithm adaptivity, the actual motion required to convey a gesture may be substantially reduced. In other words, gesture sensitivity may also be gradually increased. This may have the benefit of reducing user fatigue. The adaptivity may take individual preferences for gestures and variations introduced through non-independence of joints or sympathetic motion or statistical body differences that may manifest as higher or lower probability cycles may be taken into account. For example, gestures that users do not find comfortable and lead to fast transition times may be removed. This adaptivity also allows aging, development or growth related variability or lifestyle related changes, such as a decrease in corpulence in users, to be taken into account. Physical disability, whether temporary or permanent, may also be accounted for including those related to polydactyly, syndactyly, ectrodactyly, Dupuytren's contracture among others.

Another benefit of the adaptability of the disclosed embodiments is that slight or gross variations in gestures may be algorithmically introduced or removed by the user interface to prevent repetitive strain injuries. For example, postures may be monitored to check if a user holds the posture with excess, unnecessary rigidity. If such conditions are detected then errors may be generated and simple modifications to gestures may be introduced.

Other equivalent representations are possible where instead of posture matrices, multi-dimensional vectors may be used. In another example, networks may simply be represented using fixed matrices or memory addresses.

Figure 20:
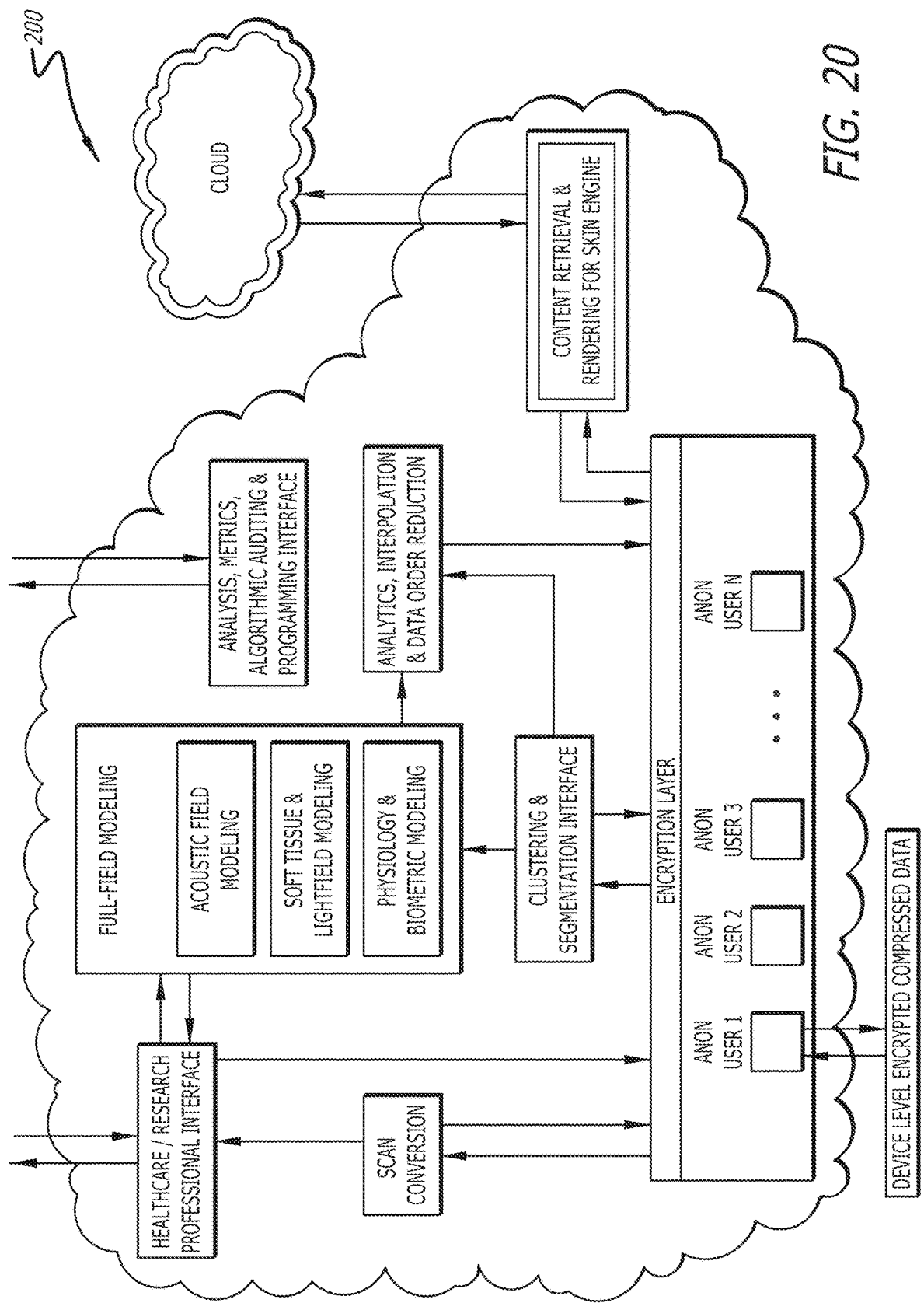
FIG. 20 Illustrates an example software architecture of a method using on-line networked software according to one example embodiment.

FIG. 20 further shows an illustration of an embodiment 200 of the cloud-based aspect of system 1. The cloud component of the system 1 may contain statistical physical and biological metrics data on human body models, mechanical and acoustic tissue parameters, material models, and calibration or verification datasets among others. Datasets on internal biological structures may also be generated from non-ultrasound non-invasive imaging modalities, such as magnetic resonance imaging (MRI) or computational tomographic (CT) imaging along with high-resolution ultrasonography, or from anatomical databases, among others.

Figure 21:
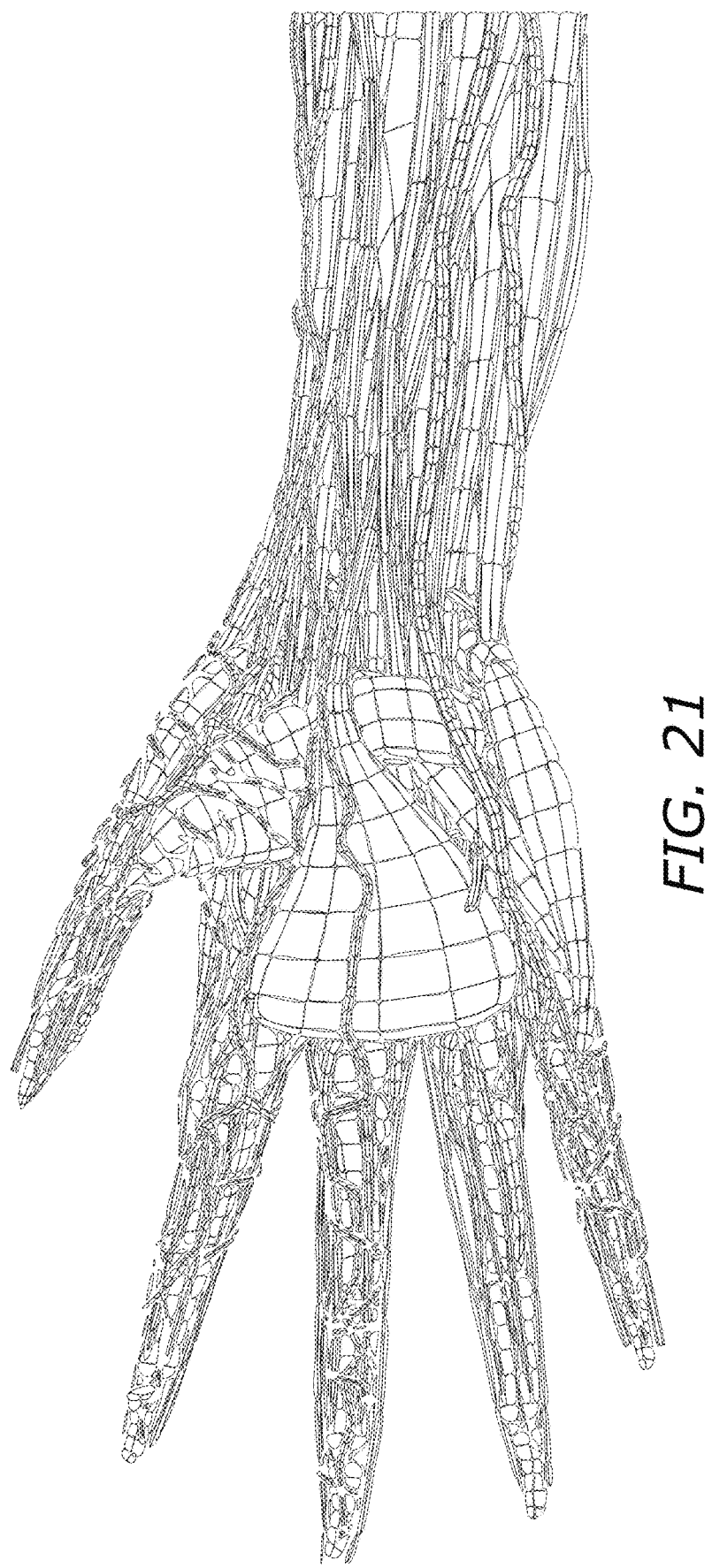
FIG. 21 Is a representative illustration of a mixed element model of a human hand used in the signal recognition mathematical model of a method according to one example embodiment.

Such data-driven datasets can beneficially be pre-rendered into full-volume component models such as the example of a hand as shown in FIG. 21. There may be additional protocols for simplifying, sorting, removing or adding components from such full-volume models based on efficiency or applicability considerations. These datasets may be sorted, labeled, categorized and classified before any use. The statistical biometry models may be pre-classified into groups. When user input is received by the cloud component, as described in the first use case, it may identify the most proximal biometry group relevant to the user and return this data to the local device memory during a first-use.

The cloud aspect of system 1 may also contain encryption and security features to uniquely identify anonymized users and prevent any unauthorized access to identifiable information. The cloud component may also contain a scan conversion system that takes in ultrasonographic data from the users and renders them to diagnostic quality images. The scan conversion aspect of the cloud component is also access-controlled to prevent misuse of diagnostic images. For example, users may not be able to access the diagnostic images but may authorize access for licensed or registered medical practitioners.

The cloud component may possess a full-field modeling and simulation tool that runs high-resolution acoustic field simulations coupled with biometric finite-element human body models. The main function of a deformable mesh dynamics model or DM2 finite element human body model resident on the cloud (e.g., FIG. 21) may be to simulate the non-linear heterogeneous tissue deformation, compliance, collision, packing, inertial and gravitational behavior of the combined system and tissues system based on the total configuration space of the allowable degrees of freedom in the mathematical model of the anatomical feature. This configuration space accounts for all postures the hand or other body parts may attain.

The function of the acoustic field simulator resident on cloud may be to simulate acoustic fields created by specific beam-former algorithms and instrumentation protocols that take tissue anisotropy and rotational deformation into account. These acoustic field simulations may be used to inform the system algorithm of gross changes in echographic profiles due to inertial motion of the device hardware with respect to the tissue, or through slipping, or pressure, or some other mode of disturbance. The acoustic field simulations may also be used to optimize the particular transmit or receive beam-forming or synthetic focusing algorithms such that maximum information can be acquired from individual devices.

This same object data may also be used in physically-based soft tissue simulations and light field models. Such object models and variations thereof, may be used to pre-render tissue deformation, light field models, interactions between acoustic fields and deformed tissues among others by system 1. These simulations may be used to generate statistical lookup tables and fitted parameters that capture the results of such simulations. The results can then be re-classified according to predetermined biometric groups and submitted to each user account based on their respective biometry groups. Such group-based lookup tables and parameters may then be reduced in resolution and modified to match the user's unique biometry. Such data may be generated before an individual system requests such information and the actual process at the time of request may only introduce latency associated with search, retrieval and transmission of the information. Additionally, if a request cannot be completed or if a simulation does not exist, such requests may be queued for simulations and verification. Additionally, if user data does not conform to metrics on quality, new beam-forming protocols may be downloaded to such individual systems 1.

Anonymized user data may be passed through a cloud-based clustering and segmentation algorithm configured to match pre-rendered models and parametric data to users. It is expected that a user's physiology and anatomy will change over time. Such an approach allows adaptive reclassification of users and removes additional training or adjustment requirements over time.

Cloud-based algorithms can be used to generate automated healthcare metrics. For example, such metrics may include heart rate, blood pressure, tissue or region stiffness, blood flow velocities, posture dynamics, structural changes, tissue strain fields among others and their historical behaviors. Some biological metrics may be collected or analyzed manually by expert service providers as well. These metrics may be used to provide automated or manual diagnostic services.

Since a significant segment of the applications of the embodiments disclosed herein may be related to preventive, diagnostic or therapeutic health in nature, additional compliance, benchmarking and performance protocols are included both locally on the device and remotely on the cloud. Such algorithms may be tested, updated and monitored either algorithmically or manually. An auditing interface may also be provided to test simulation, healthcare or scan conversion data manually or algorithmically. Anomalous metrics may be vetted by expert human users. Higher resolution imaging modes may also be scheduled algorithmically or manually from any particular device, to vet out false negatives in metrics. Normal scores are audited at random by independent/benchmarking/auditing algorithms as well as through human oversight, to minimize false negatives. Each systems' 1 firmware and failsafe modes may also be vetted at a fixed frequency. Users may be reminded automatically for updating consumables, such as acoustic layer 30. The healthcare mode embodiment maybe automatically or remotely disabled if damaged or expired parts are detected.

The mathematical model-based approach for the methods described herein may be described as an adaptive generative model as opposed to the discriminative models described in the state-of-the-art. This is because, instead of explicitly training the algorithm to merely discriminate between fixed postures as in conventional approaches, per one embodiment disclosed herein, any posture is selected and a gesture based on the posture is identified. Consequently, this approach has a very large alphabet with many symbols, where a symbol is defined as a unique gesture. Since discriminative, one-time reference signal training is not used, this generative and adaptive approach is not affected by errors introduced through one-time training.

Once the gesture and posture data has been detected by the controller, it may get passed on to the skin engine. The term "skin engine" refers to two aspects; one that controls the projection display, and another that defines a user interface, language and design.

Figure 25:
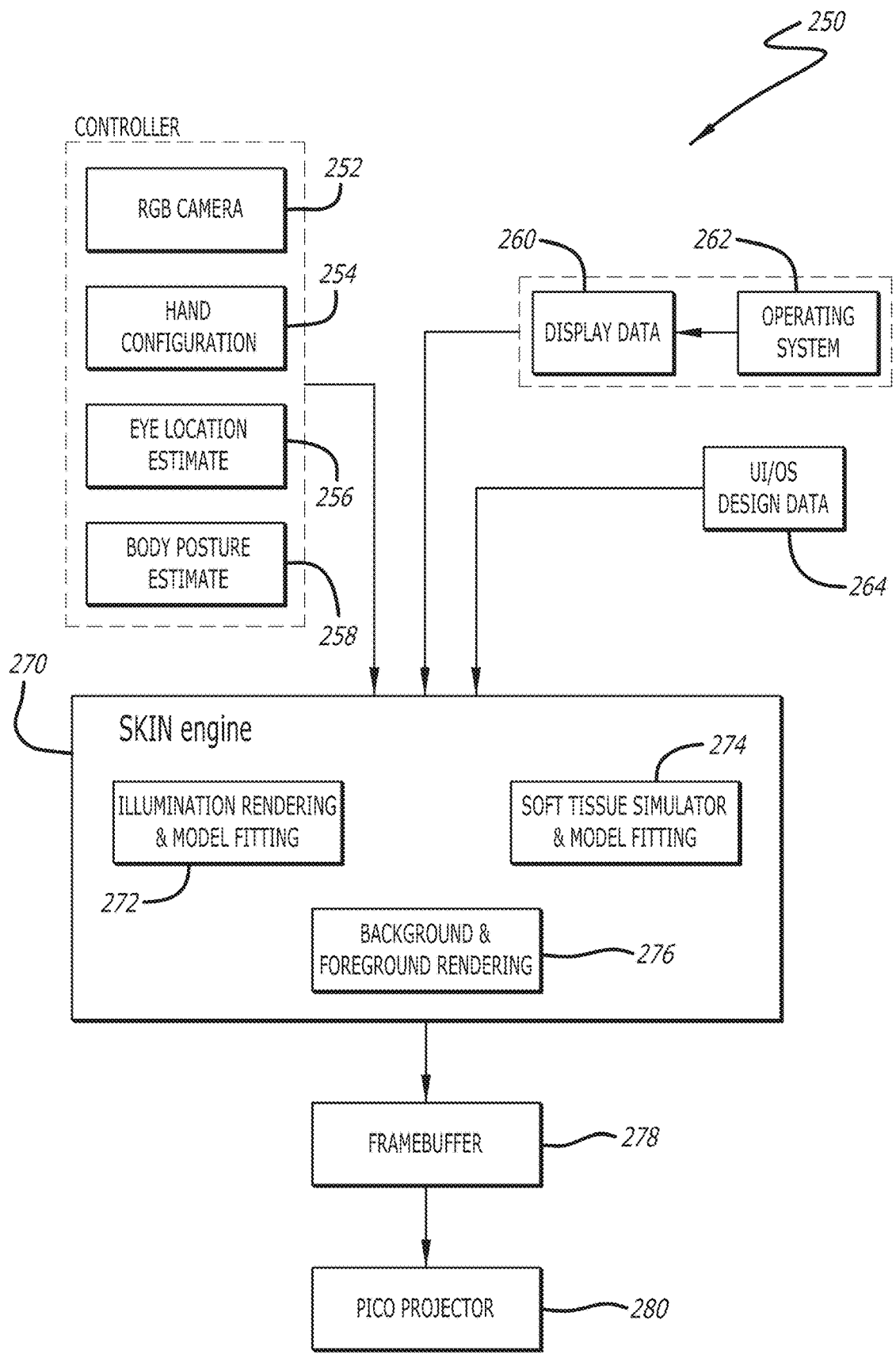
FIG. 25 Shows an architecture of a model used in rendering and soft tissue deformation simulation in a method according to one example embodiment.

FIG. 25 is an illustration of the architecture 250 including a skin engine 270 according to one example embodiment. It may receive inputs from the controller and sensors of system 1 in the form of the posture of the body part 258, estimate of the user's eye location 256, the posture and orientation of the full body or hand configuration 254, and sensor data, such as those from cameras or color ambient light sensors 252. It may also receive the image to be displayed (e.g., display data 260) as well as the user interface information 264 from the operating system 262.

The display aspect of the skin engine 270 uses the input information to first perform a shallow, soft tissue kinematics and deformation simulation 274, which may share aspects with the mixed elements model and then pass this to a light field and illumination-rendering engine 272. This process of illumination rendering is used to assess the quality of display and it modifies the image to be displayed appropriately to enhance its optical qualities when projected on a non-linear skin surface such as a hand surface. The modified image may subsequently be used to update the frame buffer before being projected by pico projectors 20.

A primary concern with projection on body surfaces is that projectors are typically designed to project on to flat surfaces, but body surfaces are not flat or of uniform color and texture. Furthermore, as a user changes posture, such body surfaces often deform. These surfaces also have texture, creases, variable wrinkles, variable colors, reflectivity, hair coverage, exposure to ambient illumination and other issues that prevent simple projection or keystone compensation schemes from generating consistent projection images across users. Therefore, the soft tissue kinematics deformation model 274 is used to generate a model of the projection surface deformations, which may then be used by the light field or illumination rendering model to optimize for display parameters.

The term 'shallow soft tissue' is used to describe the soft layers of skin and tissues of the integumentary system (epidermis and dermis) and the subcutaneous (hypodermis) layer. As the body undergoes motion, the surface described by these layers is deformed. These layers also have permanent features like folds and creases, such as the palmar creases shown in FIGS. 7A-C. In addition to deformation through simple stretching as may accompany a gesture, these layers may also deform due to the motion of underlying tissue, such as tendons and muscles.

Such soft tissue deformations can be modeled using a combination of data-driven and physically-based modeling from computational graphics. See Sueda, S., Kaufman, A., Pai, D K., *Musculotendon Simulation For Hand Animation*, ACM Trans. Graph., 27 (3), 2008. Also see Bickel, B. et al., *Capture And Modeling Of Non-Linear Heterogeneous Soft Tissue*, ACM Trans. Graphics—Proc. ACM SIGGRAPH 2009 TOG, 28 (3), 2009. For example, the posture data obtained from the controller may be used to determine the orientation of skeletal frames. Tissue geometry may be obtained from the statistical biometry models as provided by the cloud component of system 1 and may reflect properties, such as dimensions, tissue thickness, and lipid layer thickness, among others. The tissue geometry information and the location of the wearable device may be used to provide constraints on tendon, muscles and other tissue models along with the skeletal frame posture measurements, which may then be solved to calculate tissue deformation. Alternatively, a finite element simulation from controller may also provide tissue deformation information. These simulation aspects may also be carried out on the cloud component of the system and memory in a local system 1 may download lookup tables and polynomial interpolation functions, such as splines or non-uniform rational B-splines, among others, to represent shallow soft tissue deformation as a function of posture.

Once the deformed surface information is obtained, it is submitted to the light field illumination rendering system 272 as depicted in FIG. 25. The rendering system may take inputs, such as posture, image to be projected, on-body locations for projection, skin color, texture, deformations of projection surface, skin reflectivity, ambient illumination, estimated position of the user's eyes, orientation of the body part at which projection takes place, and projector optical, luminance and color characteristics, including pixel and lens transfer functions, duty cycles and refresh rates. The camera is assumed to be located at the user's eyes. The illumination rendering system 272 then may use such information to generate a scene which is solved using a formulation of the rendering equation under constraints of optimizing the projected display characteristics, such as consistent color contrasts, static and dynamic contrasts, aspect ratios, and minimum distortions and power consumption, among others. The optimization process may use methods, such as the radiosity algorithms or Monte Carlo based algorithms, such as those used in path tracing.

Since many of the input parameters for such illumination optimization are generally constants or are predictable (for example, ambient illumination generally undergoes predictable changes for users over the course of use, skin color does not change), such rendering may occur on the cloud component of system 1 and only coefficients and lookup tables need be downloaded for users. Low-resolution or reduced models may also be solved in local system 1 devices and may use correction factors from lookup tables generated by simulations on the cloud component. Additionally, users are able to compensate for display artifacts or adjust color levels using simple calibration or compensation parameters that adjust the display output. Such parameters may be operated manually.

Additional image compensation may be provided using the spatio-temporal contrast response, edge seeking and motion seeking models of the human visual system to obtain optimal pixel and color, spatial and dynamic modulation, duty cycles and frequencies. See the following: Ahumada, A J., Beard, B L., Eriksson, R., *Spatio-temporal discrimination model predicts temporal masking functions*, Proc. SPIE 3299, Human Vision and Electronic Imaging III, 1998; Watson, A B., Ahumada, A J., *Model of human visual motion seeking*, J. Opt. Soc. Am. A, 2 (2), 1985; Watson, A B., Solomon, J A., *Model of visual contrast gain control and pattern masking*, J. Opt. Soc. Am. A, 14 (9), 1997; Watson, A B., *Visual detection of spatial contrast patterns: Evaluation of five simple models.*, Optics express, 6 (1), 2000; Watson, A B., *The search for optimal visual stimuli*, Vision Research, 38, pp. 1619-1621, 1998; Lambrecht, CJVDB., *A Working Spatio-Temporal Model Of The Human Visual System For Image Restoration And Quality Assessment Applications*, Proc. ICASS P-96, IEEE, May 7-10, Atlanta, Ga., 1996; and Watson, A B., *The Spatial Standard Observer: A Human Vision Model for Display Inspection*, SID Symposium Digest of Technical Papers 31 (1), 2006. For example, pixels close to boundaries of icons or displayed objects may be modulated to maximum brightness at specific frequencies to saturate the response of the human visual system and suppress the brightness beyond the edges of the icons. Additional effects commonly used in illusions, such as checker shadow, corn sweet, simultaneous contrast, plaid, or Vasarely illusions, among others, may also be used to increase the perceived contrast of the displayed images on a skin or other non-linear projection surface. In the embodiment of FIG. 25, skin engine 270 also includes background and foreground rendering element 276. The output from skin engine 270 is passed to framebuffer 278, and the output of framebuffer 278 is passed to the pico projector 280.

The user interface element of system 1 may be used for similar optimization of the user's visual experience. An important aspect of the user interface is the five-action menu as illustrated in FIGS. 8A-F. The five actions correspond to the five fingers that users generally have and may have consistent actions associated with each of them across many interfaces. Users are not required to recall the effect of a gesture from memory and may instead simply look up the label projected on the body surface. This creates a high efficiency interface based on steering laws and has significant implications to Hick's and Fitt's laws.

Another aspect of the user interface of system 1 is the use of "elastic" interfaces. Elasticity in such projected light interfaces can be defined as relative motion between icons, or animations of icons that may be proportional to soft-tissue deformations or hand postures. For example, the five-icon menu of FIGS. 8A-F may show icons spreading apart or coming closer together during stretching or clenching gestures respectively. These animation cues can be used to exploit the motion seeking and edge discerning behavior of the human visual system. FIGS. 8A-F show examples of such animation cues used to identify the icon that is being selected.

Such elastic interfaces may be non-rectangular, frameless and need not have strong borders or grids or edges associated with the interface. Such edges generally act as a visual cue against which distortions in images are discerned. Therefore, the icon sets projected onto the skin may be aligned more with respect to the topography of the body part than with any rectangular grid structure.

The user interface on a wrist-worn embodiment of system 1 may provide access to, for example, four immediate display locations, two dorsal locations—one on forearm and the other on hand; and two volar locations—one on forearm and the other on hand (palm). The reason the volar or dorsal surfaces of the hand are used as display surfaces is that the wrist joint is feedback-stabilized with respect to the user's eyes, but other surfaces including the forearm or upper arms do not have such stability over useful periods of time. None of the other modalities described by conventional approaches recognize this benefit.

Based on the posture information provided by the controller of system 1, the interface may be configured to switch between the four display surfaces seamlessly. All surfaces may be used simultaneously or independently. For example, a simple pronation-supination motion of the wrist may flip between the dorsal or volar hand surfaces. Such automated screen switching behavior may be used to implement a contextual skin skimming behavior, where system 1 may recognize the only target surface in view of the user's eyes automatically based on the body and arm posture information. The presence of display surfaces is detected automatically based on either the sensors in system 1 or by the posture information. In the absence of any usable surfaces, all pico projector 20 elements are turned off unless expressly prevented by the user.

The presented description primarily focuses on the modality of the methods that considers a wrist-worn embodiment. However, similar approaches may be used for monitoring other regions of the body. For example, modalities designed for the eye, face, or neck, the generative models would include the tissue structures around maxilla and zygoid bones, or in the case of the neck—tissues surrounding hyoid and vertebrae bones. Advanced medical imaging modalities for assessing and monitoring of medical conditions may include full body generative and acoustic models that may reside on the cloud component of the system.

In a modality of the technology that may focus on healthcare, heart-rate, blood pressure, blood flow velocity, mean velocity, pulsatility indices, systole/diastole cycle fractions among other may be monitored by examining the pulsatile arterial or general vasculature regions. The heart rate may be identified directly through measurements of the tissue deformation at pulsatile regions as a function of time. Such regions show periodic fluctuations that correspond with heart rate. Similarly, blood pressure may be monitored by examining strain fields and velocity profiles across pulsatile tissue (See Beulen, B W. et al., *Toward noninvasive blood pressure assessment in arteries by using ultrasound*, Ultrasound Med. Biol., 37 (5), 2011).

All healthcare modalities of the system and method of the embodiments disclosed herein may be conditioned on training the users in accurate use of the device. For example, users may not understand the correct procedure for extracting quality signals from the carotid artery region proximal to the neck. Therefore, users may receive training at resellers or vendor premises similar to how first aid resuscitation training is currently provided. For simple or non-critical modalities, users may be trained using online services or may be provided with automated protocol verification and error correction. For example, training for non-critical regions that are easy to extract signals from may be provided over online video services and upon the use of correct protocols they may be given automated feedback in a manner similar to how users are trained to use fingerprint sensors.

Some healthcare modalities may require occasional device calibration and performance testing. Such calibration may occur either at an approved location or may be conducted algorithmically online using the cloud component. In one embodiment, the user may purchase specific acoustic phantom targets for such calibration.

Keyboards are intuitive because users get immediate visual feedback of their inputs and notice errors immediately. This functionality may be recreated with the presented technology. For example, upon detecting a digit 3 flexion gesture, the projected display of system 1 may be configured to project a colored symbol proximal to the digit 3 location that identifies that the detected gesture was from digit 3. This symbol may be an animation sprite that disappears gradually.

In a modality of system 1, the ultrasound transceivers 25 may be turned on automatically when user activity is detected. Transceivers 25 may also be configured to be turned on using data from the inertial measurement sensors, for example, sequences of rotations of the wrist about the forearm may be used to turn system 1 on.

In a further modality of the system, if the received signals from the ultrasound transceiver 25 indicate high-impedance media or that the device is indicated to be improperly fastened around the body, then ultrasound transceiver 25 may be configured to immediately be shut down.

In yet a further modality, similar to software-based typing instruction, users may be trained to use certain gestures for interaction by displaying projected icons or labels that may guide the user to move a certain digit or assume a certain posture sequentially. The advantage of such a modality is that the pico projector 20 display creates an immediate, visual feedback for the user.

Due to the unique user interface used in the embodiments disclosed herein, general content from the internet may be algorithmically pre-rendered to conform to the design interface. Such content rendering may occur through a gateway interface located on the cloud component of system 1.

For obtaining higher accuracy metrology, users may input additional biological metrics data or such data may automatically be measured using on-board sensors. Biological metric data is exemplified, for instance, by the length of the arm between shoulder to wrist, dimensions of fingers, arches of the hand, elbow to wrist length, height, torso dimensions, etc. This data is used by the system and method of the embodiments disclosed hereinto create a mathematical body-model of the user and used for various purposes.

In a further modality, the embodiments disclosed herein may track interface response events to user requests made through gestures. Users often make mistakes that may result in an unwanted response. Unwanted responses usually result in users making corrections. For example, after an unwanted keystroke in regular keyboards a user may hit backspace or CTRL+Z to undo the mistake; or after visiting an inadvertently clicked on link, users browse away from such links quickly. Such unwanted responses may be identified by tracking subsequent temporal and corrective inputs. This is a major element of the system 1 interface, since users may not have direct tactile feedback in such virtual interfaces like they do in mechanical keyboards.

The following are brief description of some non-limiting possible applications of the embodiments disclosed herein. Applications are segmented based on functionality. These applications may be handled using the system's 1 local resources or may utilize networked devices like smartphones or virtual cloud-based appliances. Example 3D displays, ultra-high resolution 2D displays or 2D/3D switchable displays with extended viewing angle suitable for use with the embodiments described herein include, without limitation, those disclosed in U.S. Pat. No. 8,854,724 issued Oct. 7, 2014 to Hussein S. El-Ghoroury et al., entitled "Spatio-Temporal Directional Light Modulator" and U.S. Pat. No. 8,928,969 issued Jan. 6, 2015 to Zahir Y. Alpaslan et al, entitled "Spatio-Optical Directional Light Modulator". Example spatio-temporal light field cameras suitable for use with the embodiments described herein include, without limitation, those disclosed in U.S. Pat. No. 9,179,126 issued Nov. 3, 2015 to Hussein S. El-Ghoroury et al., entitled "Spatio-Temporal Light Field Cameras". The entire contents of each of the foregoing documents are incorporated herein by reference.

3D on 2D Display Control:

A wrist-worn embodiment may be used to interact with 3D content displayed on 2D screens, such as those generated by computer-aided design programs, or animation or simulation programs. The gesture data is then transferred to a computing device which converts the input to virtual control parameters. These control parameters then interact with the 2D rendered 3D content.

3D on 3D Display Control:

Volumetric light field rendering-based 3D displays are becoming more common. However, the modalities useful for interacting with depth content are not available. In one embodiment, the system (device) may be worn on the wrist and may be used to interact with depth content based on the posture and gesture of the arm and body. An example application may be in interacting with medical holography.

2D Mouse Control:

A wrist-worn embodiment of the system (device) may be used as a 2D cursor location controller (mouse) by using the thumb as a stylus to define the four corners made by the top and bottom of the forefinger and the pinky as the corners of a 2D control surface. Any position internal to this control surface as pointed by the thumb is reproduced by the cursor on the screen. The use of the palmar surface of the hand thus allows the thumb to be used as a stylus to input 2D coordinate information. In one embodiment of system 1, this allows the use of specific patterns drawn over the control surface to be used as passwords that may be used for unique user identification.

Virtual Keyboard:

A wrist-worn embodiment of the system (device) may be used without being worn. System 1 may automatically adjust the projected light to render on flat surfaces. One or more light fields can be used to create a tiled, large display surface. In one embodiment such a system 1 may be interacted with using vibration sensors, structured light sensors, infrared sensors or similar devices that capture and localize vibrations from taps or obstructions to structured light.

Figure 26:
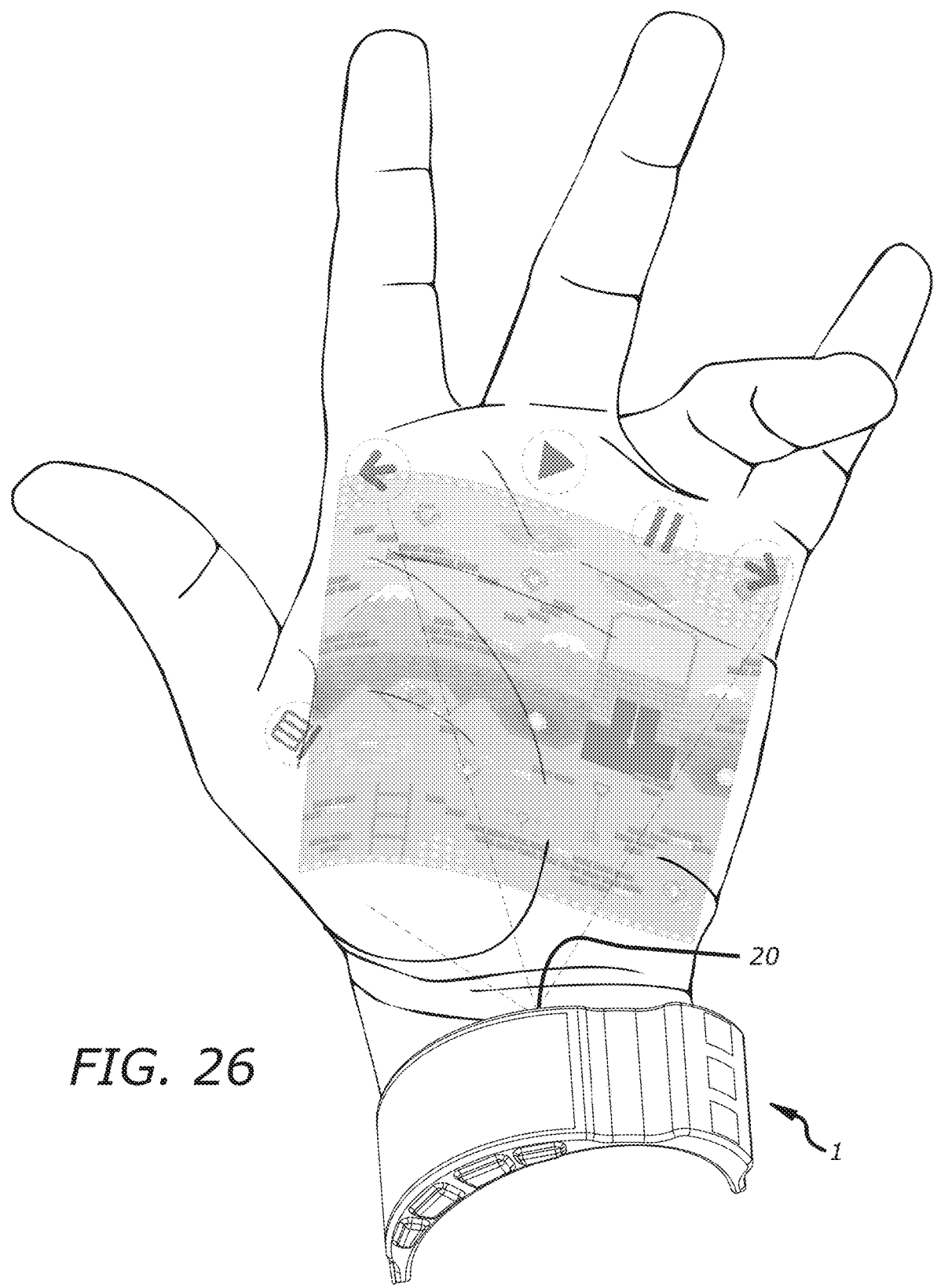
FIG. 26 Illustrates an example embodiment of a system being used to control a game that is projected onto a palmar surface of a hand according to one example embodiment.

Single handed gaming: As depicted in FIG. 26, a wrist-worn, single-handed embodiment of the system (device) may be used in a gaming or entertainment application where the fingers are used as game controller inputs in either digital or ratiometric fashion to interact with the displayed content. The projection surface need not be restricted to the palmar or dorsal hand surface but may include forearm surfaces and off-body external projection surfaces as well. The application may use additional gesture inputs like rotations of the forearm as well.

Two-Handed Gaming Front:

A pair of wrist-worn embodiments of the system (device) may be used on either hand to create a tiled display surface for gaming or entertainment applications, but not restricted to such applications, where the multiple displays interact with each other and share content in between. Such applications may use the spatial collocation system described earlier for inter-device communication. Such applications may use multiple projection surfaces including those on the dorsal, palmar and forearm surfaces as well as on external off-body surfaces.

Two Handed Gaming:

A pair of wrist-worn embodiments of the system (device) may be used on either hand to create a distributed display surface for gaming or entertainment applications, but not restricted to such applications, where the multiple displays interact with each other and share content in between. The spatial separation of the hands determined from the postures of the arms may be used to add additional inputs into the application. Such applications may use the spatial collocation system described earlier for inter-device communication. Such applications may use multiple projection surfaces including those on the dorsal, palmar and forearm surfaces as well as on external off-body surfaces.

Image Based Search:

In an embodiment, the system 1's on-board camera may be configured to take pictures of objects or the environment and such images maybe used to query search engines. Gestures may be used to browse and select the correct results. Search engines may be provided information on the correct result that may be geo-tagged and pushed to other users that visit the site later. Search parameters may also be controlled using gestures. For example, the posture of the hand might be used to convey concepts on size and relevance.

Industrial Equipment:

One or more wrist-worn embodiments may be used to interact with industrial devices that only possess networking interfaces, but no displays or input capabilities. A representative application is system 1 receiving status information from industrial equipment and a user manipulating control parameters required for the operation of the industrial equipment. This has the advantage of reducing costs in manufacturing of the industrial equipment since they no longer need input or output capabilities of their own.

Telepresence:

One or more wrist-worn embodiments may be used to interact with devices and appliances remotely over networks where the status or data from the remote devices may be presented using the projection displays and gestures may be used to remotely interact with the devices.

Military Tactical:

A wrist-worn single-handed embodiment may be used in applications where the operator might need to retain control of other equipment using the other hand. For example, soldiers remotely piloting IED disposal robots may use gestures while preserving full tactical control of their weapons. This application makes use of the single-handed interaction capability provided by the integration of the display with the gesture system.

Game Controller:

One or more wrist-worn embodiments may be used to replace traditional wired or wireless controllers used to control devices, such as televisions, gaming consoles and others but not limited to such examples.

Robot Controller:

The joints in human hands have more than 20 degrees of freedom. Since the embodiments disclosed herein capture the postures of most of these joints in an analog manner, the information can be translated to postures of robotic joints easily. Similar to human joints, robotic joints also have restrictions on the total travel. The embodiments disclosed herein provide an intuitive programming interface for controlling robots directly and monitoring their internal states. Hand posture estimated by the system may be converted to symbols that are understood by the robot programming interface or directly relayed to controller. The controller interprets the symbols in terms of joint velocities and go-no go evaluations. Instead of directly controlling postures in real-time, the embodiments disclosed herein can be used as an offline programming interface as well. In one embodiment, the motion trajectories of a joint may be estimated through interpolation using keyframes as defined using the postures calculated from embodiments disclosed herein.

In another embodiment, multiple wearable devices embodying the multiple modalities (such as shown in FIG. 1) may be worn directly or through integration with clothing. These systems 1 may be used to capture postures of the principal joints in the human body. This posture information may then be relayed to exoskeletal robotic structures. This provides a direct haptic link between such exoskeletons and the human body.

Hand Drill/Internet of Things:

One or more wrist-worn embodiments may be used to interact over wired or wireless networks with household devices that only possess networking interfaces, but no displays or input capabilities. The embodiments disclosed herein may be configured to receive status information from a household device and manipulating control parameters required for the operation of the device. This has the advantage of reducing costs in manufacturing of such devices since they no longer need input or output capabilities of their own. An example of this type is household thermostats. Additionally, many systems like grinders or refrigerators have potentiometer based dials or sliders or switches. Such discrete or bipolar switches or ratiometric controllers may also be replaced using embodiments disclosed herein.

Speech Disability/ASL:

Wearable embodiments may be used in conjunction with universal or custom dictionaries that interpret gestures, postures and trajectories to produce symbolic communication. In an embodiment, the recognized symbols may be converted to frequency and amplitude modulation of a sound source to create sounds similar to speech. For example, such a system may be used to assist users with speech disabilities proficient in said universal dictionaries, such as the American Sign Language to communicate by translating gestures to acoustic feedback for people that do not understand American Sign Language.

In another embodiment, hearing disabled users may be presented with symbols obtained from a translation of gestures. Such presentation may be done using the pico projector 20 component or it may be presented using mobile display devices like smartphones.

Covert Communication:

The process of 'silently talking to oneself' or 'talking in your head' leads to muscular activity in the vocal tract. This activity is commonly described as sub-vocalization. Research has shown that EMG signals from around the vocal cord region in the neck may be used to pick up signals from active vocalization and sub-vocalization. Conventional approaches use such EMG signals using discriminative methods to recognize speech and voluntary/involuntary vocal/subvocal gestures.

An embodiment of the system (device) when attached to the human throat region may be used to image the rapid fluctuations in the human vocal tract. These fluctuations can then be used to create an electrical signal that may be processed either locally or conveyed to a different computing device. Such signals can be used for multiple applications. For example, these signals can be correlated with words (specifically, phonemes) to generate electrical or digital signals. Such signals may be further processed for conversion to speech or to text or to meaningful symbols. Applications of such technologies may be used in secure, non-vocalized communications. In another embodiment, the system may be worn around the wrist and may convert gestures to symbols as discussed earlier. Such symbols may also be used for communicating without the use of vocalization or acoustic sounds.

Encryption:

General ultrasound image compression relates to traditional compression algorithms which solve the general case imaging problem. Due to the nature of the embodiments disclosed herein, it is not general purpose and it only scans in restricted regions being a wearable device. For this reason, it can exploit the fairly stationary nature of the probed region and only extract information from regions where the signal entropy is greatest. The exact compression technique used are algorithmically determined from individual history and anatomy and system 1 can function as a personalized encryption mechanism that may be used to uniquely identify individuals.

Cryptography: The compression protocol and biometry file headers containing the exact scanning/beam-forming protocol are unique to each user, so the algorithms of the embodiments herein effectively act as encryption algorithms. For example, unique gestures might be used to represent unique gestural communication symbols, decoding which requires knowledge of the original compression/biometry techniques. These features render device compression an equivalent of public key encryption. The private keys (sequences represent algorithm parameters) may be stored on secured device enclaves resident in the system.

Non-Acoustic Environment/Subsea/Space:

An embodiment may be used for communication purposes in environments that do not support acoustic or verbal communication. Such an application may use gesture-based symbolic methods or may use identification of vocalization activity to detect vocalized or subvocalized phonemes for communication, and can be used to convey simple instructions to machines. For example, anti-submarine warfare technologies frequently employ highly sensitive sonar arrays that are sensitive enough to pick up acoustic communications or sounds from submersibles. The embodiment may be used to avoid detection in such environments. Another example is for gesture-based communication underwater for use by divers, whereas current technology enabling such functionality requires the use of specialized diving equipment.

Communication Denied Environments:

An embodiment may be used for communication purposes in environments that require the absence of or minimal acoustic or verbal communications. Such communication may be based on subvocalization detection or non-line-of-sight gesture based communication. An example application of such technology would be for military or civilian tactical specialists operating in hostile environments where team members may not have line-of-sight physical gesture-based communication modality available to them or may be operating in low-light environments and maintaining silence has strategic importance.

Assistance Calling 911:

An embodiment may be used to automatically request assistance from designated or authorized parties. Such an application may use the biometrics metrology capabilities of the system to assess the user's physical condition. The assistance request can be placed when anomalous signals, such as impacts or falls or abnormal cardiac behavior, is detected.

Non-Human Communication:

An embodiment may be designed for applications related to non-human animals that may be trained using classical or operant conditioning. In an exemplar application of such embodiment, but not limited to this example, a pet may be able to communicate a preference for the type of food by projecting an image or symbol viewable by both the animal as well as humans, where the animal acquires a correlational understanding of the type of food with the projected image.

Group Synchronization:

Embodiments may be used, where the device may be worn across regions of the body, and may communicate with nearby or remote similar devices worn by groups of people. Such systems 1 may provide the users with a feedback response upon being activated by a specific gesture or posture. Such feedback responses may be used to synchronize activities or tasks for the group of people.

Measurement and Metrology, Weights:

In alternative embodiments, one or more wrist-worn versions may be used for the purpose of measuring physical, mechanical dimensions, and velocities of objects or distances of the device from other static or moving objects. In one such embodiment, the device may use the in-air ultrasonic transceiver as a range-finder to measure distances from other objects. In another such embodiment, the separations of fingertips may be used to measure dimensions of smaller objects that can fit into the grasp of an ordinary hand. Such embodiments may be useful for applications in construction, engineering, field testing and as a general workshop tool.

Force/Torque Measurement:

One or more embodiments may be used for the purpose of measuring load-reactions at joints in the human body. For example, a wrist worn embodiment can be used to measure the reaction force applied by the hand to lift a mass. Another example would be to measure the reaction force between the ankle and the floor. Using approximations of limb dimensions, additional information on reaction, torques on limbs may also be measured. Exemplar uses of such embodiments are in field or industrial engineering where loads and torques applied to physical objects need to be monitored.

Markerless Posture Capture:

Body and limb postural data generated from embodiments as presented here may be collected either locally or transmitted in real time over computer networks. Large compendiums of such postural data may be used in the analysis of communication modalities. Such data may also be used in applications pertaining to virtual reality, animation, computer generated imagery, video games and telepresence, but not limited to such applications. For example, such data may be used in simulating virtual crowds in games or for virtual reality or telepresence based sporting events. The data may further be processed to reveal additional metrics.

Kinematic CGI Direction:

One or more wrist-worn embodiments may be used in applications requiring the direction of virtual representations of control points, such as those used in computer generated graphics (CGI), modeling and animation. Instead of programming the trajectory or locations of such points manually, or to edit such computer-generated trajectories or locations of points, the embodiments may be used to convert gestural or postural information to symbols or commands to interact with such points. For example, the joints of the fingers may be used as surrogates for virtual kinematic linkages, and the postural information from the hand may be used to manipulate the control points. Example applications can be found for the purpose of video games, 3D modeling applications or animation generation.

Sculpting:

One or more wrist-worn embodiments may be used to interact with digitally rendered objects over wired or wireless networks. The postures of the hand may be used to deform the digital rendering. For example, the locations of the finger tips or the surface of the palm can be used to create and deform nodes in 3D meshes for solid modeling. Another example may be to use the fingertip locations to define such nodes to create a new model in a virtual sculpting process.

Tactile Scanning/3D Scanning:

One or more wrist-worn embodiments may be used to generate digital content and relay them over wired or wireless networks where the digital content pertains to the locations of the tips of the fingers. The finger tips may be used to trace outlines of solid objects. The digital content may take the form of point clouds. In this example, the modality has functionality similar to a 3D scanning technology.

Involuntary Metrics:

Embodiments may be used to acquire involuntary biomechanical data based on which additional metrics can be estimated. A few example applications, but not limited to these, could be in the field of user-engagement tracking and advertising optimization. Some biomechanical signals, such as body temperature, attentiveness determined through physical activity, heart rates, and respiration rates, may be used to construct the metrics. An advantage of the used of the embodiments disclosed herein is that such signals cannot be spoofed or faked and represent real user engagement.

Such metrics may be used to supplement traditional click-per-view, click-through and time-spent-viewing type metrics.

Panoramic Imaging:

A wrist-worn embodiment, where the embodiment contains one or more image sensors, may be used to continuously acquire images as the device is deliberately moved around in space. The acquired images may be later stitched together to create volumetric light field data or panoramic or tiled images. Such images may be viewed by virtual reality or head mounted displays or they may be viewed using augmented reality applications.

Gaze and Eyetracking:

A Face-Worn Embodiment May be Used to Monitor the states of ocular muscles. For example, such an embodiment may be in the form of an extraocular attachment and may be located on either of the zygomatic, temporal, sphenoid or maxilla bones as shown in FIG. 1. The illustrated location is chosen since it provides access to the orbital cavity and it is difficult to image at other facial locations since bones in the skull greatly impede acoustic transmissions. An embodiment may be used to track the states of the six ocular muscle groups (superior, inferior, lateral and medial rectus (left/right) and superior and inferior obliques (left/right)) along with levatorpalpebraesuperioris, orbicularis occuli, zygomaticus major/minor and levatorlabilisuperioris. Based on which bone the apparatus is located on, system 1 is able to track eyelids, saccades of the iris, rotation of the scleral region, cheek expression, structure and state of the mouth, and deformation of lips.

The information from such a head-worn embodiment may be used for, but not limited to, applications, such as gaze tracking, expression and eye tracking. One of the benefits of such an embodiment over traditional optical eye/gaze tracking hardware is it is non-occultatory (non-blocking or non-obstructing). Direct or indirect viewing of the iris or pupil is not needed. The embodiments disclosed herein can be used to control both digital and physical interfaces and objects in addition to providing interpretive data for ophthalmological, therapeutic analysis or monitoring purposes but not limited to these. Similarly, the embodiments disclosed herein can be a part of eyewear, head mounted displays, helmets or face masks that would enable a non-obstructing means to track the eye and infer its parameters in order to provide as a feedback signal that detects the response of the eye to a given stimulus, images or video content. Such embodiments are valuable for augmented reality (AR) display applications where the feedback provided by the embodiment can be used modify, adjust, compress, emphasize or highlight portion or substantially all of the displayed image content depending on the feedback of the eye parameters detected by the embodiment.

Expression Tracking:

A face-worn embodiment, similar to the one discussed above, may be used to monitor the states of facial muscles. Data returned from such embodiments may be used to interpret or analyze facial expressions in people. Applications may include animation control, involuntary metrics collection or medical practices.

Elastography:

Elastography is an imaging modality that constructs a graphical representation of mechanical stiffness of tissues. Such stiffness graphs may be used in applications, such as oncological monitoring and analysis. One embodiment, which may be a wrist worn embodiment and resembles tactile imaging, can be used to measure the force response of the tissues using the methods disclosed earlier. The measured data may be compared with reference data obtained earlier from the user, or against a compendium of measurements made available on-line. The comparison is used to detect anomalies in the mechanical response of tissues.

In another embodiment, the device may be worn around the body part to be analyzed or it may be placed loosely against the regions. The SMA actuators or the vibration motors contained in band element 5 of system 1 may thus be used to excite or stimulate the tissue periodically while ultrasound signals are actively collected during the excitation. The collected signals may be analyzed algorithmically or by a practitioner for monitoring purposes.

Percussive/Impactive/Concussive Impact Monitoring:

Multiple regions of the body may be monitored by wearable embodiments where the embodiments may be a part of an apparel, garment, or protective clothing, such as hats, boots, protective knee elbow wear and gloves, and may be used to monitor kinematic, inertial and static data obtained from the embodiments. Such embodiments may be used to provide information on percussive or concussive impacts or falls that the body or specific parts of the body may be subjected to. Applications include impactive or percussive sports activities, where the active joints, heads and general exposed or covered tissue may be subjected to sudden and abnormal accelerations and decelerations leading to gross, inertial tissue motion with respect to the skeletal system. Though such injuries may not manifest pathologies immediately, they may do so over time. These embodiments may be used to track actual tissue motion and monitor accumulative damages and aid the understanding and therapy of any attributed disease. Such embodiments are not limited to sports activities but may include activities, such as construction, industrial technical labor, civil services such as police and fire management, maritime and logistics services, among others.

Sports Medicine:

In addition to the modalities related to workplace safety discussed earlier, aspects of the embodiments disclosed herein may be used in the general field of sports medicine for performance tracking, monitoring and improvement recommendations provided either algorithmically or by human-in-the-loop specialists. The sport of golf is a good example. Information from such use may be collected by the embodiment and used to analyze metrics collected from postural information and biomechanics relevant to golfing, such as stroke impact, swing efficiency, velocity, active muscle groups, and posture of the wrist, among others. Similar embodiments may be used for monitoring other body parts to assess the influence of impact, efficiency of throwing action and provide biomechanical feedback into improving efficiency and effectiveness of physical actions or gestures. Another example use for such embodiments may be used in the analysis of team sports activities where biomechanical synchronization is required.

Imaging on Cloud:

One or more embodiments may provide signals that may be acquired and reprocessed on the cloud. As discussed, the on-body wearable system 1 need not possess the means to implement scan conversion of the input signals directly. Therefore, the raw, compressed or encrypted forms of such US signals can be uploaded to the cloud or network infrastructure where a scan conversion modality is present and may be used to construct 2D images. Based on automated image analysis, custom ultrasound signal generation or reception protocols can be downloaded to system 1 to improve the quality or nature of the reconstructed images.

Such custom signal generation capabilities may include higher frequency, higher resolution, specific scan frequencies, among other signal processing modalities.

Monitoring on Cloud:

One or more wearable embodiments may provide signals that may be acquired and reprocessed on the cloud infrastructure. As discussed earlier, the signals may be scan-converted to an image format which may then be used for algorithmically generating assessment and general health monitoring metrics that may then be returned to the user. For example, a method for measuring heart rate from Doppler or regular signals from pulsatile vascular tissues has been discussed. In another application, hypertension may be estimated by looking at the structural dilation of the vascular tissue/arteries. In other embodiments, Doppler ultrasound may be used to check blood flow through arteries at pulse points in limbs and return assessments of blood pressure. Such embodiments may be used to assess peripheral vascular disease risks, a common finding in people with high blood pressure, plaque buildup in arteries, hypertension, pathologies identifying cholesterol or thyroid or joint wear and tear type issues as well as but not limited to movement disorders. Based on automated image analysis, custom ultrasound signal generation or reception protocols may be downloaded to the device to improve the quality or nature of the medical assessments and metrics measurement. Such custom signal generation capabilities may include higher frequency, higher resolution, specific scan frequencies, among other signal processing modalities. In this manner, the cloud platform can provide statistical estimates as well as time histories of metrics to both the user to implement lifestyle changes or to healthcare professionals for advanced medical monitoring and assessment.

Teleradiology:

Embodiments may be used to provide network based preventive, monitoring and therapeutic healthcare. For example, information from users may be conveyed to the cloud either on demand or automatically, users may receive automated updates to their health status as determined algorithmically or through manual expert technical analysis. The cloud may request and access information, such as personal health records and electronic health records from private or governmental health information networks. The cloud then may algorithmically analyze the data to extract metrics from the users and/or may algorithmically determine an optimal way of distributing tasks to a local or remote network of trained technicians that provide informatics and analysis services. Their reports and metrics are submitted back to the cloud infrastructure which then pushes the results either to a health professional in proximity to the user or to the user directly. Based on the collected metrics and indicated results, the algorithm may automatically schedule appointments or additional tests for the user with relevant professionals. Healthcare providers and organizations managing healthcare related payment analytics may also schedule specific modalities using the cloud to be administered to the user.

A primary advantage of such an embodiment is that data can be collected automatically over a period of time as opposed to a single expensive test that shows far greater statistical variability. In addition to continuous monitoring, another advantage is that users do not need to go out of their way to access testing and scheduling services.

Mechanical Turk/Crowdsourced Insight:

In an embodiment, maybe used provide human-in-the-loop health-care on-demand services. The user may place a request, that may be a one-time or a subscription service, to be connected with technical medical service providers that manually inspect a user's metrics or images. Services may be structured around expert examiner ratings. The user may select a specific service based on such ratings and permit services to access anonymized or named data and may receive an anonymized or named assessment. Multiple services may be combined to get statistically relevant assessments. Such assessments may be added to the user's personal health record. The analyst services may be audited algorithmically or manually for accuracy and regulatory testing.

Movement Disorders:

One or more wearable embodiments may be used to track and monitor neuromuscular and musculoskeletal disorders either continuously or intermittently. Such embodiments may have various applications in general pathology, neuropathology, musculoskeletal oncology, cardiography, cardiomyopathy, orthopedics, or rheumatology among others, where pathology is manifested by biomechanical or kinematic vascular markers that may be detected and monitored using the various scanning modalities enabled by the presented technology. For example, seizures may be indicated by involuntary twitching or shaking of limbs, plaque buildup indicators for high cholesterol, ischemia, atherosclerosis, or other pathologies involving vasoconstriction. Embodiments may be specifically useful for stress echocardiographies. In addition, on-demand availability of such modalities can produce statistically significant datasets for abnormal marker buildup.

Other examples of such an embodiment may take the form of an around-wrist or an around-body device that monitors, identifies or characterizes twitching behavior, bradykinesia, resting tremors, postural instability or stiffness not statistically a part of a user's ordinary posture and movement history. Such monitoring or procedures may be administered locally or remotely and the user may receive feedback on their performance in real time.

Surgery/Telepresence Robotics:

Similar to the robotics application discussed earlier, an embodiment may be used to control sophisticated surgical tools. Surgical robotics presents a special challenge where due to statistical anatomical variability in patients, pre-programming cannot be typically relied on. A trained surgeon needs to be on-site and manipulating the robotic mechanisms in real time using non-intuitive electromechanical interfaces. An embodiment may be used to directly translate the gestures used by medical professionals to operations that can be executed by a robotic apparatus. In an application to telerobotics, similar embodiments can be used to perform procedures remotely. Data obtained during such procedures may be collected and used to further train and automate medical robots.

On-Hand Visualization:

A wrist-worn embodiment may be used in conjunction with sterile or clean-room apparel to produce always-available information displays and gesture based means for information retrieval and/or management. For example, an embodiment may be provided where the system is used for real time visualization provided by instruments with an on-body projection display in use during medical procedures. This embodiment is enabled by the single-handed operability of the system.

Healing and Cosmetic:

A body worn/removable embodiment may be used in multiple therapeutic or palliative healing promotion applications as well as cosmetic applications. For example, pulsed, directional and steered ultrasound producing acoustic pressures greater than that used for imaging is suspected to promote blood perfusion, tissue stimulation and relaxation and in general, perturb tissue and biological matter mechanically, and improve delivery or sub-surface absorption of topically applied drugs. These effects can be used to both treat new conditions as well as manage existing conditions. For example, some embodiments may be used in fracture healing promotion, directed subcutaneous fat removal, collagen stimulation, scar tissue breakdown, inflammation and swelling reduction and phonoporetic applications among others. Such embodiments may be algorithmically or manually controlled by practitioners and may simultaneously use an imaging modality or a tissue tracking and targeting modality to deliver controlled acoustic energy at specific regions. Such embodiments may also be controlled in person or remotely across the cloud.

Physiotherapy:

One or more wearable embodiments may be used to assess the quality and performance of prescribed treatments common in neuromuscular or musculoskeletal disorders. For example, an embodiment of said technology may be worn around the knee and return indicators of structural, dynamic and mechanical properties of tissues and ligaments in the knee regions, movement and postural dynamics, and such information may be used to guide treatments.

Movement Disorders:

One or more wearable embodiments may be used to track, monitor and provide feedback on neuromuscular and musculoskeletal disorders. The feedback may take the form of corrective conditioning information provided through haptic, visual or aural stimuli to user and further communication of metrics to experts. An example of such an embodiment may take the form of an around-wrist or an around-body device that monitors and identifies twitching behavior, bradykinesia, resting tremors, postural instability or stiffness not statistically a part of a user's ordinary posture and movement history. Additional orthopedic, musculoskeletal metrics, such as those identifying tissue stiffness or geometry, may be provided to experts to determine treatment efficacy. Such monitoring or procedures may be administered locally or remotely and the user may receive feedback on their performance in real time.

Prosthetic Applications:

Embodiments may be used in rehabilitation or assistive devices for different modalities of physical disabilities in users. One of the most important aspects of postoperative care in amputative surgeries is the physical rehabilitation of the patient. Surgery preparation and planning may include strategies for successful postoperative rehabilitation.

In an example embodiment, the prosthesis socket may include system 1 that may be used to monitor the voluntary and involuntary deformations in tissues behind the flap of the stump. Since the stump regions sustain large shearing stresses, it is conceivable that deeper signal modalities will be used in extracting signals for deep-body tissue gesture identification. In an application of the embodiment, pre-surgical planning may include post-operative prosthetic design considerations while determining incisions, transections, ligations, reattachments, reconnections and the design of the flap to maximize quality of life and ease of use.

Another application of the embodiments disclosed herein is in voice prostheses applications. Procedures, such as laryngectomy or tracheoesophageal puncture surgeries, may cause loss in the ability to generate acoustic speech in patients.

Augmented Reality Book:

A wrist-worn embodiment may be used in augmented reality applications where the projected light field interacts with objects held in the hand. An example embodiment is where the projected image is displayed on the page of a book held in hand and the image displays dictionary information. Such an embodiment may be combined with an optical character recognition algorithm or a machine vision approach to extract information from sensors embedded within the system, and the data from the sensors may be used to control projected images or other modalities.

Static Media Interaction:

One of the major problems contributing to the decline of print media is that content is static and non-interactive. One or more wrist-worn embodiments may be used to solve such issues with static or print media, by using optically recognizable codes that sensors on the system may recognize to direct the behavior of the project light systems. An exemplar embodiment may be scanning a static QR code that directs the projected display to show a particular image or video or other such interactive content that may be located on a networked resource. Such systems may be used for advertising purposes or to display dynamically generated content.

Information Kiosk:

A wrist-worn embodiment may be used to display dynamic information or content supplied through wireless or wired communication networks either based on proximity to a physical object or based on location coordinates determined from navigation or positioning sensors.

Maps:

A wrist-worn embodiment may be used to display location based information where the location is determined from navigation sensors and information is accessed using wired or wireless networks. The display may show information, such as maps. On board machine vision systems that may utilize the system camera can be used to further calibrate or shape the content in the display.

QR Code:

One of the major problems that prevents a wider adoption of encoded static graphics, such as the quick response (QR) codes or general machine vision based object recognition, is that devices used to interpret and display the encoded instructions are not always available on hand and primed for use. Therefore, a wrist-worn embodiment may be used in combination with a simple gesture to acquire an image of such encoded information or a general scene and render the decoded information or recognized objects using the projected display. Such an embodiment may be used to query prices and alternative products in a shopping application. It should be noted that such technology can also be used in logistics and inventory management, or to sort through parts in industrial settings.

Immersive Display/Tiled:

One or more wrist-worn embodiments may be used in synchronization to project on to external surfaces and create large, tiled immersive 3D displays. These displays may be compensated against the drift in user position and postures by using data from the on-board inertial measurement system. The user may interact with the projected displays using gestures.

In another augmented reality embodiment, system 1 may only project a part of an image onto one of the on-body projection surfaces. As the user changes posture or orientation, the displayed image may be scrolled across two or more dimensional space in feedback with the orientation or posture change.

Immersive Gaming:

One or more wrist-worn embodiments may be used for an immersive interactive entertainment experience. Such embodiments may use the inter-device communication modalities to share information about device location, user posture, gestures among others. Such information can be used to update the displayed information. The displayed information may be rendered on on-body surfaces as well as external surfaces.

In various places in the foregoing disclosure it was pointed out that various embodiments have or may have application in the medical field. In general such uses are in conjunction with the discovery of conditions needing medical attention and diagnosis, and the assessment and monitoring of conditions once a diagnosis is made.

While the forgoing disclosure has been described in a way of example, it is to be understood that the disclosure is not limited to thereto. It is meant to include a wide range of modifications and similar arrangements. Modifications of the features or components of the present disclosure can be made without deviating from the core concept of the present disclosure. As a result, the scope of the present disclosure is not to be limited by the foregoing description, but only by the appended claims as expressed herein.

What is claimed:

1. A method for generating a gesture command using a wearable gesture recognition device in a human-computer interface system comprising the steps of:
    providing a mathematical model of a plurality of internal and external tissue objects that make up a cross-section of an anatomical feature of a user based on a rigid body motion of the plurality of internal and external tissue objects that make up the cross-section of the anatomical feature of the user and on a set of biological metrics of the plurality of internal and external tissue objects that make up the cross-section of the anatomical feature of the user;
    generating a set of ultrasound signal data that represents a mapping of a spatio-temporal cross-section of the plurality of internal and external tissue objects that make up the cross-section of the anatomical feature of the user based on the mathematical model;
    identifying a property of one or more of the plurality of internal and external tissue objects that make up the cross-section of the anatomical feature of the user by correlating the set of ultrasound signal data with the simulated ultrasound measurements generated based on the mathematical model;
    estimating a posture of the user's anatomical feature based on the identified property of the one or more of the plurality of internal and external tissue objects that make up the cross-section of the anatomical feature; and
    generating a gesture command based on the estimated posture.

2. The method of claim 1 wherein the mapped objects comprise one or more of muscle, tendon, ligament, vasculature, bone, dermis, epidermis, epithelial, connective muscular and nervous tissue of the user.

3. The method of claim 1 wherein the property comprises at least one of a radius, position, relative position to another object, angle, relative angle to another object, pulsatility, deformation, echogenicity, velocity, displacement, extension, compression, appearance, disappearance, and differential changes of each property, of the object.

4. The method of claim 1 wherein the posture estimate is further based on a received sensor output from a sensor element configured to measure a predetermined event, physical change or state of the user.

5. The method of claim 4 wherein the sensor element is comprised of an accelerometer; a gyroscope; a pressure sensor; a GPS sensor; a microphone; an electromagnetic imaging sensor; an ambient light sensor; a color sensor; an angular sensor; an electrophysiology sensor; an electromyographic sensor; a bioacoustic sensor; a photoplethysmographic sensor, an RFID antenna; an ultrasonic ranging sensor; a high frequency transducer array; an electromagnetic field sensor or a proximity sensor.

6. The method of claim 4 wherein estimated kinematics of the estimated posture is used to generate a soft tissue deformation map.

7. The method of claim 6 wherein the soft tissue deformation map is used to compensate and calibrate a projected display.

8. The method of claim 4 further comprising the step of generating a predetermined executable computer instruction based on the gesture command.

9. The method of claim 8 wherein the computer instruction set modifies a display information projected on a non-linear surface based on an input received from the color sensor or imaging sensor configured to image the non-linear surface.

10. The method of claim 9 wherein the non-linear surface is a body surface of the user.

11. The method of claim 8 wherein the computer instruction set deletes a user-selected digital content in a computer memory.

12. The method of claim 8 wherein the computer instruction set advances or returns to a user-selected digital content in a computer memory.

13. The method of claim 8 wherein the computer instruction set triggers an image capture in a digital camera system.

14. The method of claim 8 wherein the computer instruction set triggers a panoramic image capture in a digital camera system.

15. The method of claim 8 wherein the computer instruction set modifies a three dimensional light field display.

16. The method of claim 8 wherein the computer instruction set controls a two dimensional cursor on a computer display.

17. The method of claim 8 wherein the computer instruction set controls a three dimensional cursor in a three dimensional light field display.

18. The method of claim 8 wherein the computer instruction set interacts with a computer game.

19. The method of claim 8 wherein the computer instruction set interacts with a computer game that is displayed on two hands of a user.

20. The method of claim 8 wherein the computer instruction set monitors or controls a piece of industrial equipment.

21. The method of claim 8 wherein the computer instruction is used to remotely pilot a land, air or marine vehicle.

22. The method of claim 8 wherein the computer instruction set interacts with a home entertainment system.

23. The method of claim 8 wherein the computer instruction set controls a power tool or robotic system.

24. The method of claim 8 wherein the computer instruction set controls a robotic surgical system.

25. The method of claim 8 wherein the computer instruction set maps and renders a spatial dimension or geometry of an object.

26. The method of claim 8 wherein the computer instruction set measures a force, torque and moment applied by a limb of a user.

27. The method of claim 8 wherein the computer instruction set interacts with three dimensional content for digital content generation.

28. The method of claim 8 wherein the computer instruction set is used for tissue elastography-aided monitoring.

29. The method of claim 8 wherein the computer instruction set is used to monitor a joint for impactive stress, posture or motion for physiotherapy.

30. The method of claim 8 wherein the computer instruction set is used in a user interaction with printed content.

31. The method of claim 8 wherein the computer instruction set is used in a user interaction with displayed augmented reality content.

32. The method of claim 8 wherein the computer instruction is used in a user interaction with displayed virtual reality content.

33. The method of claim 8 wherein the computer instruction set is used in an inventory discrimination application.

34. The method of claim 8 wherein the computer instruction set is used to create a virtual immersive display.

35. The method of claim 8 wherein the computer instruction set is used in an immersive multi-player game.

36. The method of claim 8 wherein the computer instruction set modifies a display information on a projection surface.

37. The method of claim 36 wherein the display information comprises a computer menu screen comprising a graphical user interface icon.

38. The method of claim 1 wherein the mathematical model comprises a lumped, finite or mixed elements model.

39. The method of claim 1 wherein the mathematical model comprises a dynamic and deformable mesh.

40. The method of claim 1 wherein the mathematical model comprises at least one numerical optimization routine that operates subjected to kinematic constraints.

41. The method of claim 1 wherein the mathematical model comprises at least one unsupervised statistical learning model.

42. The method of claim 1 wherein the mathematical model comprises at least one supervised statistical learning model.

43. The method of claim 1 wherein the mathematical model comprises at least one probabilistic graphical model.

44. A method for remotely monitoring a property of an anatomical feature comprising the steps of:
   providing a mathematical model of a plurality of internal and external tissue objects that make up a cross-section of an anatomical feature of a user based on a rigid body motion of the plurality of internal and external tissue objects that make up the cross-section of the anatomical feature and on a set of biological metrics of the plurality of internal and external tissue objects that make up the cross-section of the anatomical feature, wherein the biological metrics include user-specific biomechanical characteristics of the plurality of internal and external tissue objects that make up the cross-section of the anatomical feature for the mathematical model to generate simulated ultrasound measurements corresponding to arbitrary configurations of the plurality of internal and external tissue objects that make up the cross-section of the anatomical feature of the user;
   generating a set of ultrasound signal data that represents a mapping of a spatio-temporal cross-section of the plurality of internal and external tissue objects that make up the cross-section of the anatomical feature of the user based on the mathematical model;
   identifying a property of the plurality of internal and external tissue objects that make up the cross-section of the anatomical feature of the user by correlating the set of ultrasound signal data with the simulated ultrasound measurements generated based on the mathematical model; and
   transmitting the identified property of the plurality of internal and external tissue objects in the form of computer-readable information over a network to a remote location.

45. A wearable gesture recognition system for a human-computer interface comprising:
   a band element configured to be secured on an anatomical feature of a user;
   a plurality of spaced-apart ultrasonic transceivers disposed at predetermined locations on the band element;
   the plurality of spaced-apart ultrasonic transceivers configured to transmit an ultrasound signal and acquire a reflected signal representative of a spatio-temporal map of a plurality of internal and external tissue objects that make up a cross-section of the anatomical feature of the user when the band is worn by the user; and
   processing circuitry configured to receive, process and output the acquired spatio-temporal map to a signal processor, wherein the signal processor correlates the reflected signal with simulated ultrasound measurements corresponding to arbitrary configurations of the plurality of internal and external tissue objects that make up the cross-section of the anatomical feature of the user, wherein the simulated ultrasound measurements are generated based on a mathematical model based on user-specific biomechanical characteristics of the plurality of internal and external tissue objects that make up the cross-section of the anatomical feature of the user based on a rigid body motion of the plurality of internal and external tissue objects that make up the cross-section of the anatomical feature of the user.

46. The system of claim 45 wherein the transceiver is a two dimensional array of individual ultrasound transceiver subelements each having a top and a bottom addressable matrix electrode; an acoustic coupling layer; an acoustic lensing layer; an acoustic matching layer; and a transmission active/passive impedance layer.

47. The system of claim 45 wherein the band element is configured to be secured around the perimeter of the limb of a user.

48. The system of claim 47, further comprising:
   a wearable near eye display system in communication with the band element,
   wherein the processing circuitry is further configured to receive information from the wearable near eye display system for processing, to modify the spatiotemporal map of the cross-section of the anatomical feature according to the information received from the wearable near eye display system, and to output the modified spatiotemporal map to the signal processor.

49. The system of claim 47, further comprising:
   a mobile communications device in communication with the band element,
   wherein the processing circuitry is further configured to receive information from the mobile communications device for processing, to modify the spatiotemporal map of the cross-section of the anatomical feature according to the information received from the mobile communications device, and to output the modified spatiotemporal map to the signal processor.

50. The system of claim 47 wherein the band element comprises a variable tension element configured to provide a predetermined tension on the band element when worn by a user.

51. The system of claim 45 further comprising a sensor element including at least one of an accelerometer and a gyroscope configured to sense a position of the anatomical feature in a three-dimensional volume; and a position-dependent gesture interface in a three dimensional light field display system comprising an estimated posture of the user's anatomical feature and the sensed position.

52. The system of claim 51 wherein the position-dependent gesture interface is configured for the user to interact with or manipulate a digital content that is viewed by the user in the light field display system.

53. The system of claim 52 wherein the display system is a wearable near eye display system comprising an augmented reality display system or a virtual reality display system.

54. The system of claim 52 wherein the digital content is displayed on a direct view light field display system.

55. The system of claim 51 further comprising a wireless interface for wirelessly transferring the sensed position and estimated posture to an external computer or display system.

56. The system of claim 55 wherein the light field display system is a wearable near eye display system comprising an augmented reality display system or virtual reality display system.

57. The system of claim 55 wherein the display system is a direct view light field display system.

58. The system of claim 45 further comprising a pico projector worn on the anatomical feature configured to project a digital content, objects or icons for display on a body surface of the user or an external surface, wherein the user interacts with, manipulates or selects the digital content, objects or icons via a gesture command.

59. The system of claim 58 further comprising a gyroscope or accelerometer configured to select a portion of the digital content projected on the body of the user or external surface using a hand position of the user.

\* \* \* \* \*